US010097017B2

(12) United States Patent
Greening et al.

(10) Patent No.: US 10,097,017 B2
(45) Date of Patent: Oct. 9, 2018

(54) SYSTEMS AND METHODS FOR BIDIRECTIONAL TWO-PORT BATTERY CHARGING WITH BOOST FUNCTIONALITY

(71) Applicant: Apple Inc., Cupertino, CA (US)

(72) Inventors: Thomas C. Greening, San Jose, CA (US); Kamran M. Hasan, Cupertino, CA (US); Edrick C. G. Wong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 15/051,228

(22) Filed: Feb. 23, 2016

(65) Prior Publication Data

US 2016/0380455 A1   Dec. 29, 2016

Related U.S. Application Data

(60) Provisional application No. 62/387,266, filed on Dec. 23, 2015, provisional application No. 62/184,101, filed on Jun. 24, 2015.

(51) Int. Cl.
*H02J 7/00* (2006.01)
*H02M 1/10* (2006.01)
(Continued)

(52) U.S. Cl.
CPC .............. *H02J 7/0044* (2013.01); *H02J 1/00* (2013.01); *H02J 1/102* (2013.01); *H02J 7/0068* (2013.01);
(Continued)

(58) Field of Classification Search
CPC .................................................. H02J 7/0044
(Continued)

(56) References Cited

U.S. PATENT DOCUMENTS 5,150,032 A    9/1992  Ho
6,222,347 B1   4/2001  Gong
(Continued)

FOREIGN PATENT DOCUMENTS

CN    101425749 A    6/2009
CN    103560550 A    2/2014
(Continued)

OTHER PUBLICATIONS

Ming-Hsin Huang, et al., "Single-Inductor Multi-Output (SIMO) DC-DC Converters With High Light-Load Efficiency and Minimized Cross-Regulation for Portable Devices", IEEE Journal of Solid-State Circuits, vol. 44, No. 4, Apr. 1, 2009 (Apr. 1, 2009), pp. 1099-1111, XP055154034, ISSN: 0018-9200, DOI: 10.1109/JSSC.2009.2014726.
(Continued)

*Primary Examiner* — Suresh Memula
(74) *Attorney, Agent, or Firm* — Blank Rome LLP

(57) ABSTRACT

The disclosed embodiments provide a charging system for a portable electronic device. The charging system includes a first bidirectional switching converter connected to a first power port of the portable electronic device, a low-voltage subsystem in the portable electronic device, and a high-voltage subsystem in the portable electronic device and a second bidirectional switching converter connected to a second power port of the portable electronic device, the low-voltage subsystem, and the high-voltage subsystem. The charging system also includes a control circuit that operates the first and second bidirectional switching converters to provide and receive power through the first and second power ports and convert an input voltage received through the first or second power port into a set of output voltages for charging an internal battery in the portable (Continued)

electronic device and powering the low-voltage subsystem and the high-voltage subsystem.

27 Claims, 51 Drawing Sheets

(51) Int. Cl.
| | |
|---|---|
| *H02M 3/158* | (2006.01) |
| *H02J 7/34* | (2006.01) |
| *H02J 1/00* | (2006.01) |
| *H02J 1/10* | (2006.01) |
| *G06F 1/26* | (2006.01) |
| *H02M 1/00* | (2006.01) |

(52) U.S. Cl.
CPC .............. *H02J 7/34* (2013.01); *H02M 1/10* (2013.01); *H02M 3/158* (2013.01); *H02M 3/1582* (2013.01); *G06F 1/26* (2013.01); *H02J 2001/008* (2013.01); *H02M 2001/008* (2013.01); *H02M 2001/009* (2013.01)

(58) Field of Classification Search
USPC ......................................................... 320/114
See application file for complete search history.

(56) References Cited

U.S. PATENT DOCUMENTS

| | | | |
|---|---|---|---|
| 6,329,796 B1 | 12/2001 | Popescu | |
| 6,600,298 B2 | 7/2003 | McDonald | |
| 6,791,853 B2 | 9/2004 | Afzal | |
| 6,943,533 B2 | 9/2005 | Okuno | |
| 7,923,858 B2 | 4/2011 | Ito | |
| 8,143,851 B2 | 3/2012 | Greening | |
| 8,368,346 B2 | 2/2013 | Batson | |
| 9,209,676 B2 | 12/2015 | Geren | |
| 9,641,079 B2* | 5/2017 | Schmalnauer | H02M 3/1582 |
| 2003/0043597 A1 | 3/2003 | Betts-LaCroix | |
| 2005/0151509 A1 | 7/2005 | Cook | |
| 2005/0242772 A1 | 11/2005 | Cha | |
| 2008/0054855 A1 | 3/2008 | Hussain | |
| 2008/0100143 A1 | 5/2008 | Lipcsei | |
| 2009/0103341 A1 | 4/2009 | Lee | |
| 2009/0108677 A1 | 4/2009 | Walter | |
| 2009/0174366 A1 | 7/2009 | Ahmad | |
| 2009/0261796 A1 | 10/2009 | Ito | |
| 2009/0325056 A1 | 12/2009 | Greening | |
| 2011/0121653 A1 | 5/2011 | Hartular | |
| 2011/0234151 A1 | 9/2011 | Uan-Zo-Li | |
| 2013/0093381 A1 | 4/2013 | McGinley | |
| 2013/0154550 A1* | 6/2013 | Balmefrezol | G06F 1/263 320/107 |
| 2014/0203761 A1 | 7/2014 | Paparrizos | |
| 2014/0354251 A1 | 12/2014 | Williams | |
| 2015/0097546 A1* | 4/2015 | Pan | H02M 3/158 323/311 |
| 2015/0214770 A1* | 7/2015 | Chen | H02J 7/0065 307/19 |
| 2015/0372526 A1* | 12/2015 | Greening | G06F 1/263 320/134 |
| 2016/0064986 A1* | 3/2016 | Langlinais | G06F 1/263 320/134 |
| 2017/0279359 A1* | 9/2017 | Goncalves | G05F 1/10 |

FOREIGN PATENT DOCUMENTS

| | | |
|---|---|---|
| JP | H05049179 A | 2/1993 |
| JP | H11196541 A | 7/1999 |
| JP | 2000029544 A | 1/2000 |
| JP | 2000293241 A | 10/2000 |
| JP | 2001069682 A | 3/2001 |
| JP | 2002044941 A | 2/2002 |
| JP | 2003009515 A | 1/2003 |
| JP | 2004328996 A | 11/2004 |
| JP | 2005509391 A | 4/2005 |
| JP | 2007221981 A | 8/2007 |
| JP | 2008118847 A | 5/2008 |
| JP | 2009136097 A | 6/2009 |
| JP | 2014045593 A | 3/2014 |
| KR | 1020050104431 A | 11/2005 |
| KR | 1020130036691 A | 4/2013 |

OTHER PUBLICATIONS

Ozawa, H. et al., "Power Management Technology", Fujitsu-Scientific and Technical Journal, Fujitsu Ltd, JP, vol. 34, No. 1, Sep. 1, 1998 (Sep. 1, 1998), pp. 68-77, XP000859887, ISSN: 0016-2523, Retrieved from the Internet: URL: www.fujitsu.com/downloads/MAG/vol34-1/paper09.pdf.

Kwon, Dongwon et al, "Single-Inductor-Multiple-Output Switching DC-DC Converters", IEEE Transactions on Circuits and Systems II: Express Briefs, IEEE, US, vol. 56, No. 8, Aug. 1, 2009, pp. 614-618, ISSN: 1549-7747.

* cited by examiner

SYSTEMS AND METHODS FOR BIDIRECTIONAL TWO-PORT BATTERY CHARGING WITH BOOST FUNCTIONALITY

CROSS-REFERENCE TO RELATED APPLICATIONS

This Non-provisional application claims the benefit of Provisional Application No. 62/184,101 by Thomas Greening and Edrick C. G. Wong, filed on Jun. 24, 2015, and claims the benefit of Provisional Application No. 62/387,266 by Thomas Greening, Kamran Hasan and Edrick C. G. Wong, filed on Dec. 23, 2015, the entire contents of the provisional applications are herein incorporated by reference.

The subject matter of this application is related to the subject matter in a co-pending non-provisional application by inventors Thomas C. Greening, Qing Liu and William C. Athas, entitled "Battery Charging with Reused Inductor for Boost," having Ser. No. 14/749,466, and filing date filed Jun. 24, 2015, the entire contents of which is herein incorporated by reference.

The subject matter of this application is also related to the subject matter in a co-pending non-provisional application by inventors Jamie Langlinais, Mark Yoshimoto and Lin Chen, entitled "Multi-Phase Battery Charging with Boost Bypass," having Ser. No. 14/749,470, and filing date Jun. 24, 2015, the entire contents of which is herein incorporated by reference.

BACKGROUND

Field

The disclosed embodiments relate to batteries for portable electronic devices. More specifically, the disclosed embodiments relate to techniques for performing bidirectional two-port battery charging with boost functionality.

Related Art

Typical portable electronic devices have a power port for powering a connected device and charging an internal battery with an external direct current (DC) power supply. External accessories, such as game controllers, external memory or speakers, may also be plugged into the power port to support additional functionality. These external accessories are typically powered by separate pins on the connector. It may be desirable for portable electronic devices to have added flexibility in allowing the portable device to receive power from or provide power to external devices.

SUMMARY

The disclosed embodiments provide a charging system for a portable electronic device. The charging system includes a first bidirectional switching converter connected to a first power port of the portable electronic device, a low-voltage subsystem in the portable electronic device, and a high-voltage subsystem in the portable electronic device. The charging system also includes a second bidirectional switching converter connected to a second power port of the portable electronic device, the low-voltage subsystem, and the high-voltage subsystem. The charging system includes a control circuit that operates the first and second bidirectional switching converters to provide and receive power through the first and second power ports and convert an input voltage received through the first or second power port into a set of output voltages for charging an internal battery in the portable electronic device and powering the low-voltage subsystem and the high-voltage subsystem.

In some embodiments, the first and second bidirectional switching converters include a SIDO buck-boost converter and a buck converter.

In some embodiments, operating the first and second bidirectional switching converters includes operating the first and second bidirectional switching converters based at least in part on a coupling of a power source, an accessory, or an external battery to the first or second power ports, and operating the first and second bidirectional switching converters based on a state of the internal battery.

In some embodiments, the state of the internal battery is at least one of a high-voltage state, a low-voltage state, and an under-voltage state.

In some embodiments, operating the first and second bidirectional switching converters includes configuring an inductor and a set of switches in a bidirectional switching converter connected to a power port in the portable electronic device to perform at least one of:
  (i) up-converting power from the low-voltage subsystem to a high voltage external accessory or an external battery coupled to the power port;
  (ii) down-converting power from the low-voltage subsystem to a low-voltage external accessory or an external battery coupled to the power port;
  (iii) up-converting power from the low-voltage subsystem to the high-voltage subsystem with no power coming in or out of the power port;
  (iv) down-converting power from a power source or the external battery coupled to the power port to the low-voltage subsystem;
  (v) up-converting power from an external battery coupled to the power port to the low-voltage subsystem;
  (vi) up-converting power from the low-voltage subsystem to the high-voltage subsystem and a high-voltage external accessory coupled to the power port; and
  (vii) up-converting power from the low-voltage subsystem to the high-voltage subsystem while down-converting power from the low-voltage subsystem to a low-voltage external accessory coupled to the power port.

In some embodiments, operating the first and second bidirectional switching converters includes configuring an inductor and a set of switches in a bidirectional switching converter connected to a power port in the portable electronic device to switch between up-converting power from the low-voltage subsystem to the high-voltage subsystem and down-converting or up-converting the input voltage from a power source coupled to the power port to the low-voltage subsystem.

In some embodiments, during a low-voltage state or an under-voltage state of the internal battery and a coupling of an external battery to the first power port, operating the first and second bidirectional switching converters includes operating the first bidirectional switching converter to down-convert or up-convert power from the external battery to the low-voltage subsystems, and operating the second bidirectional switching converter to up-convert power from the low-voltage subsystem to the high-voltage subsystem.

In some embodiments, during a low-voltage state or an under-voltage state in the internal battery, a presence of the input voltage from a power source or an external battery through the first power port, and a coupling of an external accessory to the second power port, operating the first and second bidirectional switching converters includes operating the first bidirectional switching converter to switch between up-converting power from the low-voltage subsystem to the high-voltage subsystem and down-converting the input voltage from a power source to the low-voltage subsystem, and operating the second bidirectional switching converter to up-convert power from the low-voltage subsystem to the high-voltage subsystem, while either up-converting or down-converting power from the low-voltage subsystem to the external accessory.

In some embodiments, during a coupling of a power source to the first port and a coupling of an external battery to the second power port, operating the first and second bidirectional switching converters includes operating the first and second bidirectional switching converters to power the low-voltage subsystem and the high-voltage subsystem and charge the internal battery from the power source, and providing remaining power from the power source to charge the external battery.

In some embodiments, during a coupling of a power source to the first port and a coupling of an external battery to the second power port, operating the first and second bidirectional switching converters includes operating the first and second bidirectional switching converters to power the low-voltage subsystem and the high-voltage subsystem and charge the internal battery from the power source, and using the external battery to supplement the power to the low-voltage subsystem, the high-voltage subsystem, and the internal battery.

In some embodiments, the first bidirectional switching converter includes an inductor and a set of switches.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide methods and systems for managing use of a battery in a portable electronic device. More specifically, the disclosed embodiments provide charging systems that may provide an up-converted voltage to one or more subsystems of the portable electronic device.

Figure 1:
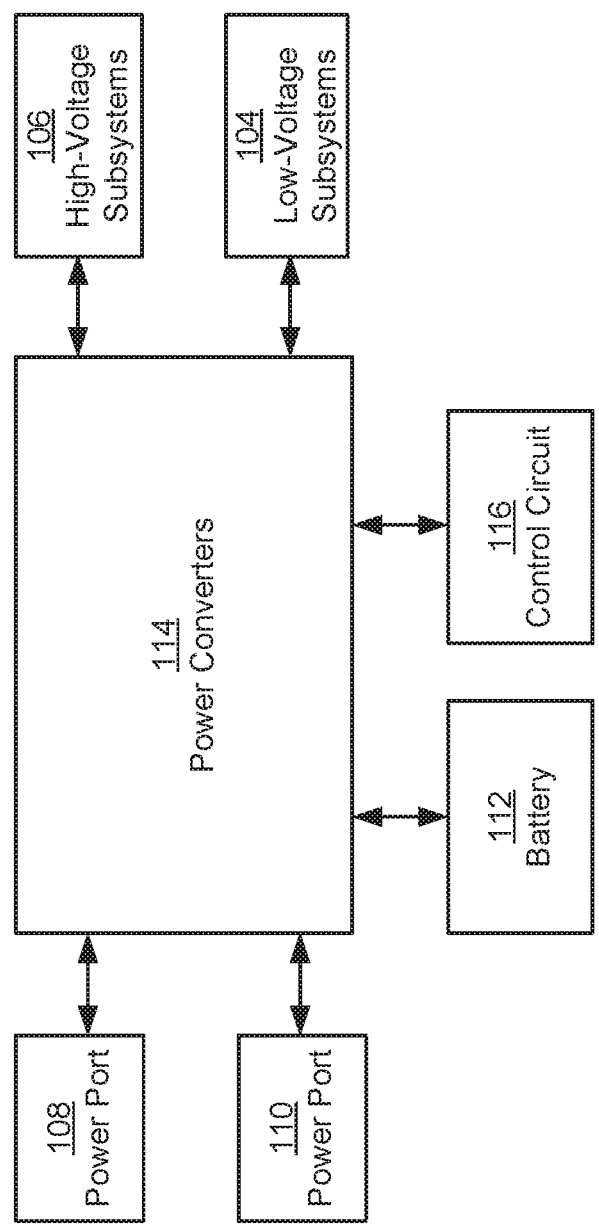
FIG. 1 shows a charging circuit for a portable electronic device in accordance with the disclosed embodiments.

FIG. 1 shows an example of the charging systems as described herein. Specifically, the charging system includes a charging circuit comprising one or more power converters 114 and a control circuit 116, which may control the one or more power converters. The charging system of FIG. 1 may be used to supply power to components of the portable electronic device. In some variations, such as that shown in FIG. 1, the portable electronic device may include one or more high-voltage subsystems 106 and one or more low-voltage subsystems 104. The portable electronic device may include an internal battery 112, and the one or more high-voltage subsystems 106 and the one or more low-voltage subsystems 104 which may be powered by an internal battery 112. The portable electronic device may have a predetermined cutoff voltage set for the battery 112, which represents the minimum operating voltage of the battery 112 allowed by the electronic device.

During operation, the low-voltage subsystems 104 may require a first voltage that is less than a second voltage required by high-voltage subsystems 106. For example, in some variations low-voltage subsystems 104 may require a first voltage (e.g., 3.0 V) at or below the cutoff voltage of battery 112 to power the components of the low-voltage subsystems 104, while high-voltage subsystems 106 may require a second voltage (e.g., 3.4 V) above the cutoff voltage of the battery to power the components of the high-voltage subsystems 106. In other variations, the first voltage required by low-voltage subsystems 104 may be above the cutoff voltage of battery 112. The charging circuit may provide boost functionality (e.g., between battery 112 and the high-voltage subsystems 106), which may supply power to one or more high-voltage subsystems 106, for example, when the voltage of battery 112 is below the second voltage. On the other hand, low-voltage subsystems 104 may require less voltage than high-voltage subsystems 106 and/or the cutoff voltage of battery 112, and in some instances may be powered directly by battery 112.

For example, many components in a portable electronic device, including the central processing unit (CPU), graphics-processing unit (GPU), and/or integrated circuit rails, may be powered by voltages much less than an exemplary 3.0V cutoff voltage for battery 112. On the other hand, the radio and speaker subsystems of the portable electronic device may require an exemplary minimum voltage of 3.4V to operate. As a result, subsystems in the portable electronic device may be divided into two or more groups, such as low-voltage subsystems 104 that can be powered from the first voltage (e.g., 3.0V), and high-voltage subsystems 106 having components that require a minimum of the second voltage (e.g., 3.4 V) to be powered. It should be appreciated that not all components in the high-voltage subsystems 106 must require the second voltage to be powered, and that some components that could otherwise be placed in a low-voltage subsystem 104 (e.g., a component that can be powered by the first voltage) may be placed in a high-voltage subsystem 106 based on other design considerations.

In the variations described here, the portable electronic device may comprise a plurality of power ports, each of which may be used to receive power from or provide power to an external device depending on the mode of operation of the charging system. For example, in the variation shown in FIG. 2, the charging system may comprise two power ports (a first power port 108 and a second power port 110). In some instances, the power ports may be configured such that the same pins (e.g., a power pin and a common ground) are used to transfer power to and from the portable electronic device through the power port.

Power converters 114 may be operated by control circuit 116 to provide and/or receive power through power ports 108-110 and convert an input voltage received through one or both power ports 108-110 into a set of output voltages for charging battery 112 and powering low-voltage subsystems 104 and high-voltage subsystems 106. For example, power converters 114 may include any type of or combination of power converters, such as one or more of a buck converter, boost converter, an inverting converter, a buck-boost converter, a Ćuk converter a single-ended primary-inductor (SEPICs), and/or a Zeta converter.

Each of the power ports 108-110 may be connected to an external device, and the portable electronic device may select a categorization for the external device based on three categories: a power supply, an external accessory, or an external battery. An external device categorized as a power supply may provide power to the portable electronic device via a power port, but the portable electronic device will not provide power to the power supply. For example, an AC-DC power adapter connected to mains electricity, for example, household power or line power, may be categorized as a power supply. Conversely, an external device categorized as an external accessory may draw power from the portable electronic, but the portable electronic device will not receive power from the external accessory. Examples of external accessories may include game controllers, external memory, speakers, or the like. An external device categorized as an external battery may receive power from the portable electronic device through the power port or provide power to the portable electronic device through the power port, depending on the operation of the portable electronic device. Accordingly, each of power ports 108-110 may have one of four connection states depending on the presence/classification of the external device connected to that port: unplugged (e.g., nothing connected), a power supply, an external battery, and/or an external accessory.

It should be appreciated that an external device may be categorized differently in different situations. For example, an external device may include a battery and a power adapter for converting mains power. In these instances, the external device may be classified as a power supply when the mains power is available, but may be classified as an external battery if mains power is not available. It should also be appreciated that the charging systems described here may provide for different combinations of connections statuses between the power ports. For example, the power ports may both be unplugged, one power port may be unplugged while the other power port is connected to either a power supply, an external accessory, or an external battery, or each power port may be connected to one of a power supply, an external accessory, or an external battery (e.g., a power supply connected to one power port and an external accessory connected to another power port, power supplies connected to each port, accessories connected to each port, etc.).

Collectively, external devices that provide power to the portable electronic device through a power port are referred to herein as "power sources", while external devices that draw power from the portable electronic device via a power port are referred to herein as "powered devices." For example, an external device that is categorized as an external accessory would be a powered device. Conversely, an external device categorized as a power supply would be a power source. An external device categorized as an external battery may act as a power source in instances where the external battery is providing power to the portable electronic device and may act as a powered device when receiving power to the portable electronic device (e.g., to charge the external battery).

In addition, the internal battery 112 of the portable electronic device may be in one of three states: a high-voltage state, a low-voltage state, and an under-voltage state. Battery 112 may be considered in an under-voltage state if the battery voltage of battery 112 is less than or equal to a designated cutoff voltage (e.g. a minimum operating voltage) of battery 112 (e.g., 3.0V) at which the portable electronic device will shut down or otherwise stop operating. This cutoff voltage may represent a battery voltage at which battery 112 has no useful remaining charge or at which further discharging of battery 112 may negatively impact future operation of the battery. In instances where the portable electronic device is configured to provide at least a specified voltage to the high-power subsystems, this voltage may be the dividing line between the internal battery's high-voltage and low-voltage state. In these instances, a low-voltage battery 112 may have a voltage that can be used directly by low-voltage subsystems 104 but not high-voltage subsystems 106 (e.g., between 3.0V and 3.4V in the examples discussed above). A high-voltage battery 112 may have a voltage that can be used directly by all subsystems (e.g., greater than 3.4V). In instances where the portable electronic device has three or more subsystems with different voltage requirements, battery 112 may have multiple low-voltage states. For example, battery 112 may have a first low-voltage state where the battery voltage is high enough to power the lowest-voltage subsystems, a second low-voltage state where the battery voltage is high enough to power the lowest-voltage subsystems and one or more mid-voltage subsystems, and a third low-voltage state where the battery voltage is high enough to power the lowest-voltage subsystems, mid-voltage subsystems, and one or more high-voltage subsystems but not one or more of the highest-voltage subsystems in the portable electronic device. In these examples, a high-voltage state battery 112 would have a voltage high enough to power the highest-voltage subsystems in the portable electronic device.

Figure 2:
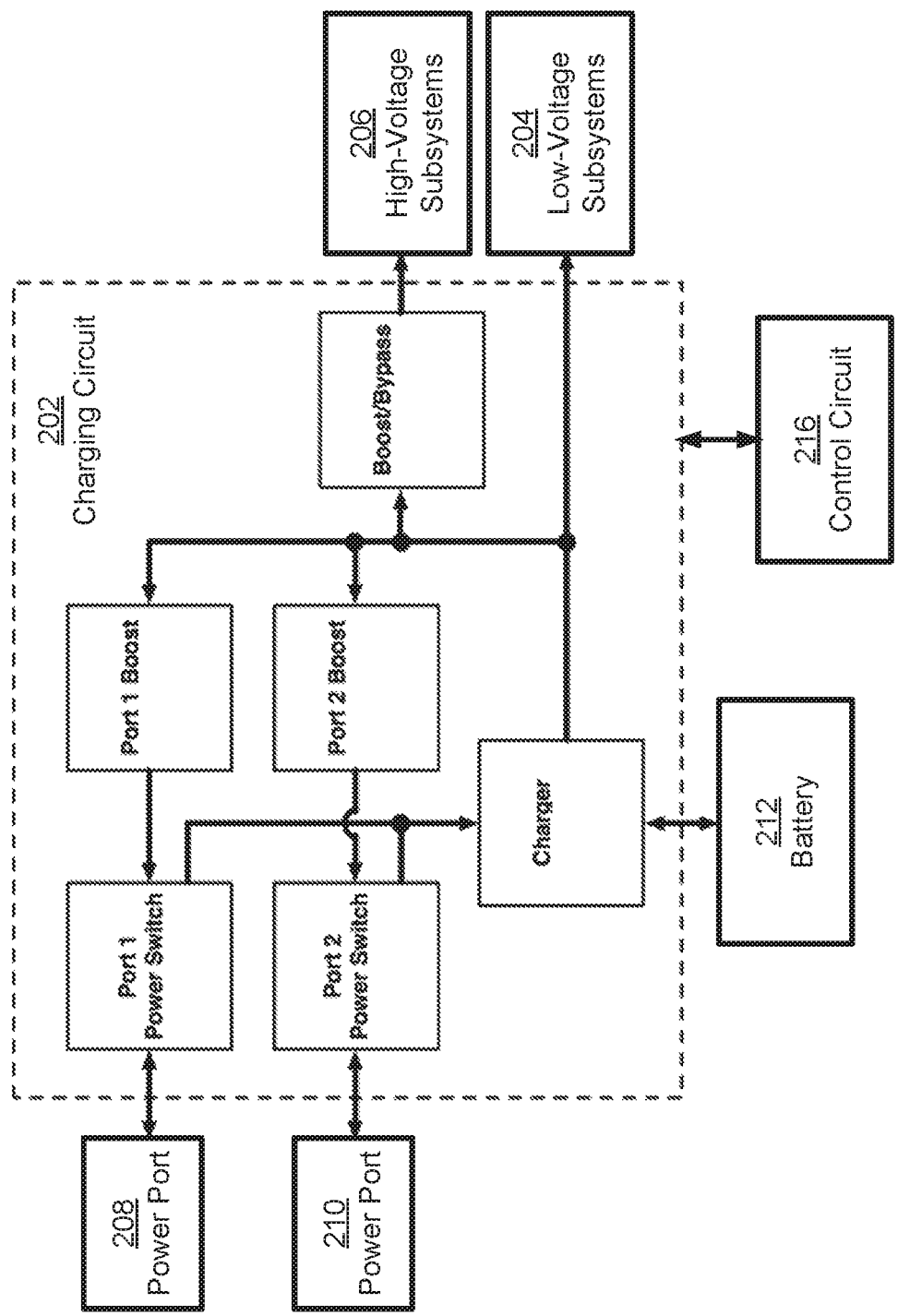
FIG. 2 shows a charging system for a portable electronic device in accordance with the disclosed embodiments.

FIG. 2 shows a block diagram of a charging circuit 202 that provides both bi-directionality of two power ports 208-210 and a boosted rail for one or more high-voltage subsystems 206, which have a minimum operating voltage that is higher than the cutoff voltage of an internal battery 212. On the other hand, one or more low-voltage subsystems 104 may have a minimum operating voltage that is at or below the cutoff voltage of battery 212, such as discussed above. This approach may achieve bi-directionality by using a power switch (e.g., a 4 FET power switch) on each power port to either provide power from a boost circuit to an external accessory or receive power from an external power supply to be passed to the battery charger. High-voltage subsystems 206 are powered by a boost/bypass circuit that boosts the voltage of battery 212 if the battery voltage is less than the minimum voltage limit of high-voltage subsystems 206.

This charging circuit 202 may require several circuit components (e.g., as many as 19 power FETs and four inductors depending on the components. The charging circuit 202 may not be able to charge battery 212 simultaneously from both power ports 208-210 as the power switches may need to select either power port 208 or 210 to connect to the battery charger.

Accordingly, some embodiments as described herein may include a battery charging circuit capable of bi-directionally receiving power and providing power for at least two external power ports 208-210, while providing a boosted voltage to high-voltage subsystems 206 that require a minimum voltage higher than the minimum internal battery voltage. These embodiments may reduce the board space required by using available inductors and power FETs for differing purposes, which may be especially beneficial given the limited space available on portable electronic devices.

Figure 3:
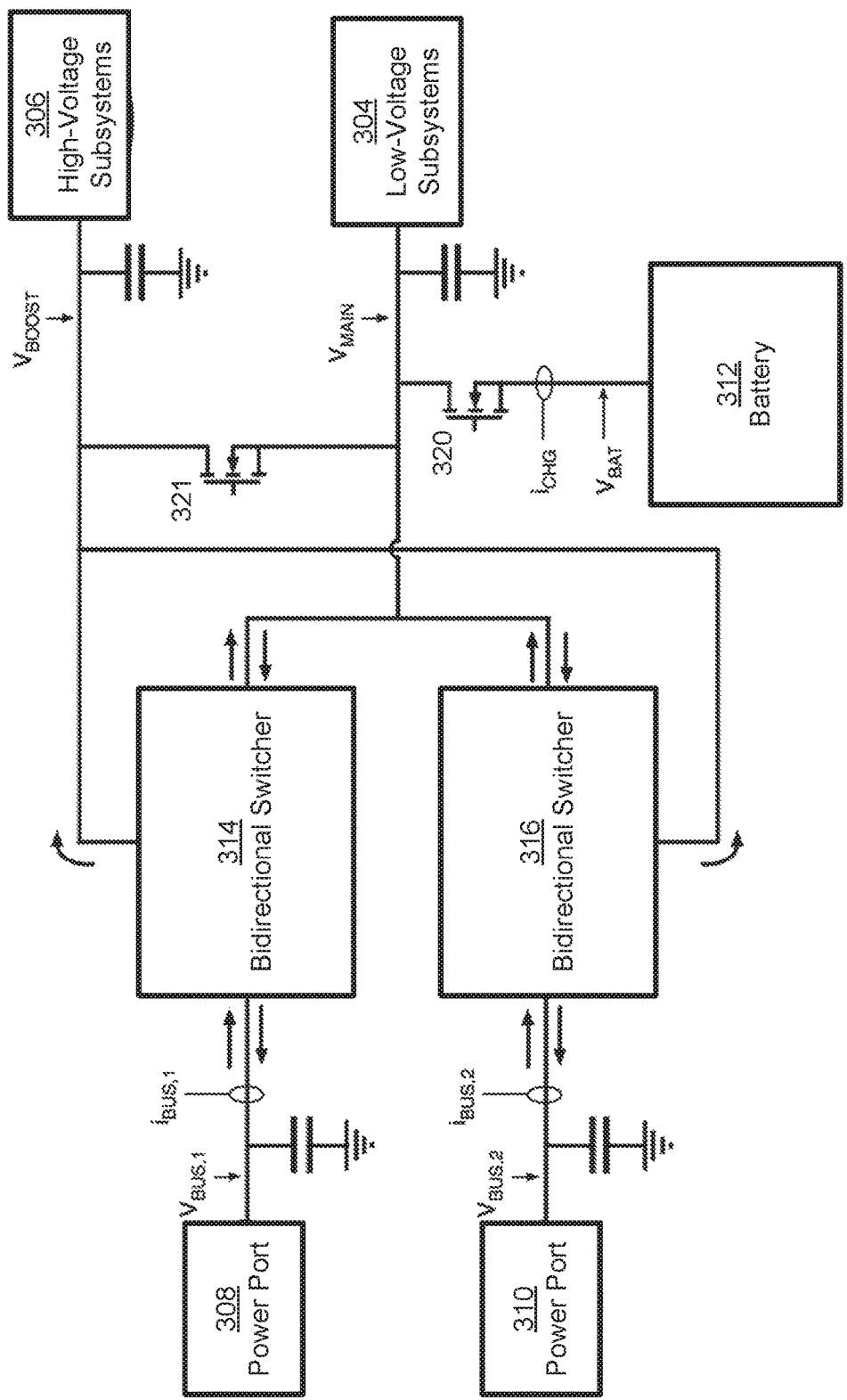
FIG. 3 shows a charging circuit for a portable electronic device in accordance with the disclosed embodiments.

FIG. 3 shows an example of the charging system of FIG. 1 utilizing bidirectional switchers to control power distribution between power ports and the rest of the portable electronic device. As shown there, the charging system may be implemented using a circuit that includes a first bidirectional switcher 314 coupled to a first power port 308 (via voltage node $V_{BUS,1}$), one or more low-voltage subsystems 304 (via voltage node $V_{MAIN}$, to which an internal battery 312 may be coupled via a FET 320), and one or more high-voltage subsystems 306 (via voltage node $V_{BOOST}$). The circuit also includes a second bidirectional switcher 316 coupled to a second power port 310 (via voltage node $V_{BUS,2}$), low-voltage subsystems 304 (via voltage node $V_{MAIN}$), and high-voltage subsystems 306 (via voltage node $V_{BOOST}$). Depending on the operation of the bidirectional switcher, each bidirectional switcher may be selectively controlled to control a voltage at one or more voltage nodes or act as a switch, and may include a FET, a variable resistor, or the like. Each of bidirectional switchers 314-316 may include one or more inductors and a set of switching mechanisms such as FETs, diodes, and/or other electronic switching components to facilitate operation of the bidirectional switcher.

As mentioned above, bidirectional switchers 314-316 may provide and receive power through power ports 308-310 and convert an input voltage received through one or both power ports 308-310 into a set of output voltages that may charge a battery 312 and power low-voltage subsystems 304 and/or may power high-voltage subsystems 306. A single bidirectional switcher 314 or 316 may receive power from the other bidirectional switcher 316 or 314 or the internal battery 312, and may provide power to the high-voltage subsystems 306. The bidirectional functionality of the circuit may be represented by the ability of bidirectional switchers 314-316 to provide or receive power through the corresponding power ports 308-310 and low-voltage subsystems 304.

Bidirectional switchers 314-316 may be operated by a control circuit (e.g., control circuit 116 of FIG. 1) based on the connection state (e.g., unplugged, power supply, external accessory, external battery) of each the first or second power ports, and in some instances may also be controlled based on a state of the internal battery 312 in the portable electronic device. More specifically, the control circuit may configure bidirectional switchers 314-316 to prioritize the distribution and use of power among low-voltage subsystems 304, high-voltage subsystems 306, power ports 308-310, and/or internal battery 312 based on the states of power ports 308-310 and battery 312. As described in further detail below, the operation of bidirectional switchers 314-316 may include down-converting (e.g., bucking) power from a power source coupled to one or both power ports 308-310 to low-voltage subsystems 304, up-converting (e.g., boosting) power from low-voltage subsystems 304 to an external accessory or external battery coupled to the power port, up-converting power from low-voltage subsystems 304 to high-voltage subsystems 306 with no power coming in or out of the power port, and/or up-converting power from low-voltage subsystems 304 to high-voltage subsystems 306 and the external accessory coupled to the power port.

Figure 4A:
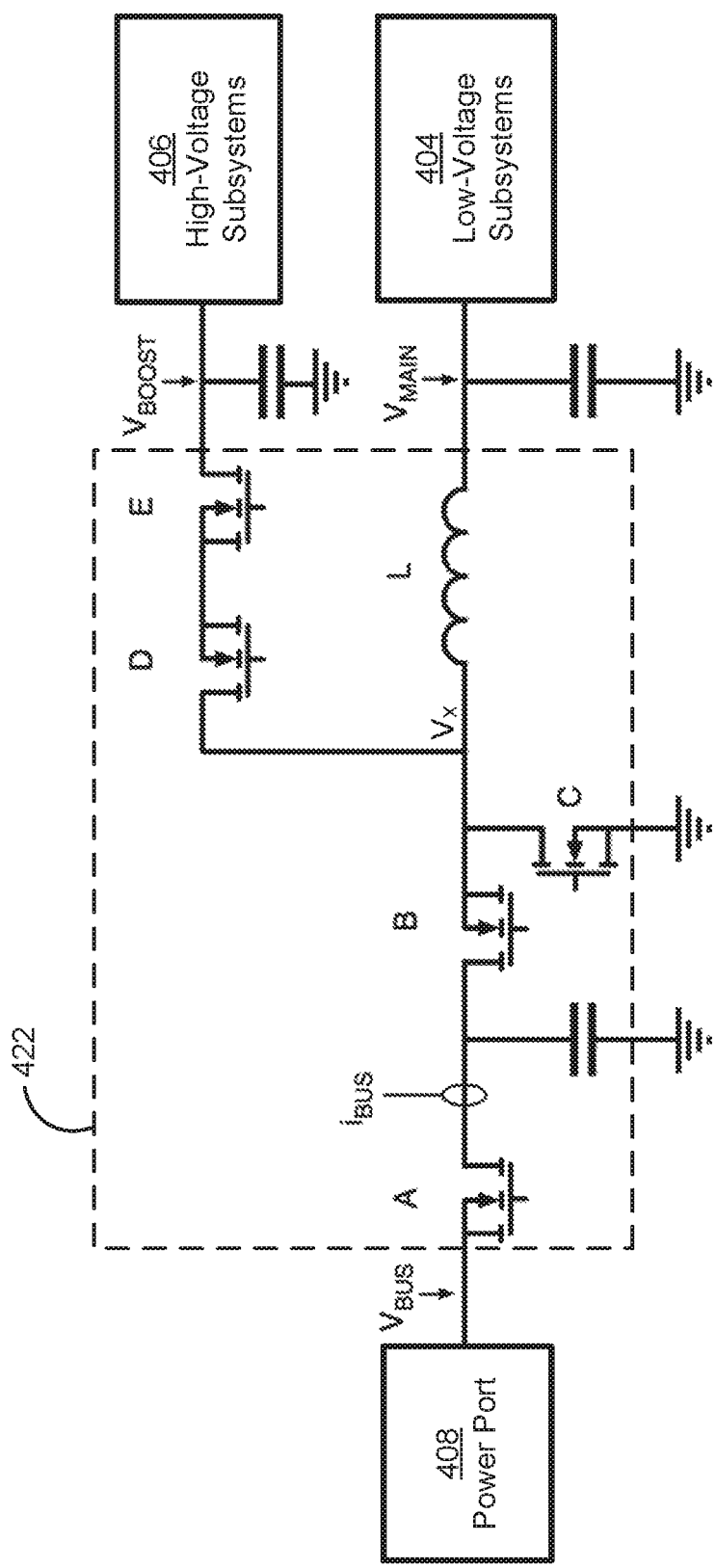
FIG. 4A shows an exemplary bidirectional switching converter in accordance with the disclosed embodiments.
Figure 4B:
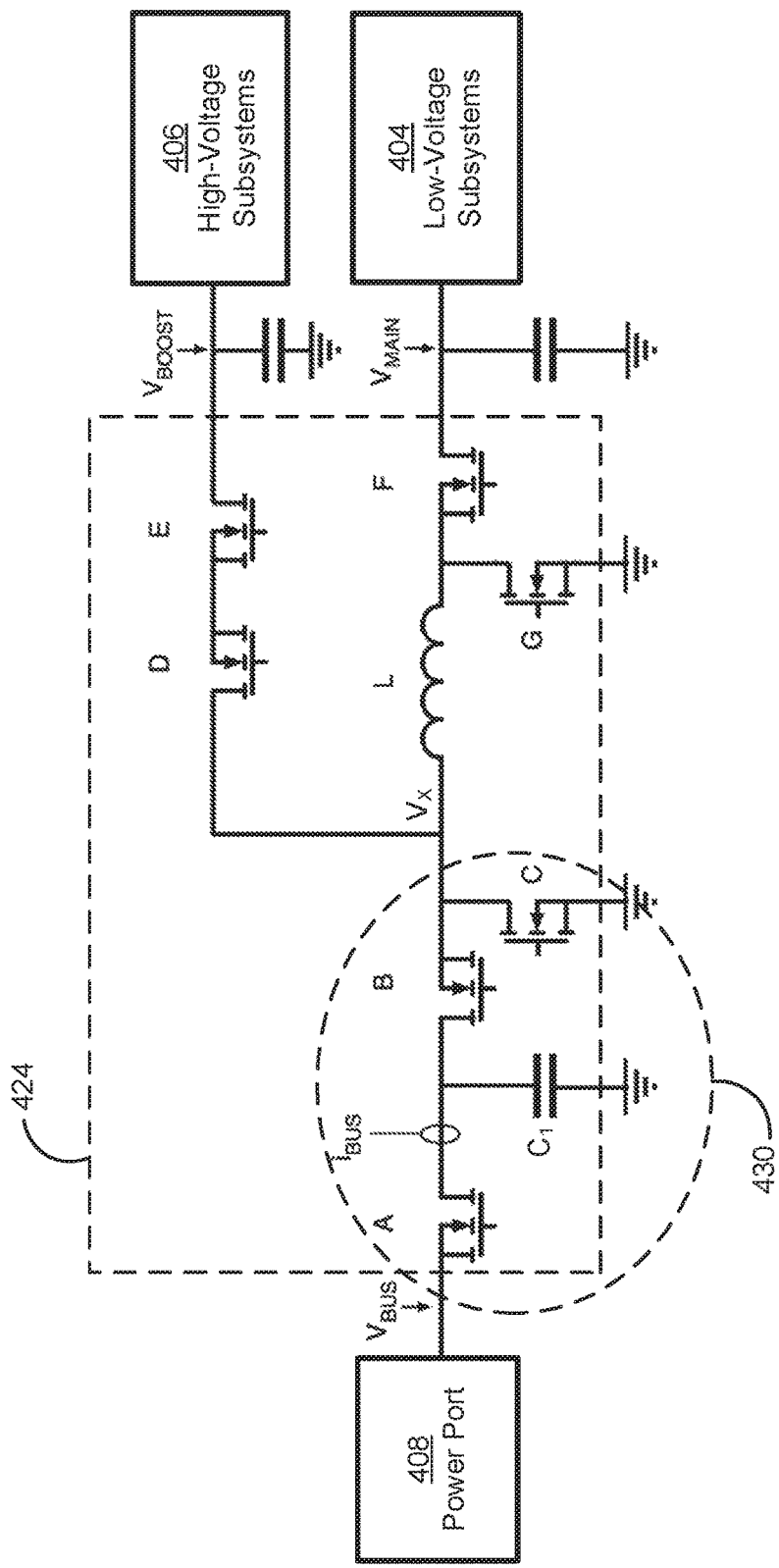
FIG. 4B shows an exemplary bidirectional switching converter in accordance with the disclosed embodiments.
Figure 4C:
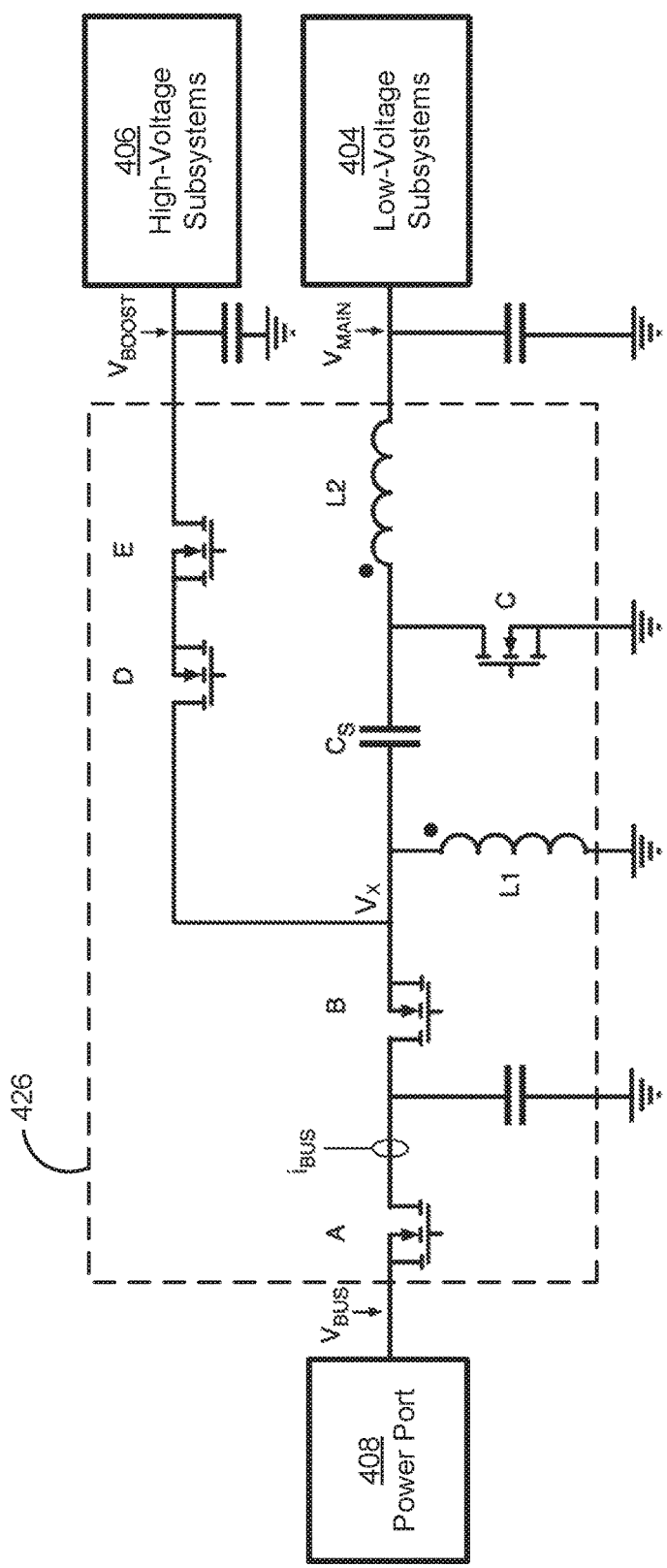
FIG. 4C shows an exemplary bidirectional switching converter in accordance with the disclosed embodiments.

Exemplary implementations of bidirectional switchers that may be used with the charging circuits described here are shown in FIGS. 4A-4C. In FIGS. 4A-4C, each bidirectional switcher 422-426 is shown as coupled to a power port 408, one or more low-voltage subsystems 404 and one or more high-voltage subsystems 406. Bidirectional switcher 422 of FIG. 4A may include a single-inductor dual-output (SIDO) boost converter, bidirectional switcher 424 of FIG. 4B may include a single-inductor dual-output (SIDO) buck-boost converter, and bidirectional switcher 426 of FIG. 4C may include a dual-output SEPIC converter.

Each bidirectional switcher may include one or more inductors and a number of FETs. In bidirectional switchers 422-426 of FIGS. 4A-4C, FET A may be turned on to enable transmission of power to power port 408 at $V_{BUS}$ and disabled to prevent transmission of power to power port 408. For example, FET A may be turned off when power port 408 is unplugged and/or to provide reverse voltage protection from a power source that is incorrectly designed or connected backwards to power port 408.

In bidirectional switchers 422-426 of FIGS. 4A-4B, FETs B and C couple the input terminal of inductor L to a voltage node $V_X$ and a reference voltage such as ground, respectively. FETs B and C may be switched to selectively couple the input of inductor L to voltage node $V_X$ or the reference voltage. For example, voltage node $V_X$ can either be at the reference voltage (when FET C is on) or at the voltage of the power port 408 (when FETs A and B are ON and FET C is OFF). FETs D and E may couple the voltage node $V_X$ to high-voltage subsystems 406 at $V_{BOOST}$. In FIG. 4B, FETs F and G may couple the load terminal of inductor L to low-voltage subsystems 404 at $V_{MAIN}$ and a reference voltage such as ground, respectively.

In bidirectional switcher 426 of FIG. 4C, inductors L1 and L2 may be coupled inductors that are wound onto the same core. FET B may couple the input terminals of L1 and L2 to the voltage node $V_X$, and FET C may couple the input terminals of L1 and L2 to a reference voltage such as ground. A capacitor $C_S$ disposed between the input terminals of L1 and L2 may transfer energy between $V_X$ and $V_{MAIN}$ during an on-time when FET B is on and FET C is off. During an off-time when FET C is on and FET B is off, current may circulate from L1 through $C_S$ and FET C back to L1. FETs D and E may couple the voltage node $V_X$ to high-voltage subsystems 406 at $V_{BOOST}$.

When a charging system includes multiple bidirectional switchers, the same- or different-type of bidirectional switcher may be included in the charging system, depending on system design or requirements. For example, a SIDO boost converter may be used with the requirement that the power port 408 has a voltage that is higher than the voltage of the low-voltage subsystems 404, while a SIDO buck-boost converter or dual-output SEPIC converter may be used without such a requirement at the expense of additional circuitry.

It should be appreciated that in some instances the systems described here do not require separation between high-voltage and low-voltage subsystems, and that in other instances the bidirectional switchers are not connected to the high-voltage subsystems (e.g., the high-voltage subsystems may receive power from an additional circuit). For systems that do not have a separation between low-voltage and high-voltage subsystems (e.g., all of the subsystems may be incorporated into the low-voltage subsystems described above) or provides power to the high-voltage subsystems using a separate circuit, the charging system can be simplified by removing the portion of the circuit including FETs D and E from the bidirectional switchers shown in FIGS. 4A-4C. With respect to FIG. 3, in some of these instances the connection between the bidirectional switchers 314 and 316 may also be removed, as well as the FET 321 between the low-voltage subsystems and the high-voltage subsystems (if there are high-voltage subsystems), an additional circuit may be used to connect high-voltage subsystems 306 to either $V_{MAIN}$ or $V_{BAT}$ or high-voltage subsystem 306 may be removed and the components incorporated into the low-voltage subsystems 304). In some of these instances, the control of the bidirectional switchers may be identical to the control operations discussed below with the internal battery 312 in the high-voltage battery state.

Figure 5A:
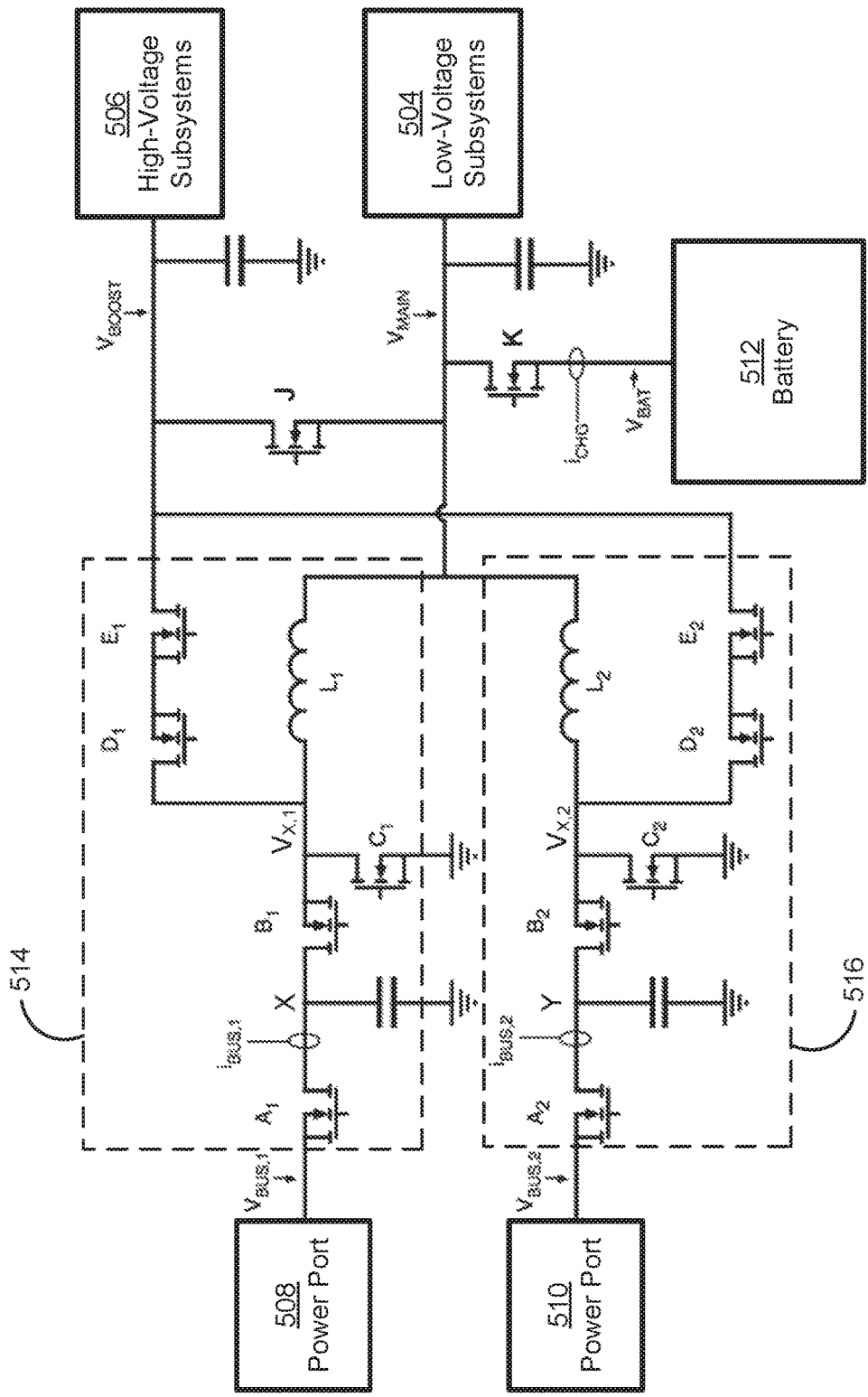
FIG. 5A shows an exemplary charging system for a portable electronic device in accordance with the disclosed embodiments.

FIG. 5A shows an exemplary charging system for a portable electronic device in accordance with the disclosed embodiments. In particular, FIG. 5A shows the charging circuit of FIG. 3 with each of bidirectional switchers 314-316 implemented as bidirectional switchers 514-516 including SIDO boost converters (as described above with respect to FIG. 4A). The charging system of FIG. 5A may support two bidirectional power ports 508-510, powering of one or more low-voltage subsystems 504 from power ports 508-510 and/or an internal battery 512, and a boosted rail to power one or more high-voltage subsystems 506 with a voltage requirement that is higher than the minimum operating voltage of internal battery 512. The charging system of FIG. 5A uses 12 power FETs and two inductors and is approximately half the size of the traditional circuit of FIG. 2. Moreover, the charging system of FIG. 5A is capable of charging battery 512 and powering low-voltage subsystems 504 and high-voltage subsystems 506 from both power ports 508-510 at the same time if two power sources (e.g., devices characterized as external batteries and/or power supplies, etc.) are connected to power ports 508-510.

As shown in FIG. 5A, the charging system includes two bidirectional switchers 514-516 connected at both low-voltage subsystems 504 and high-voltage subsystems 506. A first bidirectional switcher 514 is connected to power port 508 (at voltage node $V_{BUS,1}$) and has an inductor $L_1$ and FETs that are sub-indexed with the label 1: $A_1$, $B_1$, $C_1$, $D_1$, and $E_1$. A second bidirectional switcher 516 is connected to power port 510 (at voltage node $V_{BUS,2}$) and has an inductor $L_2$ and FETs that are sub-indexed with the label 2: $A_2$, $B_2$, $C_2$, $D_2$, and $E_2$. FET K connects battery 512 to low-voltage subsystems 504 (at voltage node $V_{MAIN}$), and FET J connects low-voltage subsystems 504 to high-voltage subsystems 506 (at voltage node $V_{BOOST}$).

In some instances, the charging system measures some or all of the voltages at $V_{BUS,1}$, $V_{BUS,2}$, $V_{BOOST}$, $V_{MAIN}$, and $V_{BAT}$ and the current $i_{BUS,1}$ through FET $A_1$, current $i_{BUS,2}$ through FET $A_2$, and current $i_{CHG}$ through FET K. The currents of inductors $L_1$ and $L_2$ may be measured for control, which may be performed in series with each inductor or in the respective switching FETs B, C, and E when the FETs are enabled.

In the exemplary charging system of FIG. 5A, the voltage at the power port (for example, power port 510) may always be higher than the voltage of the low-voltage subsystem 504. The charging system of FIG. 5A includes four modes of each power port that may be represented by the following: a power supply connected, an external battery connected, an external accessory connected, or nothing connected. Moreover, battery 512 may be in a high-voltage state, a low-voltage state, or an under-voltage state. The high-voltage state indicates that the internal battery voltage $V_{BAT}$ is higher than the voltage requirement of high-voltage subsystems 506, or $V_{BOOST,MIN}$. In the high-voltage state, battery 512 can directly power both low-voltage subsystems 504 and high-voltage subsystems 506. The low-voltage state indicates that $V_{BAT}$ is between the voltage requirement of low-voltage subsystems 504, or $V_{MAIN,MIN}$, and the voltage requirement of high-voltage subsystems 506. In the low-voltage state, battery 512 can directly power low-voltage subsystems 504, but the battery voltage must be boosted above $V_{BOOST,MIN}$ to power high-voltage subsystems 506. In the under-voltage state, the battery voltage may be below the voltage requirements of both low-voltage subsystems 504 and high-voltage subsystems 506, or may be above the voltage requirement of the low-voltage system, but at or below the minimum operating voltage of the device.

The positions of FETs A and B for each bidirectional switcher may be exchanged, with FET B closer to the corresponding power port and FET A closer to the corresponding inductor L. Particularly, when FET's $A_1$ and $B_1$ are exchanged, the drain terminal of FET $A_1$ is connected to node X and source terminal of FET $A_1$ is connected to voltage node $V_{x1}$ while the drain terminal of FET $B_1$ is connected to node X and the drain terminal of FET $B_1$ is connected to power port 508. Similarly, when FET's $A_2$ and $B_2$ are exchanged, the drain terminal of FET $A_2$ is connected to node Y and source terminal of FET $A_2$ is connected to voltage node $V_{x2}$ while the drain terminal of FET $B_2$ is connected to node Y and the drain terminal of FET $B_2$ is connected to power port 510. However, FET A may provide reverse voltage and current protection by preventing negative voltages from an incorrectly designed device connected to the power port from reaching FET B. In addition, the bi-directional current $i_{BUS}$ may be more accurately measured through the non-switching FET A filtered by the capacitance between FETs A and B. To support a high-voltage power port, FET A does not need to be a higher voltage FET, but FET B and C may be required to be higher-voltage FETs as the voltage across these FETs would see the entire voltage swing from the power port voltage to ground.

Similarly, the positions of FETs D and E for each bidirectional switcher could be exchanged. Particularly, when FET's $D_1$ and $E_1$ are exchanged, the drain terminal of FET $D_1$ is connected to high-voltage subsystem 506 and the drain terminal of FET $E_1$ is connected to voltage node $V_{x1}$ while the source terminals of FET's $D_1$ and $E_1$ are connected to each other. Similarly, when FET's $D_2$ and $E_2$ are exchanged, the drain terminal of FET $D_2$ is connected to high-voltage subsystem 506 and the drain terminal of FET $E_2$ is connected to voltage node $V_{x2}$ while the source terminals of FET's $D_2$ and $E_2$ are connected to each other. However, by placing FET D next to the corresponding inductor, only FET D is required to be a higher-voltage FET to protect against a high voltage from the corresponding power port. While the voltage of high-voltage subsystems 506 $V_{BOOST}$ is boosted, such a voltage is typically no higher than the maximum battery voltage, which allows FET E to be a lower-voltage FET.

As mentioned above, FET K may be used to facilitate charging and discharging of the internal battery 512. The behavior of FET K may depend on the state of battery 512, in terms of both voltage and charging. When the battery is charging (e.g., if an external power source is available such as through one or both power ports 508-510), FET K may be controlled to provide a target voltage at $V_{BAT}$, and to charge battery 512 with a voltage limit of $V_{BAT,MAX}$ and a current limit of $i_{CHG,MAX}$. In some instances, FET K may be disabled to place battery 512 in a non-charging state (e.g., when battery 512 is fully charged and has reached the $V_{BAT,MAX}$ voltage limit). Finally, FET K may allow for discharging of battery 512 (e.g., when no power supply or external battery is connected to the power ports, or where the external devices cannot provide sufficient power to power the portable electronic device).

For example, FET K may act as an ideal diode if a power source is available and battery 512 is in the non-charging state. To prevent discharge of battery 512, the control circuit may attempt to control the voltage measured at $V_{MAIN}$ to be higher than the measured battery voltage $V_{BAT}$. If the control circuit cannot control $V_{MAIN}$ to be higher than $V_{BAT}$, the control circuit may enable FET K as an ideal diode to allow current to flow unimpeded from battery 512 to low-voltage subsystems 504.

While battery 512 is charging in a low-voltage state or a high-voltage state, FET K may be fully enabled to connect low-voltage subsystems 504 directly to the charging battery 512 with the $V_{BAT,MAX}$ voltage limit and the current limit $i_{CHG,MAX}$. If battery 512 is charging in an under-voltage state, FET K may be operated linearly to keep the voltage on low-voltage subsystems 504 higher than the voltage requirement of low-voltage subsystems 504, or $V_{MAIN,MIN}$.

If no external power source is available, battery 512 may be discharging to power the portable electronic device. If battery 512 discharges in the low-voltage or high-voltage state, FET K may be fully enabled to directly power low-voltage subsystems 504 from battery 512. If battery 512 is in the under-voltage state, the portable electronic device will switch off, since the battery voltage is too low to power low-voltage subsystems 504. While the device is switched off, all FETs may be disabled, awaiting detection of a power source.

In some instances, battery 512 may be used to directly power high-voltage subsystems 506. For example, in some instances the behavior of FET J may depend only on the voltage state of battery 512. If the battery 512 is in the high-voltage state, FET J may be enabled to directly connect battery 512 to both low-voltage subsystems 504 and high-voltage subsystems 506, since $V_{BAT}$ is higher than $V_{BOOST,MIN}$. If the battery 512 is in low-voltage or under-voltage state, FET J may be disabled, and the voltage for high-voltage subsystems 506 is provided by one or both bidirectional switchers. It should be appreciated that the charging systems described here need not include FET J connecting the high-voltage subsystems 506 and low-voltage subsystems 504, such that the high-voltage subsystems 506 are always powered by one or both bidirectional switchers. In these instances, some efficiency may be lost when the battery voltage is high enough to power the high-voltage subsystems directly, but the control circuit may provide control without distinguishing between high- and low-battery voltage states, with the behavior of the charging system identical to the behavior in the low-voltage state, when FET J would be disabled.

Figure 5B:
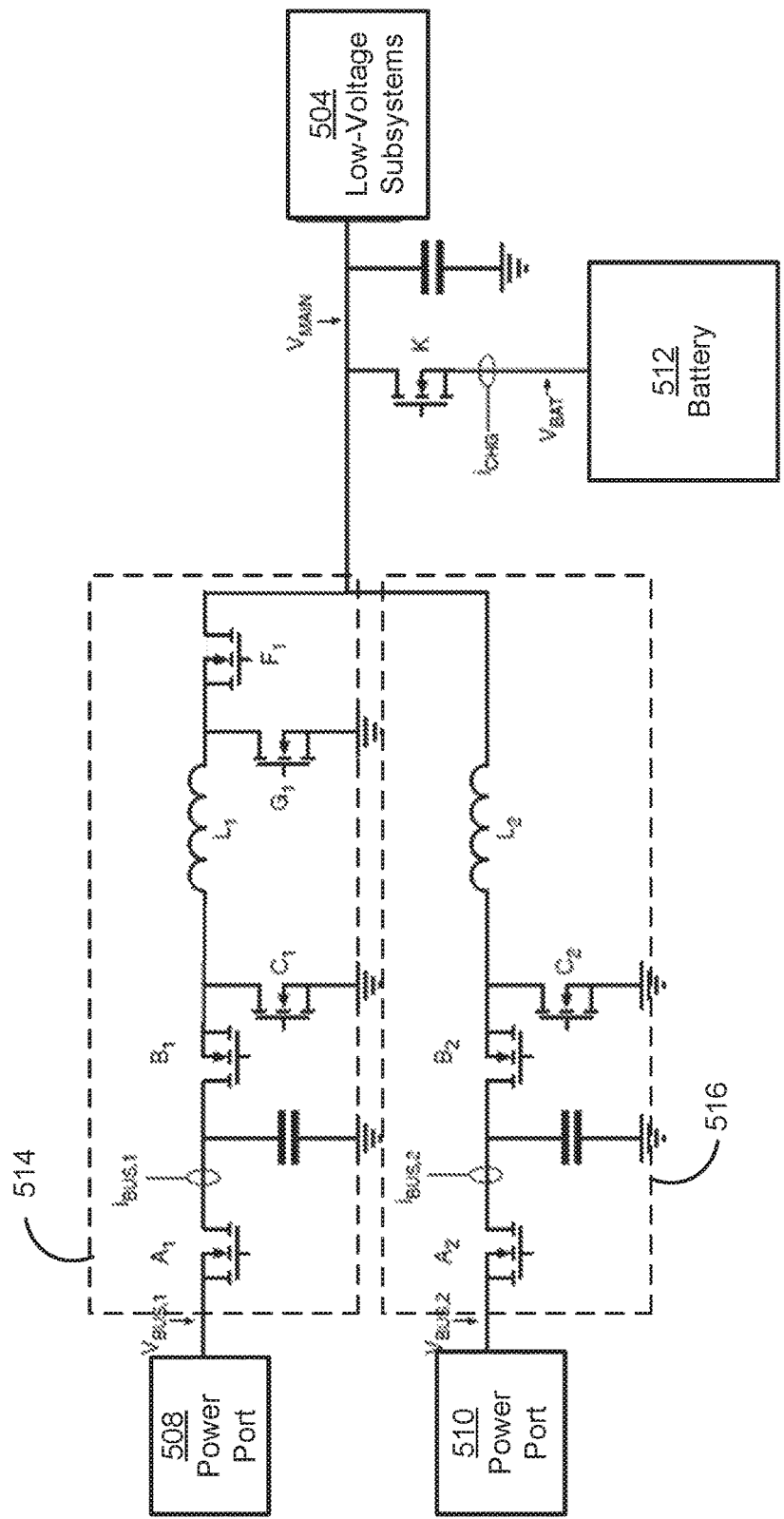
FIG. 5B shows an exemplary charging system for a portable electronic device in accordance with the disclosed embodiments.

For systems that do not require a high-voltage subsystem or do not provide power to the high-voltage subsystem using a separate circuit, then the charging system of FIG. 3 may be implemented as the charging system shown in FIG. 5B. The bidirectional switchers 514-516 in FIG. 5B may connect the power ports 508-510 to only the low-voltage subsystems 504. The bidirectional switchers shown in FIG. 4A, FIG. 4B, and FIG. 4C, can also be simplified to the bidirectional switcher of FIG. 5B. Particularly, SIDO boost converter of FIG. 4A may be implemented as the bidirectional switcher 516 of FIG. 5B by removing FETs D, E and the capacitance on the high-voltage subsystems 406 in bidirectional switcher 422 of FIG. 4A, while bidirectional switcher 424 of FIG. 4B may be implemented as the bidirectional switcher 514 of FIG. 5B by removing FETs D, E and the capacitance on the high-voltage subsystem 406 in bidirectional switcher 424 of FIG. 4B. Similarly, the bidirectional switcher 426 of FIG. 4C may be implemented in the charging system of FIG. 5B by removing DETs D, E and the capacitance on the high-voltage subsystems 406 in bidirectional switcher 426 of FIG. 4C. Control of the switchers in FIG. 5B may be the same as the control of the switchers in FIG. 3 with the internal battery 512 in the high-voltage battery state.

Figure 5C:
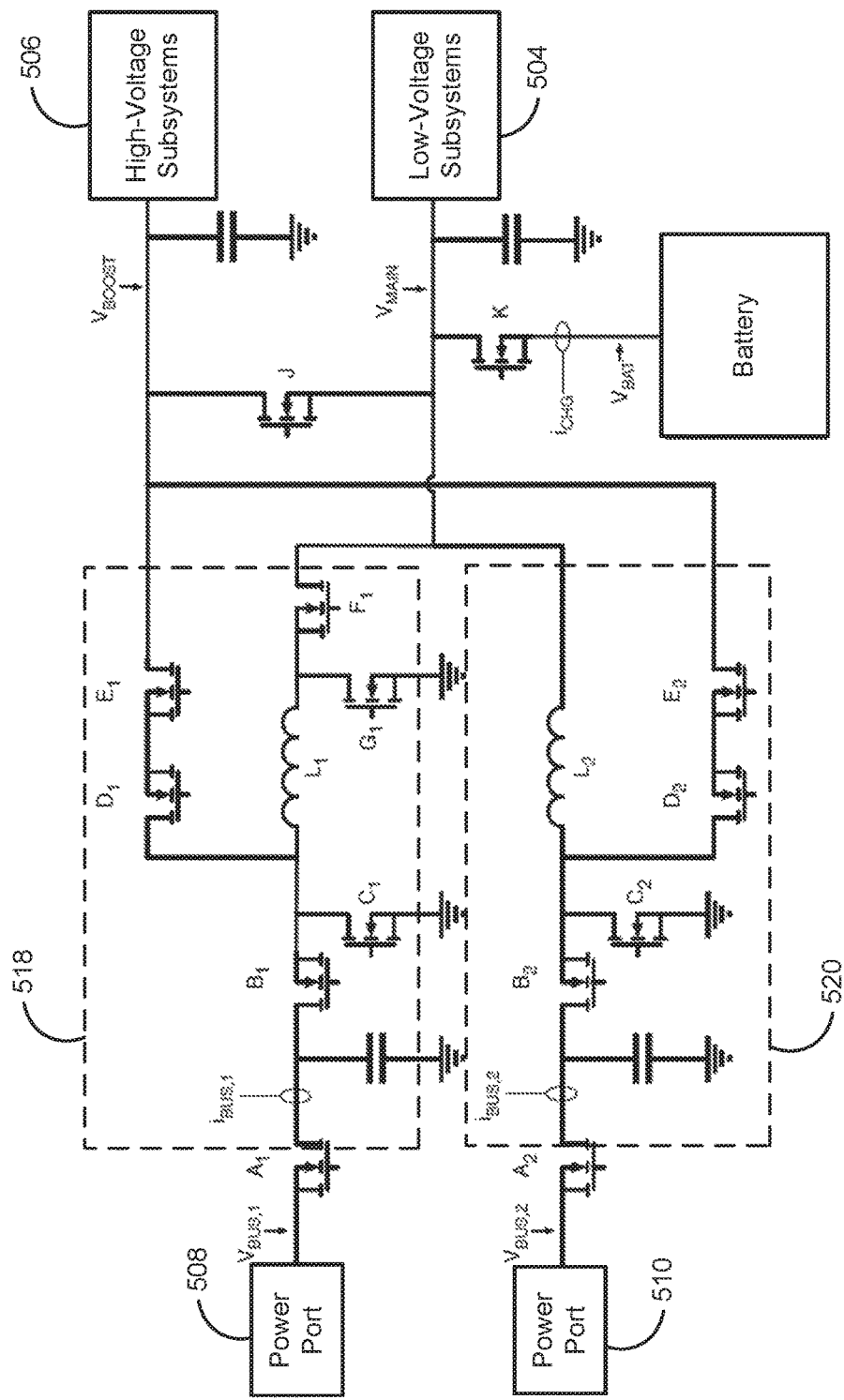
FIG. 5C shows an exemplary charging system for a portable electronic device in accordance with the disclosed embodiments.

FIG. 5C shows an exemplary charging system for a portable electronic device in accordance with the disclosed embodiments. FIG. 5C is substantially similar to the charging circuit of FIG. 5A with bidirectional switchers 518-520 connected at both low-voltage subsystems 504 and high-voltage subsystems 508. Bidirectional switcher 520 may be implemented as a SIDO boost converter of FIG. 4A. However, bidirectional switcher 518 is implemented as a SIDO buck-boost converter that was shown and described in reference to FIG. 4B while the rest of the components of FIG. 5C remain substantially the same as FIG. 5A. It should be appreciated that the SIDO buck-boost converter of bidirectional switcher 518 may be operated as a SIDO boost converter by turning FET $F_1$ is ON and FET $G_1$ is OFF, and operating FET's $A_1$, $B_1$, $C_1$, $D_1$ and $E_1$ the same as a SIDO boost converter would be operated, such as described in more detail below. In the charging systems of FIGS. 5B and 5C, the bidirectional switcher may boost power from power port 508 to low-voltage subsystems 504 or buck power from power port 508 to low-voltage subsystems 504. Therefore, the charging system of FIGS. 5B-5C may include additional modes at power port 508 such as accessory low voltage or power supply low-voltage in addition to the modes of charging system described above with respect to FIG. 5A.

Bidirectional Switcher Operating Modes

The bidirectional switchers described here may be operated in a plurality of different modes depending on the connection state of the power ports and, in some instances, the battery state of the internal battery of the portable electronic device. In some instances, during operation of the charging system, a bidirectional switcher can be operated in one of a plurality of different modes, which depends primarily upon the mode of power ports and the voltage state of battery. Each bidirectional switcher mode determines the behaviors of the corresponding FETs (e.g., FETs A, B, C, D, and E in FIG. 4A, or FETs A-G in FIG. 4B), which in turn control the current flowing through the corresponding inductor L.

For the purposes of discussion, positive current flow through an inductor of the bidirectional switchers 422-426 discussed above with respect to FIGS. 4A-4C is defined as flowing from low-voltage subsystems (voltage node $V_{MAIN}$) to the switching node $V_X$ between the corresponding FETs B, C, and D. Positive current flow through FETs A and B is defined as current flowing from the switching node $V_x$ to the corresponding power port (voltage node $V_{BUS}$). Positive current flow through FETs D and E is defined as current flowing from the switching node to high-voltage subsystems 506 (voltage node $V_{BOOST}$). Therefore, charging current flowing from each power port to low-voltage subsystems 504 is considered negative.

Operating modes of single bidirectional switchers are described below with respect to FIGS. 6, 7A-7E, 8, 9A-9E, 10A-10F and 11A-11D. Exemplary modes discussed here include a disabled mode, a boost-accessory mode, a buck-boost accessory mode, a buck-boost main mode, a boost-internal mode, a buck mode, a buck accessory mode, a boost-main mode, a single-inductor dual-output (SIDO)

mode, a SIDO buck-boost mode, a single-inductor sequential-control (SISC) mode, and a SISC boost-boost mode. Each switcher mode is described with respect to the bidirectional switchers of FIGS. 4A and 4B. Control descriptions associated with the modes are based on current-mode control, where the outputs of the servo controllers determine the peak or valley inductor currents. Those skilled in the art will appreciate that other control techniques, such as slope compensation, adaptive dead-time control, voltage-mode control, and/or pulse-frequency modulation, may also be used with the modes.

Disabled Switcher Mode

Figure 6:
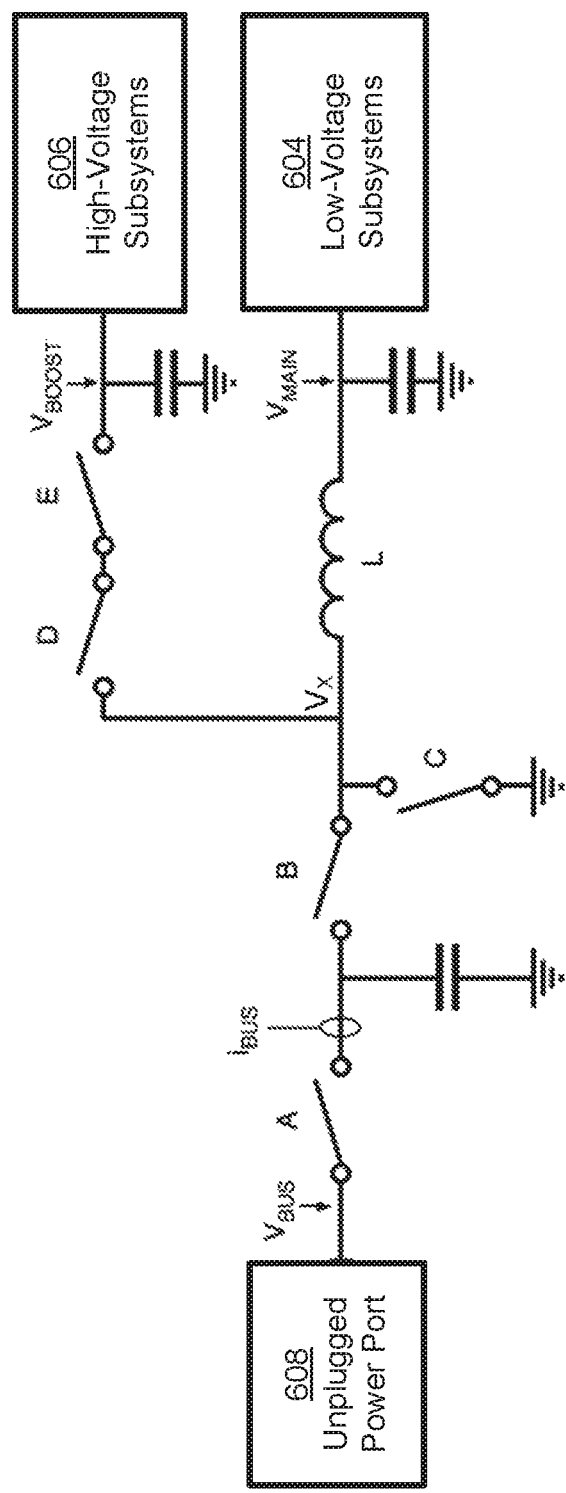
FIG. 6 shows a single switcher mode for a charging system in accordance with the disclosed embodiments.

In a disabled switcher mode, the bidirectional switcher is set to prevent power from being transferred through the bidirectional switcher. This may occur in instances where the power port connected to the bidirectional switcher is in an unplugged connection state. FIG. 6 shows a single switcher mode for a charging system in accordance with the disclosed embodiments. More specifically, FIG. 6 shows a disabled switcher mode for the bidirectional switcher 422 of FIG. 4A, which is connected to an unplugged power port 608, one or more low-voltage subsystems 604, and one or more high-voltage subsystems 606. In the disabled mode, all FETs A-E in the switcher are disabled, and no current can flow through the inductor L. Similarly, the bidirectional switcher 426 of FIG. 4B in a disabled switcher mode may have all FETs A-G in the bidirectional switcher 426 may be disabled and no current can flow through the inductor L.

Boost-Accessory Switcher Mode

Figure 7A:
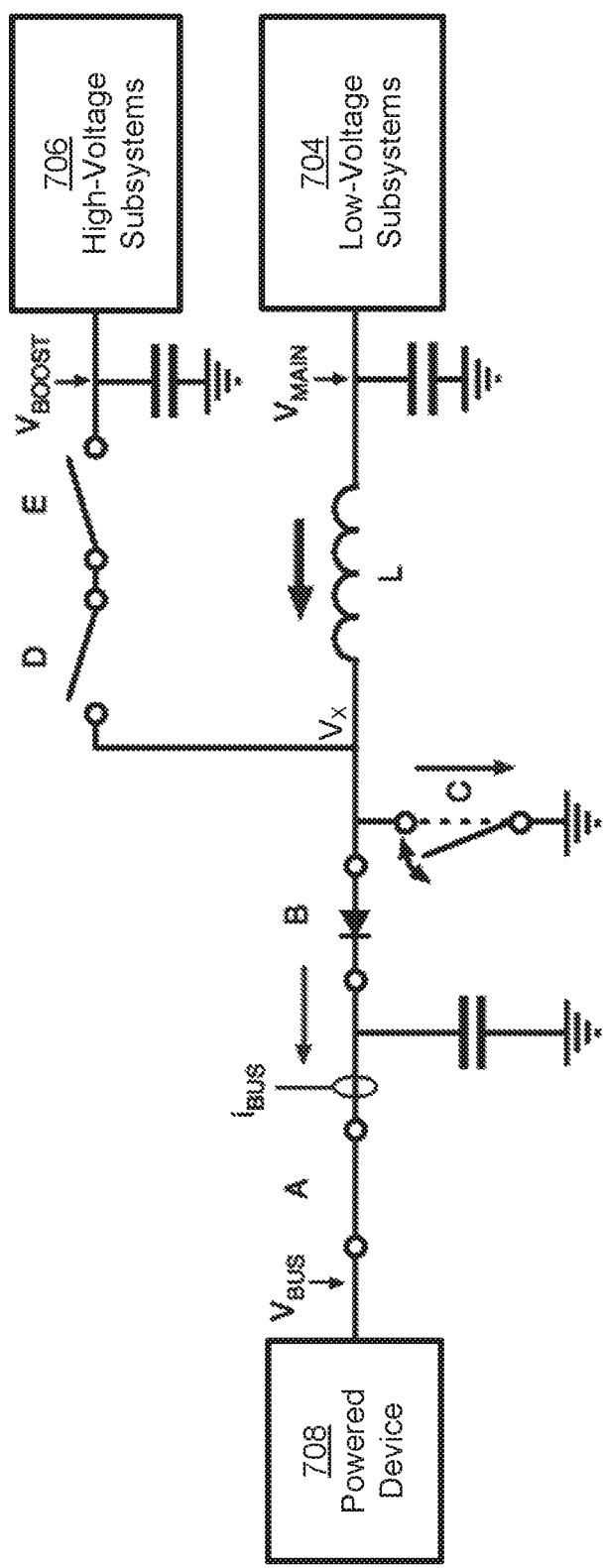
FIG. 7A shows a single switcher mode for a charging system in accordance with the disclosed embodiments.

A bidirectional switcher may be operated in a boost-accessory switcher mode in instances where a bidirectional switcher is used to take power from the $V_{MAIN}$ voltage node and provide it to the power port connected to the bidirectional switcher. For example, the boost-accessory switcher mode may be used to provide power to the power port when the power port is in an external battery (when the external battery draws power from the portable electronic device) or external accessory connection state. More specifically, FIG. 7A shows a bidirectional switcher 422 of FIG. 4A in a boost-accessory mode. In the boost-accessory mode, the bidirectional switcher boosts power from one or more low-voltage subsystems 704 to a powered device 708 (e.g., an external accessory or an external battery) coupled to the corresponding power port.

The boost function in the boost-accessory mode is initiated by enabling FET C, which allows current to flow from low-voltage subsystems 704 through the inductor L. Once the inductor current reaches a given current $i_{ACC,PK}$, FET C is disabled, and FET B is enabled to act as an ideal diode and allow the inductor current to flow to the powered device 708, which may be connected at a higher voltage. The cycle of switching FETs C and B may be repeated (and in some instances may be repeated at a fixed frequency with period $T_S$). FET A may remain enabled to allow current to flow from the inductor to powered device 708 via power port, and FETs D and E may remain disabled to prevent current from flowing from the inductor to one or more high-voltage subsystems 706.

In some instances, the transition from disabling FET C to enabling FET B occurs when the inductor current, measured either in series with the inductor or through FET C, reaches an adjustable $i_{ACC,PK}$ current. The $i_{ACC,PK}$ current threshold may be the output of a servo controller that simultaneously maintains the following limits:

$V_{BUS} \leq V_{ACC,MAX}$ $i_{BUS} \leq i_{ACC,MAX}$ $V_{MAIN} \geq V_{MAIN,MIN}$ In the above expressions, $V_{ACC,MAX}$ is the maximum voltage target of powered device 708 and $i_{ACC,MAX}$ is the maximum current target of powered device 708. The desired boost target is to control $V_{BUS}$ to $V_{ACC,MAX}$, which must be higher than the $V_{MAIN}$ voltage. To prevent powered device 708 from drawing too much current, the $i_{BUS}$ current is limited to the settable $i_{ACC,MAX}$ current, which allows the $V_{BUS}$ voltage to droop if the current limit is reached. To prevent powered device 708 from browning out low-voltage subsystems 704, the bidirectional switcher may also be controlled to prevent $V_{MAIN}$ from drooping below $V_{MAIN,MIN}$ even if the $V_{BUS}$ and $i_{BUS}$ targets are not met.

Figure 7B:
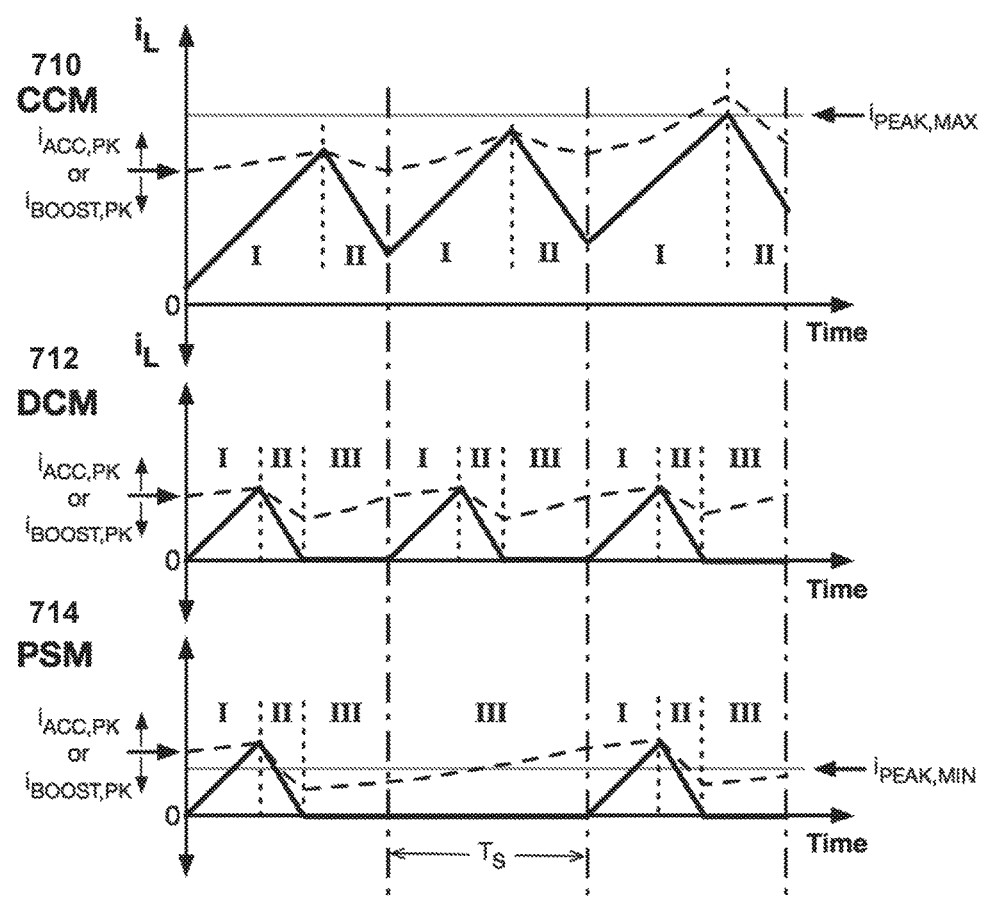
FIG. 7B shows a set of graphs of inductor current for a single switcher mode in accordance with the disclosed embodiments.

FIG. 7B shows a set of graphs of inductor current for the different modes of controlling boost-accessory mode. During Stage I, as shown in the upper graph labeled Continuous Current Mode (CCM) 710, FET C is enabled by a clock edge with period $T_S$, allowing the linearly increasing current to flow from low-voltage subsystems 704 through the inductor. The transition from Stage I to Stage II occurs when the inductor current reaches the servo-controlled $i_{ACC,PK}$ current. In Stage II, FET C is disabled and FET B is enabled, allowing the linearly decreasing inductor current to flow from the inductor to powered device 708 via the power port. When the next clock edge arrives, the cycle may be repeated.

To prevent the inductor current from exceeding the maximum allowed inductor current, the $i_{ACC,PK}$ current is limited to a value represented by $i_{PEAK,MAX}$. To prevent shoot-through current from flowing from powered device 708 to ground during the transitions between Stages I and II, both FET B and FET C may be simultaneously disabled before the stage transition continues.

To improve light-load efficiency, FET B can be designed to work as an active diode by not allowing current to flow in reverse from powered device 708 through the inductor. Such a mode is called Discontinuous Current Mode (DCM) 712, with an inductor waveform shown in the middle graph of FIG. 7B. When the inductor current reaches zero in Stage II, FET B may be turned off, and Stage III of DCM is entered. The inductor current in Stage II can be measured in series with the inductor or through FET B.

To further improve light-load efficiency, a cycle can be skipped when the $i_{ACC,PK}$ current drops below a minimum $i_{PEAK,MIN}$ current at the clock edge, which is labeled as Pulse Skipping Mode (PSM) 714 in the lower graph of FIG. 7B. Since no power is provided to powered device 708, the servo-controlled $i_{ACC,PK}$ current will continue to increase until it eventually rises above the $i_{PEAK,MIN}$ current threshold and triggers another cycle.

FET A may be disabled in Stage I, Stage III, and the transition between Stage III and Stage I, since no current flows to the power port during these stages. FET D may be enabled in Stage I, since no current flows to high-voltage subsystems 706 with FET E disabled and FET C enabled.

Figure 7C:
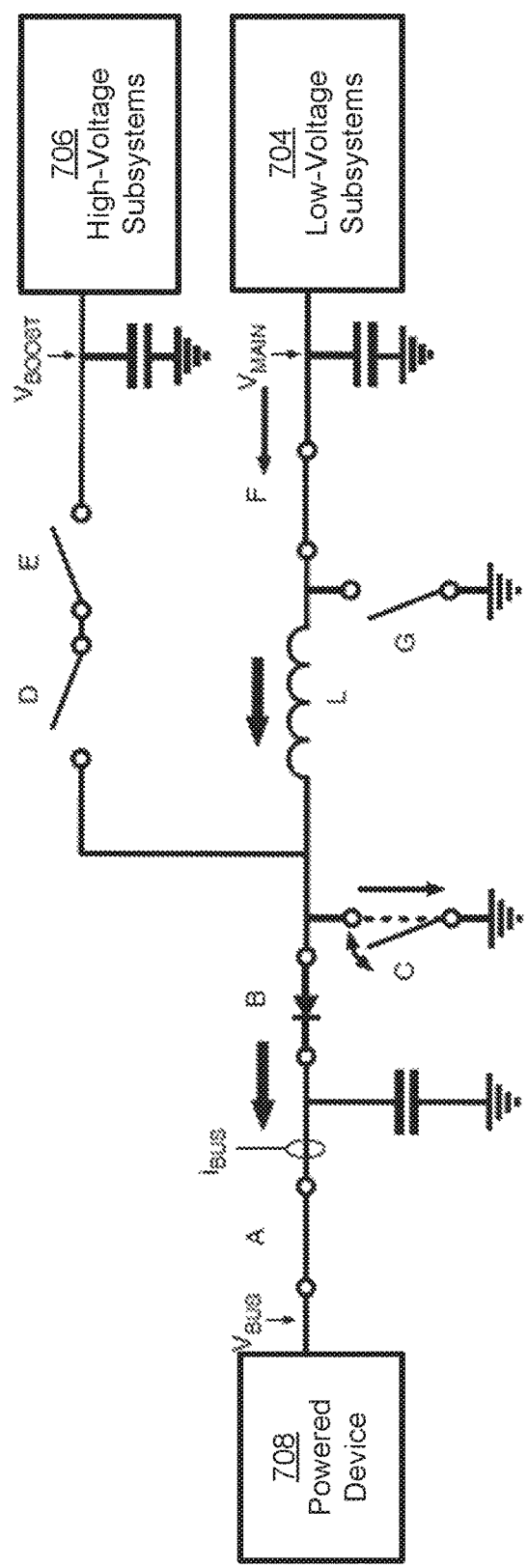
FIG. 7C shows a single switcher mode for a charging system in accordance with the disclosed embodiments.

FIG. 7C shows a bidirectional switcher that is operated in a boost-accessory switcher mode in accordance with the disclosed embodiments. Particularly, FIG. 7C shows a bidirectional switcher with a SIDO buck-boost bidirectional converter of FIG. 4B that may be operated in a boost-accessory switcher mode in instances where a bidirectional switcher is used to take power from the $V_{MAIN}$ voltage node and provide it to powered device 708 at the power port connected to the bidirectional switcher of FIG. 7C. For example, the boost-accessory switcher mode may be used to provide power to the powered device 708 when the power port is in an external battery or external accessory connection state. In the boost-accessory mode, the bidirectional switcher of FIG. 7C boosts power from one or more low-voltage subsystems 704 to powered device 708 (e.g., an external accessory or an external battery) coupled to the corresponding power port. The charging system of FIG. 7C is substantially the same as the charging system of FIG. 7A but includes additional FETs F and G that are operated in the boost-accessory switcher mode, while all other features remain substantially the same as the boost-accessory switcher mode of FIG. 7A. In the boost-accessory switcher mode of FIG. 7C, FET F is enabled (i.e., FET F is ON) and FET G is disabled (i.e., FET G is OFF) while FET's A, B, C, D and E may be operated as was just described in the embodiment of FIG. 7A. Additionally, during operation of the boost-accessory switcher mode, FETs D and E may be controlled to be both OFF at the same time, while FET B may operate as an ideal diode allowing current to pass to, but not from, the powered device 708 connected to power port. By operating FET B as an ideal diode, the removal of a powered device 708 at the power port 708 can be detected as a drop in the $V_{BUS}$ voltage. While an internal battery is not shown in FIG. 7A or 7C, it should be appreciated than internal battery may provide power to the voltage node $V_{MAIN}$ during a boost-accessory switcher mode.

Buck-Boost Accessory Switcher Mode

Figure 7D:
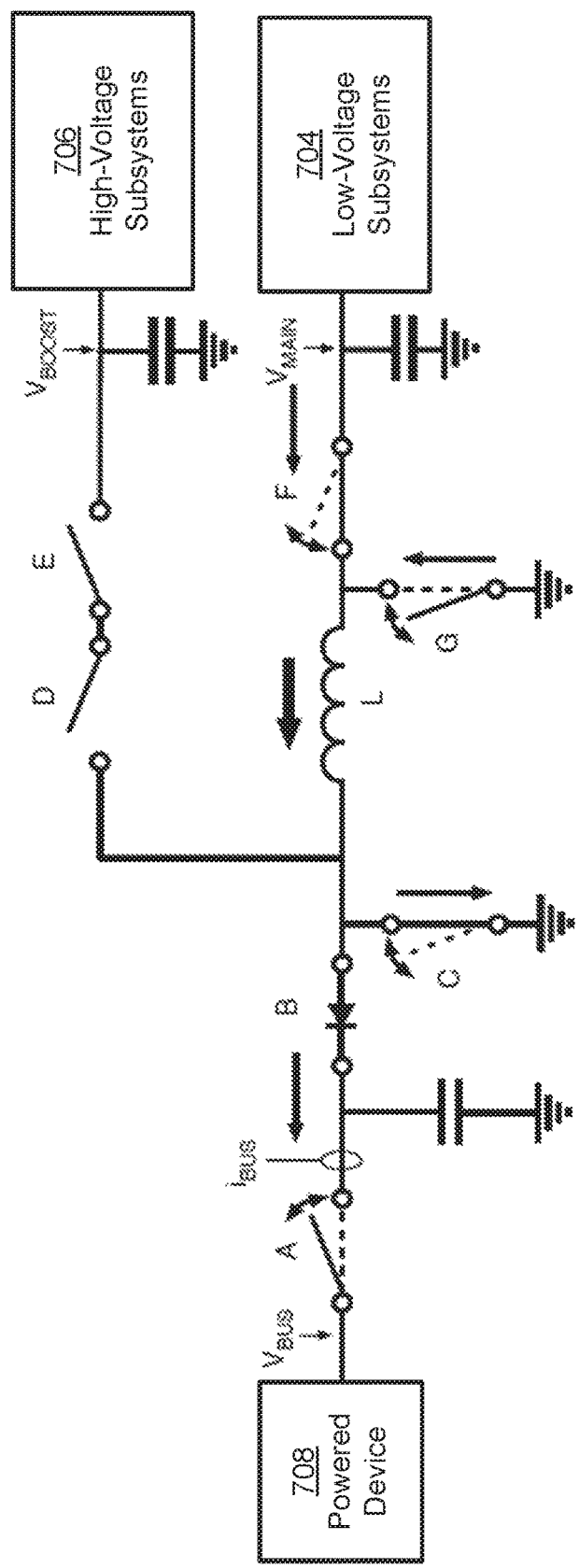
FIG. 7D shows a single switcher mode for a charging system in accordance with the disclosed embodiments.

A bidirectional switcher may be operated in a buck-boost accessory switcher mode in instances where a bidirectional switcher is used to take power from the $V_{MAIN}$ voltage node and provide it to the power port connected to the bidirectional switcher, but when $V_{BUS}$ and $V_{MAIN}$ are close in voltage levels and could pass over each other (e.g., voltage at powered device 708 is near the voltage at $V_{MAIN}$). For example, the buck-boost switcher mode may be used to either buck power or boost power to the power port when the power port is an external battery (when the external battery draws power from the portable electronic device) or external accessory connection state. FIG. 7D shows a charging system with a SIDO buck-boost converter of FIG. 4B that may be operated in a buck-boost accessory mode. In the buck-boost accessory mode, the bidirectional switcher of FIG. 7D may buck power from one or more low-voltage subsystems 704 to a powered device 708 (e.g., a powered device or an external accessory) coupled to the corresponding power port or may boost power from one or more low-voltage subsystems 704 to a powered device 708 coupled to the corresponding power port, such as for charging an external battery connected to the power port. The buck-boost accessory mode facilitates bucking and boosting from low-voltage subsystem 704 depending on which of voltages $V_{BUS}$ and $V_{MAIN}$ are higher.

The buck-boost functionality may be initiated by enabling FET's F and C, while disabling all other FETs. FET's D and E are disabled to remove high-voltage subsystem 706 from the charging system. Enabling FET's F and C allows current to flow from low-voltage subsystems 704 through the inductor L. Once the inductor current reaches a given current $i_{ACC,PK}$, FET's G, A and B are enabled while other FET's are maintained in a disabled state to allow inductor current to flow to powered device 708 at power port. FET B may act as an ideal diode to allow the inductor current to flow to the powered device 708 at power port. The buck-boost accessory mode may allow for a smoother transition of currents between the low-voltage subsystems 704 and an external battery connected to powered device 708.

Buck-Boost Main Mode

Figure 7E:
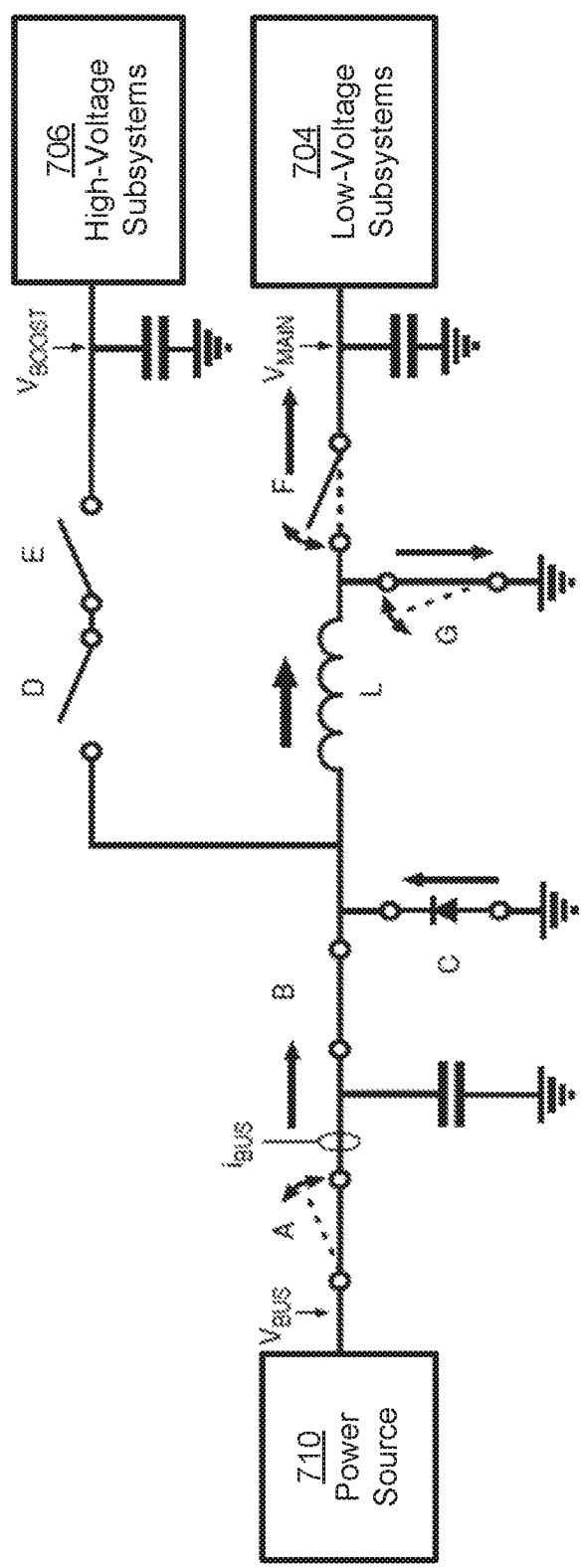
FIG. 7E shows a single switcher mode for a charging system in accordance with the disclosed embodiments.

A bidirectional switcher may be operated in a buck-boost main mode in instances where a bidirectional switcher is used to take power from power source connected to a power port at node $V_{BUS}$ and provide power to the $V_{MAIN}$ voltage node, but when $V_{BUS}$ and $V_{MAIN}$ are close in voltage levels and could pass over each other. For example, a power source 710 such as an external battery may be used to provide power to the $V_{MAIN}$ voltage node. FIG. 7E shows a charging system with the bidirectional switcher 424 of FIG. 4B operating in a buck-boost main mode. In this buck-boost main mode, the bidirectional switcher of FIG. 7E boosts power from power source 710 (e.g., an external battery coupled to a power port) to one or more low-voltage subsystems 704. The buck-boost main mode facilitates boosting power from a power source 710 at the power port when voltages of $V_{BUS}$ and $V_{MAIN}$ are close in voltage levels and could pass over each other.

The buck-boost main functionality may be initiated by enabling FET's G and A, while disabling all other FETs. For example, FET's D and E may be disabled to remove high-voltage subsystem 706 from the charging system. Enabling FET's G and A allows current to flow from an external battery connected to power source 710 to inductor L and charge the inductor L. Once the inductor current reaches a given current $i_{ACC,PK}$, FET's F and C may be enabled while other FET's are disabled to allow inductor current from inductor L to flow into low-voltage subsystem 704. FET C may act as an ideal diode to allow the inductor current from inductor L to flow to the low-voltage subsystem 704. The buck-boost main mode implementing the boost function may allow for a smoother transition of currents between the low-voltage subsystems 704 and power source 710 (e.g., an external battery) connected to the power port.

Boost-Internal Switcher Mode

Figure 8:
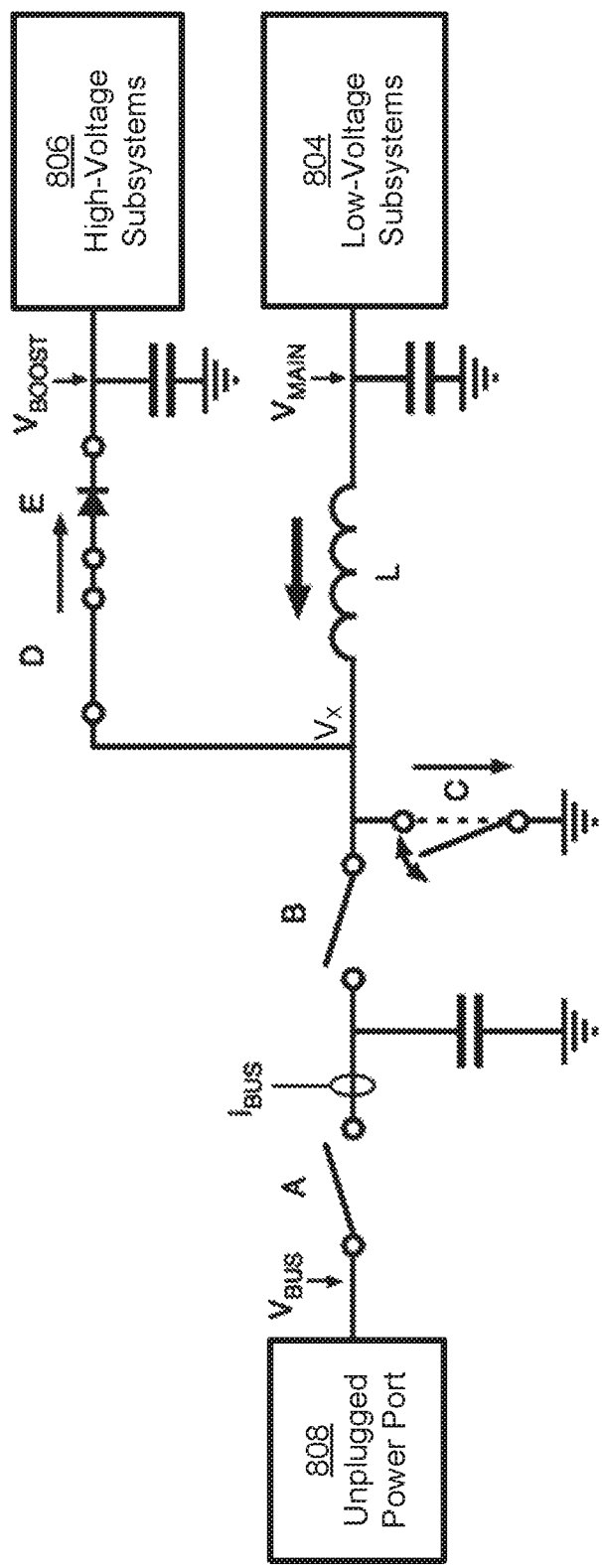
FIG. 8 shows a single switcher mode for a charging system in accordance with the disclosed embodiments.

A bidirectional switcher may be operated in a boost-internal switcher mode in instances where a bidirectional switcher is used to take power from the $V_{MAIN}$ voltage node and provide it to the power port connected to the bidirectional switcher. FIG. 8 shows a single switcher mode for a charging system in accordance with the disclosed embodiments. More specifically, FIG. 8 shows the bidirectional switcher 422 of FIG. 4A in a boost-internal mode. In the boost-internal mode, the bidirectional switcher boosts power from one or more low-voltage subsystems 804 to one or more high-voltage subsystems 806 with no power coming in or out of an unplugged power port 808.

The boost function of the boost-internal mode may be initiated by enabling FET C, which allows current to flow from low-voltage subsystems 804 through the inductor L. Once the inductor current reaches a target current $i_{BOOST,PK}$, FET C is disabled, and FET E is enabled to act as an ideal diode and allow current to flow to high-voltage subsystems 806 at a higher voltage. The cycle of switching FETs C and E may be repeated (and in some instances may be repeated at a fixed frequency with period $T_S$). FET D may remain enabled to allow current to flow from the inductor to high-voltage subsystems 806, and FETs A and B may remain disabled to prevent current from entering or leaving unplugged power port 808.

The transition from disabling FET C to enabling FET E occurs when the inductor current, measured either in series with the inductor or through FET C, reaches an adjustable $i_{BOOST,PK}$ current. The $i_{BOOST,PK}$ current threshold is the output of a servo controller that simultaneously maintains the following limits:

$$V_{BOOST} \leq V_{BOOST,TGT}$$

$$V_{MAIN} \geq V_{MAIN,MIN}$$

In the above expressions, $V_{BOOST,TGT}$ is the target voltage of high-voltage subsystems 806, and the $V_{MAIN}$ limit prevents a high load on high-voltage subsystems 806 from browning out low-voltage subsystems 804 by drooping the $V_{BOOST}$ voltage if necessary.

The inductor current behavior and FET control in the boost-internal mode may be the same as in the boost-accessory mode, except that FET E is enabled instead of FET B in Stage II, and the inductor current for detecting the DCM zero-current threshold in the transition to Stage III can be measured through FET E instead of FET B. FET D may be disabled in Stage III and the transition between Stage II and Stage I, since no current flows to high-voltage subsystems 806 during these stages.

It should be appreciated that the bidirectional switcher of FIG. 8 may be implemented with the SIDO buck-boost converter of FIG. 4B by turning FET F ON and FET G OFF, and operating FET's A, B, C, D and E the same as the bidirectional switcher 422 of FIG. 4A would be operated in the boost-internal mode such as described in more detail above in FIG. 8.

Buck Switcher Mode

Figure 9A:
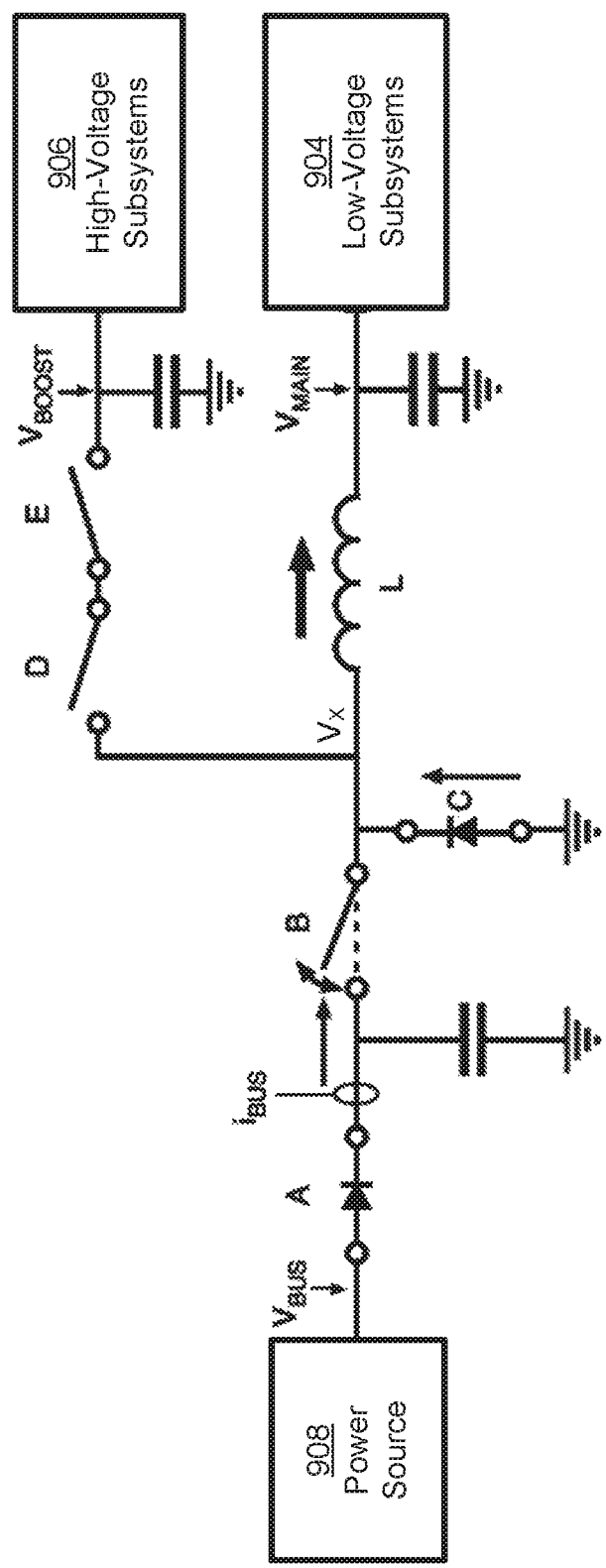
FIG. 9A shows a single switcher mode for a charging system in accordance with the disclosed embodiments.

A bidirectional switcher may be operated in a buck switcher mode in instances where the bidirectional switcher is used to take power from a power source (e.g., a power supply or an external battery) connected to a power port and provide a voltage to $V_{MAIN}$ voltage node via the bidirectional switcher. FIG. 9A shows a single switcher mode for a charging system in accordance with the disclosed embodiments. More specifically, FIG. 9A shows the bidirectional switcher 422 of FIG. 4A operating in a buck switcher mode. In this mode, the bidirectional switcher bucks power from a power source 908 to one or more low-voltage subsystems 904. Power source 908 may be a power supply (e.g., a power adapter) or external battery coupled to a power port to which the bidirectional switcher is connected.

In the buck-switcher mode, FET A operates as an ideal diode allowing current to pass from, but not to, the power port. By operating FET A as an ideal diode, the removal of power source 908 at the power port can be detected as a drop in the $V_{BUS}$ voltage. FET A is controlled by the measured bidirectional $i_{BUS}$ current. If the $i_{BUS}$ current is negative and below a fixed threshold, indicating that current is flowing in from the power port, then FET A is enabled. FET A is disabled otherwise, and FETs D and E are always disabled to prevent current from flowing from the inductor to one or more high-voltage subsystems 906.

The buck function of the buck-switcher mode is initiated by enabling FET B, which allows current to flow from the power port through the inductor L to low-voltage subsystems 904 at a lower voltage. Once the inductor current reaches a target (e.g., a servo-controlled) $i_{VALLEY}$ current, FET B is disabled and FET C, acting as an ideal diode, is then enabled to allow current to flow from the ground side of FET C through the inductor to low-voltage subsystems 904. The cycle of switching FETs B and C may be repeated (and in some instances may be repeated at a fixed frequency with period $T_S$).

The transition from disabling FET B to enabling FET C occurs when the inductor current, measured in series with the inductor or through FET B, reaches an adjustable $i_{VALLEY}$ current, where current flowing from the power port to the inductor is defined as negative. The $i_{VALLEY}$ current threshold is the output of a servo controller that depends on one of four buck mode sub-states: charge, no-charge, primary and secondary. In the charge sub-state, the buck mode controls the voltage and current to the internal battery. The bidirectional switcher charges the battery with a servo controller that adjusts $i_{VALLEY}$ to simultaneously maintain the following limits:

$$V_{BAT} \le V_{BAT,MAX}$$

$$i_{CHG} \le i_{CHG,MAX}$$

In the above expressions, $V_{BAT,MAX}$ is the maximum voltage limit of the internal battery, and $i_{CHG,MAX}$ is the maximum current limit of the internal battery.

In the no-charge sub-state, the buck mode may control the voltage to low-voltage subsystems 904, or $V_{MAIN}$. FET G acts as an ideal diode to prevent charging of the battery, and $i_{VALLEY}$ is adjusted to maintain the following limit:

$$V_{MAIN} \le V_{BAT} + V_{BAT,OFF}$$

In the above expression, $V_{BAT,OFF}$ is a voltage offset to be maintained above the measured battery voltage $V_{BAT}$.

In the primary sub-state, the buck mode pulls as much power as possible from the power port that can be used only with the charge and no-charge sub-states. The primary sub-state occurs only when two power sources are available (e.g., when coupled to both power ports) and the other power source is in the charge or no-charge sub-state. The aim of the primary sub-state is to pull as much power as possible from the attached power source 908 without directly controlling $V_{MAIN}$, $V_{BAT}$, or $i_{CHG}$, which are controlled by the other bidirectional switcher in the buck mode. The power draw of the other bidirectional switcher is minimized by adjusting the $i_{VALLEY}$ current to maintain the following limit:

$$i_{L,PRIMARY} \ge i_{L,BUCK}$$

In the above expression, $i_{L,PRIMARY}$ is the average inductor current for the bidirectional switcher in the primary sub-state, and $i_{L,BUCK}$ is the average inductor current of the other bidirectional switcher in the charge or no-charge sub-state.

In the secondary sub-state, the buck mode balances the current with the charge or no-charge sub-states. Like the primary sub-state, the secondary sub-state occurs only when there are two power sources, and the other power source is in the charge or no-charge sub-state. The aim of the secondary sub-state is to not directly control $V_{MAIN}$, $V_{BAT}$, or $i_{CHG}$, but to balance the current load of the other bidirectional switcher by adjusting the $i_{VALLEY}$ current to maintain the following limit:

$$i_{L,SECONDARY} \le i_{L,BUCK}$$

In the above expression, $i_{L,SECONDARY}$ is the average inductor current for the bidirectional switcher in the secondary sub-state, and $i_{L,BUCK}$ is the average inductor current of the other bidirectional switcher in the charge or no-charge sub-state. For both the primary and secondary sub-states, instead of measuring the average inductor current, the previously generated $i_{VALLEY}$ current thresholds can be used to indicate the current levels to control.

Regardless of the sub-state in the buck mode, the servo controller must also adjust $i_{VALLEY}$ to keep the following additional limits within control:

$$V_{BUS} \ge V_{MAIN} + V_{BUS,OFF}$$

$$i_{BUS} \ge -i_{BUS,MAX}$$

In the above expressions, $V_{MAIN} + V_{BUS,OFF}$ is the minimum allowed voltage to which the input voltage $V_{BUS}$ is allowed to droop, and $i_{BUS,MAX}$ is the maximum allowed current to be pulled from the power port. Since the $i_{BUS}$ current flowing from the power port is defined as negative, the $i_{BUS}$ current is compared to the negative of the positive $i_{BUS,MAX}$ limit.

Figure 9B:
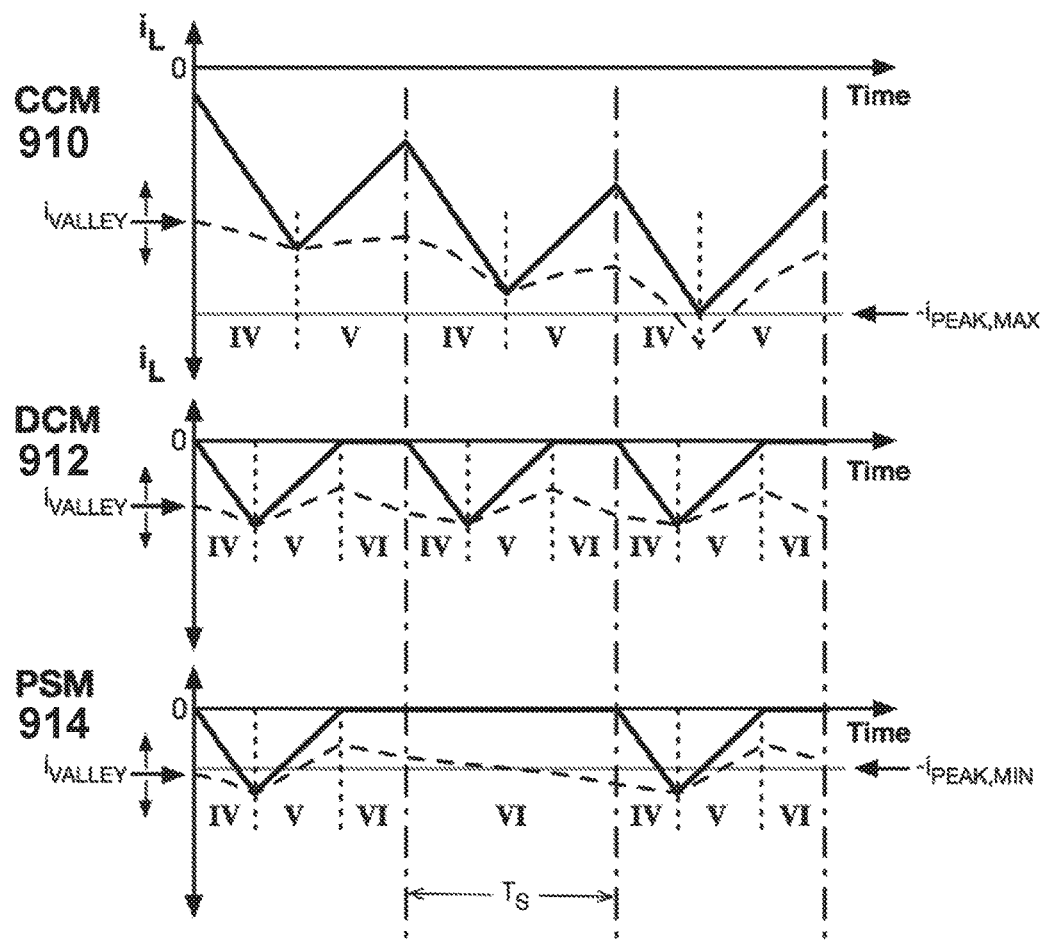
FIG. 9B shows a set of graphs of inductor current for a single switcher mode in accordance with the disclosed embodiments.

FIG. 9B shows a set of graphs of inductor current in the buck mode. During Stage IV, as shown in the upper graph of CCM 910, FET B is enabled by a clock edge with period $T_S$, allowing the linearly decreasing current to flow from the power port to low-voltage subsystems 904 through the inductor. The transition from Stage IV to Stage V occurs when the inductor current reaches the servo-controlled $i_{VALLEY}$ current. In Stage V, FET B is disabled, and FET C is enabled to allow the linearly increasing inductor current to flow from the ground side of FET C to low-voltage subsystems 904. When the next clock edge arrives, the cycle is repeated.

To prevent the inductor current from exceeding the maximum allowed inductor current, the $i_{VALLEY}$ current, which is negative, is limited to a value less negative than $-i_{PEAK,MAX}$. To prevent shoot-through current from flowing from the power port to ground during the transitions between Stage IV and Stage V, both FET B and FET C may be simultaneously disabled before the stage transition continues.

To improve light-load efficiency, FET C can be designed to work as an active diode by not allowing current to flow in reverse from the inductor to ground, as shown in the DCM 912 inductor current waveform in the middle graph of FIG. 9B. In Stage V, when the inductor current reaches zero, FET C is turned off, entering Stage VI. The inductor current in Stage V can be measured in series with the inductor or through FET C.

To further improve light-load efficiency, a cycle can be skipped when the $i_{VALLEY}$ current rises above $-i_{PEAK-MIN}$ at the clock edge, as shown in the lower graph of PSM 914 in FIG. 9B. Since no power is provided to low-voltage subsystems 904, the servo-controlled $i_{VALLEY}$ current will continue to decrease until it is eventually more negative than $-i_{PEAK-MIN}$, which triggers another cycle.

Figure 9C:
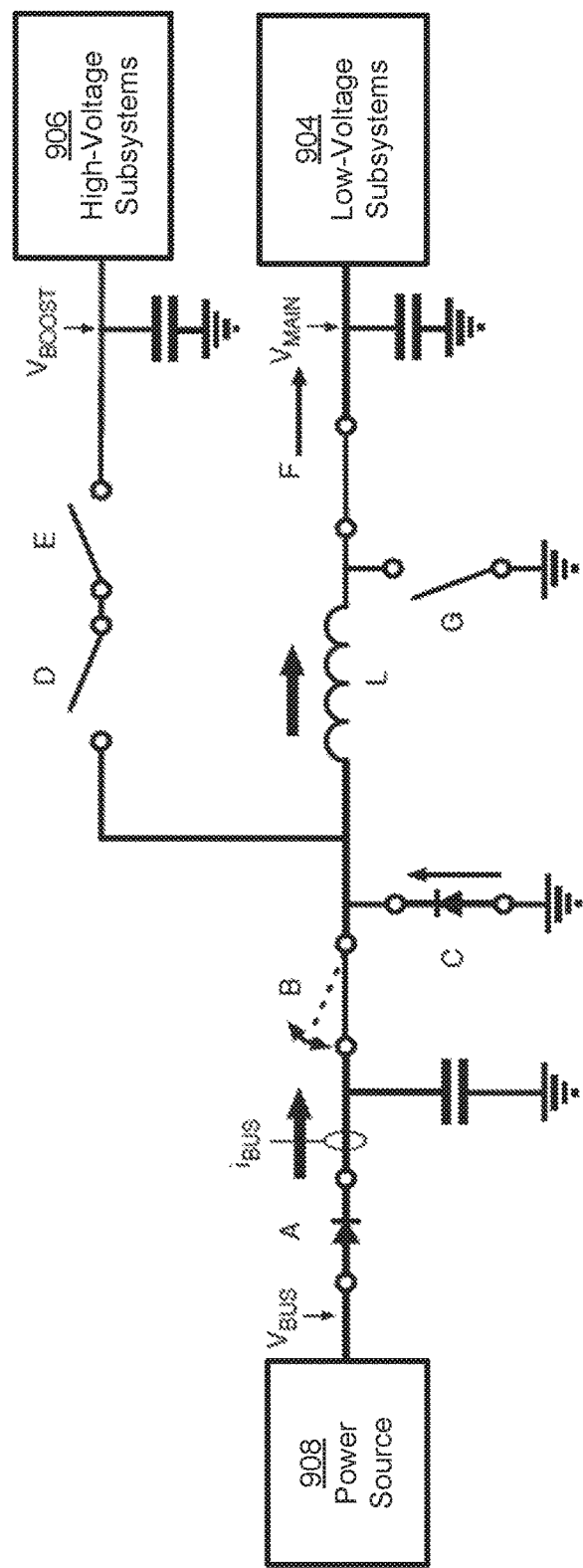
FIG. 9C shows a single switcher mode for a charging system in accordance with the disclosed embodiments.

A bidirectional switcher may be operated in a buck switcher in instances where a bidirectional switcher is used to take power from power source connected to a power port at node $V_{BUS}$ and provide power to the $V_{MAIN}$ voltage node. For example, a power source 908 such as an external battery may be used to provide power to the $V_{MAIN}$ voltage node. FIG. 9C shows a bidirectional switcher mode for a charging system in accordance with the disclosed embodiments. More specifically, FIG. 9C shows a charging system with the bidirectional switcher 424 of FIG. 4B in a buck switcher mode. In this mode, the bidirectional switcher of FIG. 9C may buck power from a power source 908 connected to a power port to one or more low-voltage subsystems 904. Power source 908 may be a power supply (e.g., a power adapter) or external battery coupled to a power port to which the bidirectional switcher 424 of FIG. 4B is connected. The charging system of FIG. 9C may be substantially the same as the charging system of FIG. 9A but includes additional FETs F and G in a buck switcher mode. In the buck switcher mode of FIG. 9C, FET F is ON and FET G is OFF, while FET's A, B, C, D and E may be operated as was just described in the embodiment of single switcher mode of FIG. 9A. Additionally, during single switcher mode operation, FETs D and E may be controlled to be both OFF at the same time, while FET A operates as an ideal diode allowing current to pass from, but not to, the low-voltage subsystems 904. By operating FET A as an ideal diode, the removal of an accessory (e.g. a power source 908) at a power port to which the bidirectional switcher is connected can be detected as a drop in the $V_{BUS}$ voltage.

Buck Accessory Mode

Figure 9D:
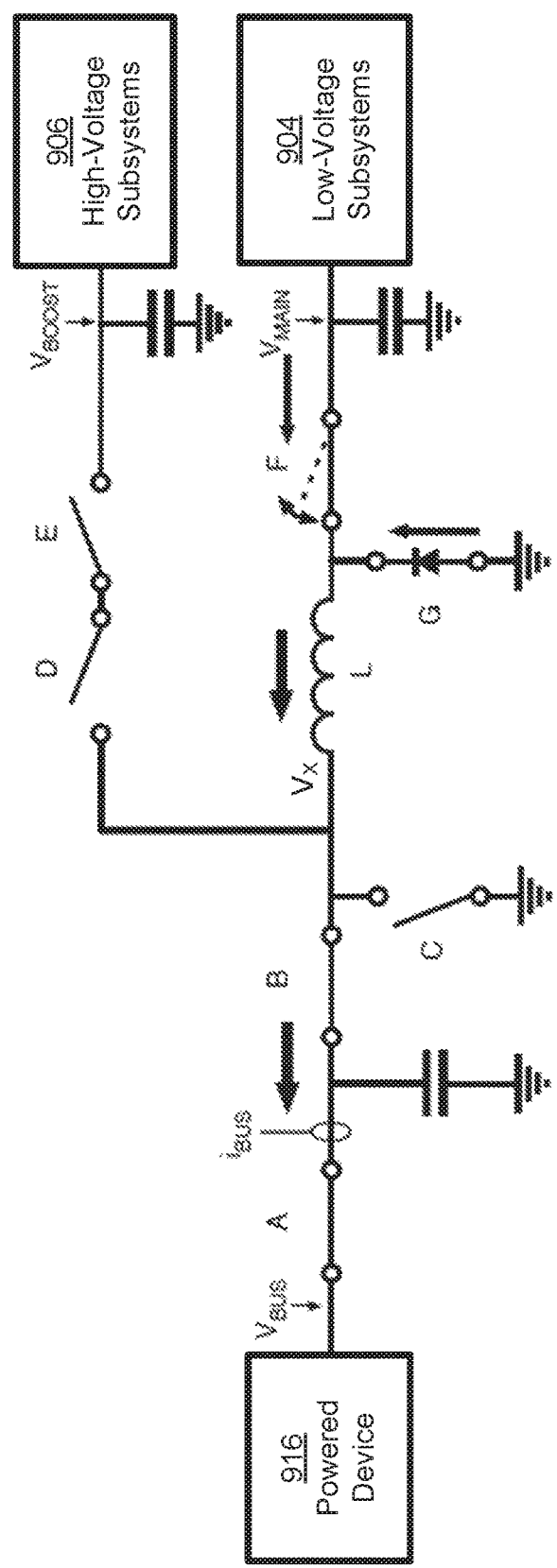
FIG. 9D shows a single switcher mode for a charging system in accordance with the disclosed embodiments.

A bidirectional switcher may be operated in a buck accessory mode in instances where a bidirectional switcher is used to take power from a $V_{MAIN}$ voltage node and provide power to a powered device connected to a power port at node $V_{BUS}$. For example, a powered device 916 such as an accessory or an external battery may receive power from the $V_{MAIN}$ voltage node. FIG. 9D shows a bidirectional switcher mode for a charging system in accordance with the disclosed embodiments. More specifically, FIG. 9D shows a charging system with the bidirectional switcher 424 of FIG. 4B in the buck accessory mode. In this mode, the charging system may buck power from one or more low-voltage subsystems 904 to a low-voltage powered device 916 (e.g., accessory, charging external battery, etc.) connected to a power port. Also, in the buck accessory mode, voltage of $V_{BUS}$ (at powered device 916) is at a lower voltage than voltage of $V_{MAIN}$ (at low-voltage subsystems 904).

The buck accessory mode of FIG. 9D may be initiated by enabling FET F, A and B (i.e., turning ON) and disabling FETs C, D, E and G (i.e., turning OFF). Enabling FETs F, A and B, allows current to flow from low voltage subsystems 904 through the inductor L to powered device 916. Disabling FET's D and E disconnects high-voltage subsystems 906 from node $V_x$.

Once the current in inductor L reaches an $i_{VALLEY}$ current limit, in a second stage, FET F is disabled and FET G is enabled to disconnect low-voltage subsystems 904 from the inductor L and FET C is maintained in a disabled state. FET's F and G may be switched repeatedly to buck power from low-voltage subsystem 904 to powered device 916. The cycle of switching FETs F and G may be repeated (and in some instances may be repeated at a fixed frequency with period $T_S$). FET G may operate as an ideal diode when FET F is OFF by allowing current to flow unimpeded from FET G to the inductor L.

Boost Main Mode

Figure 9E:
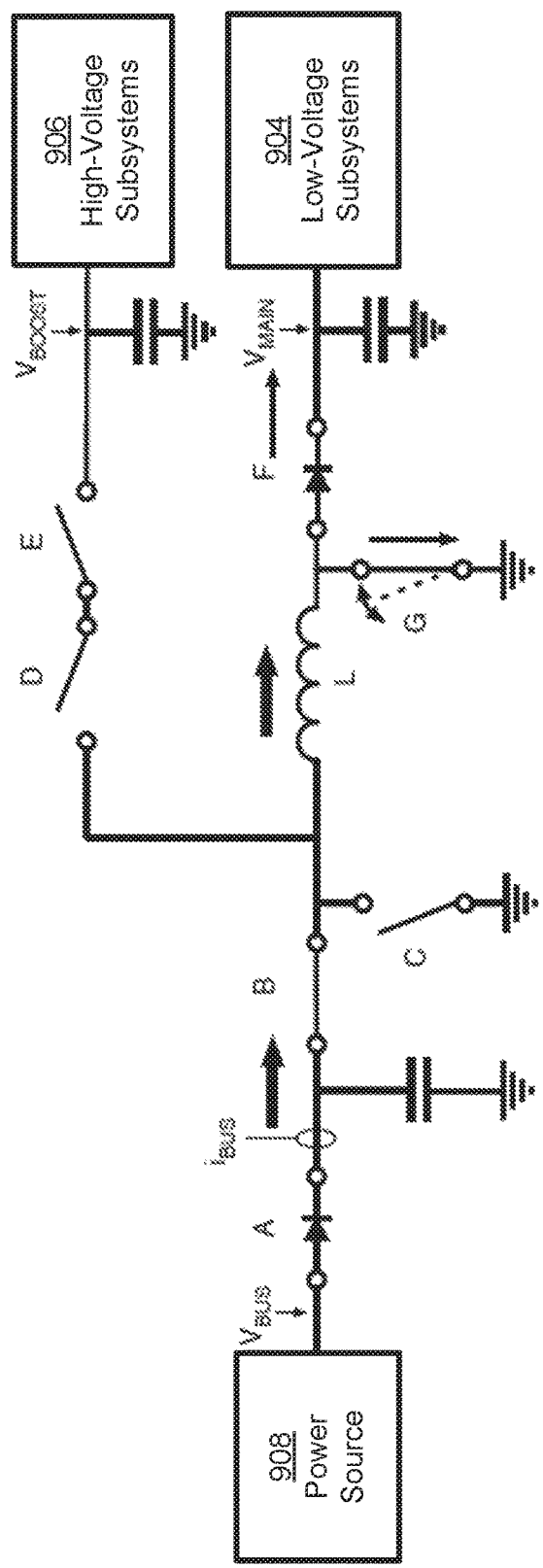
FIG. 9E shows a single switcher mode for a charging system in accordance with the disclosed embodiments.

A bidirectional switcher may be operated in a boost main mode in instances where a bidirectional switcher is used to take power from a power source connected to a power port at node $V_{BUS}$ and provide power to the $V_{MAIN}$ voltage node. For example, a power source 908 such as an external battery may be used to provide power to the $V_{MAIN}$ voltage node. FIG. 9E shows a bidirectional switcher mode for a charging system in accordance with the disclosed embodiments. More specifically, FIG. 9E shows a charging system with the bidirectional switcher 424 of FIG. 4B in a boost main mode. In this boost main mode, the bidirectional switcher of FIG. 9E may boost power from a low-voltage power source 908 (e.g., external battery, etc.) connected to a power port to one or more low-voltage subsystems 904. In addition, in the boost main mode, a voltage of $V_{BUS}$ (at power source 908) is at a lower voltage than voltage of $V_{MAIN}$ at low-voltage subsystems 904.

The boost main mode of FIG. 9E may be initiated by enabling FET's A, B and G (i.e., turning ON the FETs) and disabling FET's F, C, D and E (i.e., turning OFF the FETs). Enabling FET's A, B and G allows current to flow from power source 908 to inductor L, disabling FET's F and C disconnects low voltage subsystems 904 from node $V_x$ and inductor L, and disabling FET's D and E disconnects high-voltage subsystems 906 from inductor L. FET A may operate as an ideal diode allowing current to pass from, but not to, the power source 908. By operating FET A as an ideal diode, the addition of an accessory at the power source 908 can be detected as a rise in the $V_{BUS}$ voltage.

Once the current in inductor L reaches a current limit, FET G is disabled and FET F is enabled while FET C is continuously maintained OFF. Enabling FET F and disabling FET G connects low-voltage subsystems 904 to the inductor L to allow current from the inductor L to flow to low-voltage subsystems 904. The cycle of switching FETs F and G may be repeated (and in some instances may be repeated at a fixed frequency with period $T_S$). FET F operates as an ideal diode to allow current to flow to low voltage subsystems 904 from the inductor L. FET A may also be an ideal diode so that power may not flow to power source 908 during the boost main mode.

SIDO Switcher Mode

Figure 10A:
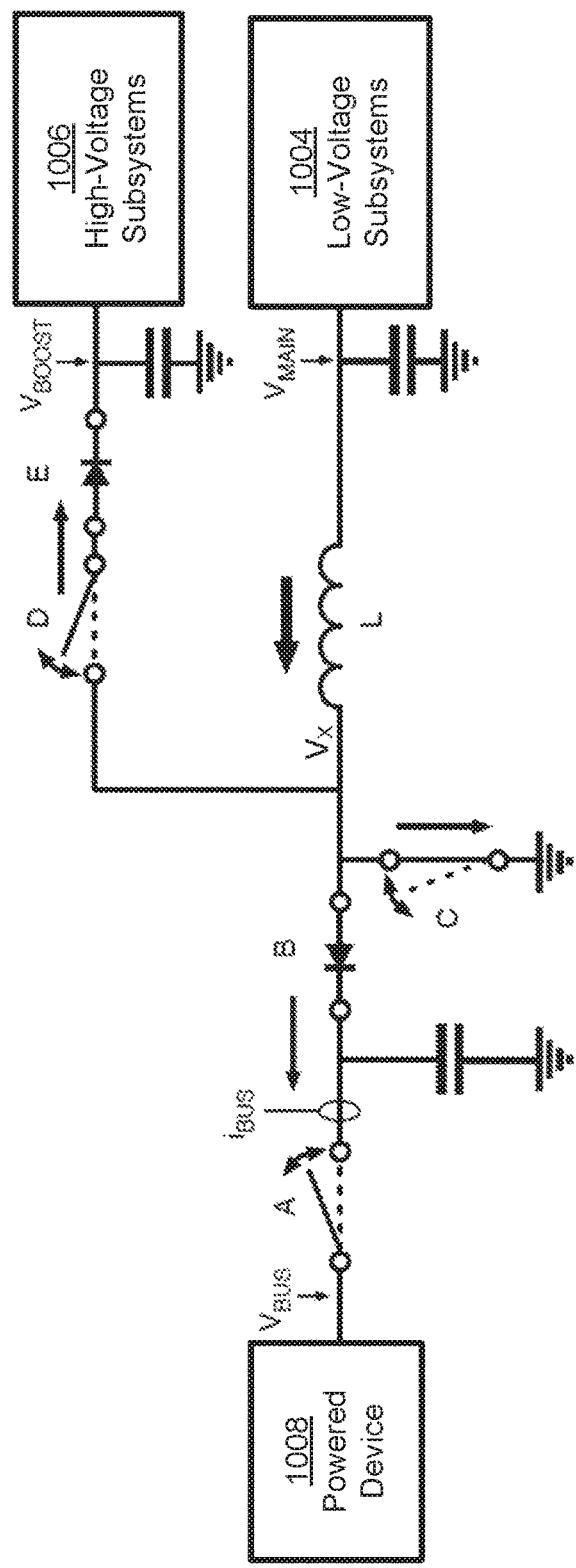
FIG. 10A shows a single switcher mode for a charging system in accordance with the disclosed embodiments.
Figure 10B:
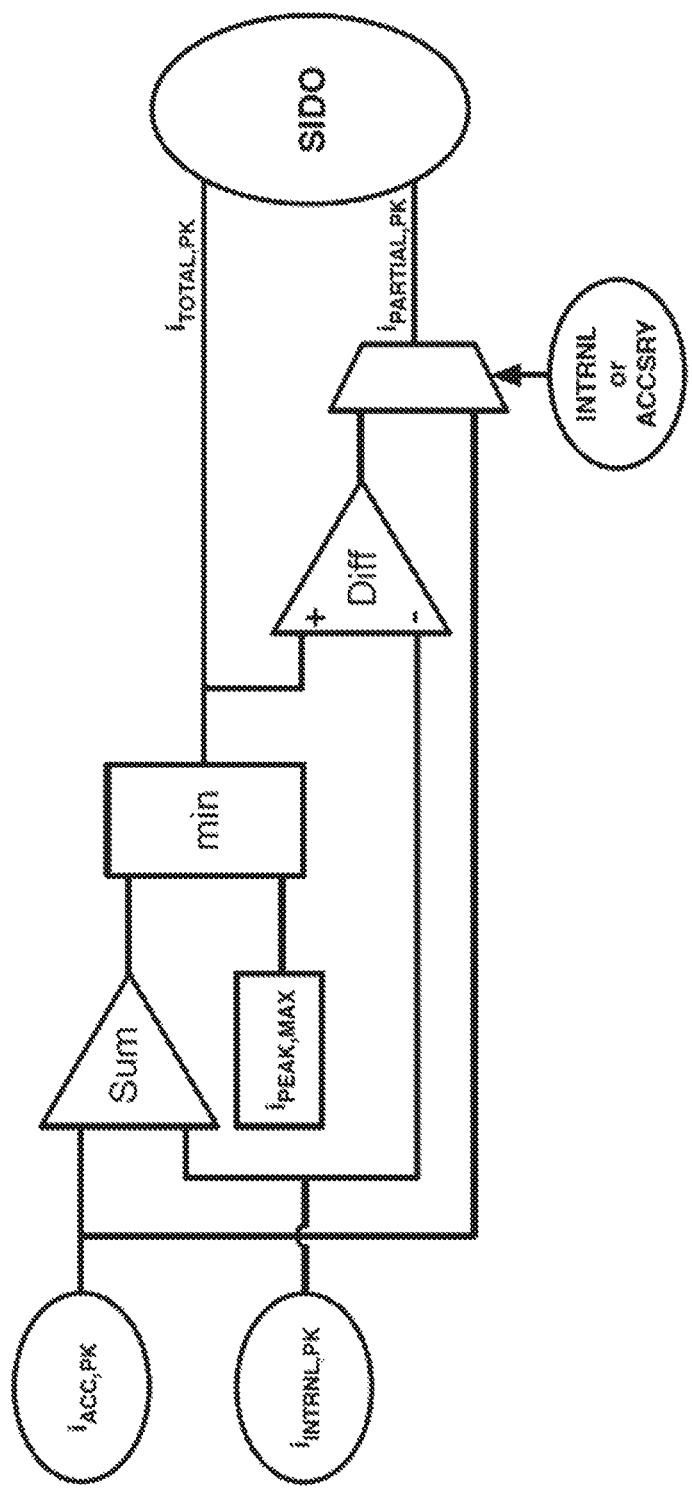
FIG. 10B shows a block diagram of a set of calculations associated with a single switcher mode for a charging system in accordance with the disclosed embodiments.

A bidirectional switcher may be operated in a SIDO switcher mode in instances where the bidirectional switcher may be used to take power from the $V_{MAIN}$ voltage node and provide power to both an external device connected to a corresponding power port and the high-voltage subsystems. FIG. 10A shows a single bidirectional switcher mode for a charging system in accordance with the disclosed embodiments. More specifically, FIG. 10A shows the bidirectional switcher 422 of FIG. 4A in the SIDO switcher mode. In the SIDO switcher mode, the bidirectional switcher boosts power from one or more low-voltage subsystems 1004 to one or more high-voltage subsystems 1006 and a powered device 1008 (e.g., accessory, charging external battery, etc.) coupled to Power Port to which the bidirectional switcher is connected.

The SIDO switcher mode may require that the target voltage of high-voltage subsystems 1006 be less than the target voltage of powered device 1008:

$$V_{BOOST,TGT} \leq V_{ACC,MAX}$$

To prevent cross-contamination between the two outputs (e.g., high-voltage subsystems 1006 and powered device 1008), power is delivered to the lower-voltage rail of high-voltage subsystems 1006 first, followed by the higher-voltage rail of powered device 1008. If the voltage target levels are reversed, the same procedure may be followed with the order reversed.

The SIDO switcher mode has two sub-states: boost, which prioritizes power to high-voltage subsystems 1006, and accessory, which prioritizes power to accessory 1008. The SIDO function is initiated by enabling FET C, which allows current to flow from low-voltage subsystems 1004 through the inductor L.

For the SIDO switcher mode to simultaneously control two outputs, two servo controllers may be required. The first servo controller controls the peak current for the boosted subsystems, or $i_{INTRNL,PK}$ (or $i_{BOOST,PK}$), and the second servo controller controls the peak current for accessory at powered device 1008, or $i_{ACC,PK}$.

The $i_{INTRNL,PK}$ current threshold is the output of a servo controller that simultaneously maintains the following limits, which are the same as those for the servo controller of the boost-internal mode:

$$V_{BOOST} \leq V_{BOOST,TGT}$$

$$V_{MAIN} \geq V_{MAIN,MIN}$$

To prevent the inductor current from exceeding the maximum allowed inductor current, the $i_{BOOST,PK}$ current is limited to $i_{PEAK,MAX}$.

The $i_{ACC,PK}$ current threshold is the output of a servo controller that simultaneously maintains the following limits, which are the same as those for the servo controller of the boost-accessory mode:

$$V_{BUS} \leq V_{ACC,MAX}$$

$$i_{BUS} \leq i_{ACC,MAX}$$

$$V_{MAIN} \geq V_{MAIN,MIN}$$

To prevent the inductor current from exceeding the maximum allowed inductor current, the $i_{ACC,PK}$ current is limited to $i_{PEAK,MAX}$.

Once the current reaches the sum of the servoed $i_{ACC,PK}$ current limit and the servoed $i_{INTRNL,PK}$ current limit, or $i_{TOTAL,PK}$, FET C is disabled, and FET E is enabled to allow current to flow from low-voltage subsystems 1004 to high-voltage subsystems 1006 at a higher voltage. FET E operates as an ideal diode by allowing current to flow unimpeded to high-voltage subsystems 1006 from the inductor L. The $i_{TOTAL,PK}$ current limit is the sum of the $i_{ACC,PK}$ current threshold and the $i_{INTRNL,PK}$ current threshold:

$$i_{TOTAL,PK} = \min(i_{INTRNL,PK} + i_{ACC,PK}, i_{PEAK,MAX})$$

where the $i_{TOTAL,PK}$ current is limited to $i_{PEAK,MAX}$ to prevent the inductor current from exceeding the maximum allowed inductor current.

When the current level drops to a servoed $i_{PARTIAL,PK}$ current, FET E is disabled, and FET B is enabled to allow current to flow from low-voltage subsystems 1004 to powered device 1008 at a higher voltage. The cycle of switching FETs C, E and B may be repeated (and in some instances may be repeated at a fixed frequency with period $T_S$). FETs A and D are enabled during certain stages to allow current to flow to either the powered device 1008 or high-voltage subsystems 1006, as described below.

Depending upon the port configuration (e.g., information received from the external device), the system can decide to prioritize the SIDO power to either the power port 1008 or high-voltage subsystems 1006. To prioritize the power to an accessory at powered device 1008 over high-voltage subsystems 1006 in the accessory sub-state, the $i_{PARTIAL,PK}$ current is set to the $i_{ACC,PK}$ current:

$$i_{PARTIAL,PK} = i_{ACC,PK}$$

To prioritize the power to high-voltage subsystems 1006 over accessory at powered device 1008 in the boost sub-state, the $i_{PARTIAL,PK}$ current is set to the total peak current minus the $i_{INTRNL,PK}$ current:

$$i_{PARTIAL,PK} = i_{TOTAL,PK} - i_{INTRNL,PK}$$

If the total peak current limit $i_{TOTAL,PK}$ is not limited by $i_{PEAK,MAX}$, the $i_{PARTIAL,PK}$ current is equal to the $i_{ACC,PK}$ current in both sub-states, where prioritization does not matter since both powered device 1008 and high-voltage subsystems 1006 are provided with their needed power. The mathematics used to calculate the partial and total peak current thresholds can be implemented in analog circuitry and are shown using the block diagram of FIG. 10B.

Figure 10C:
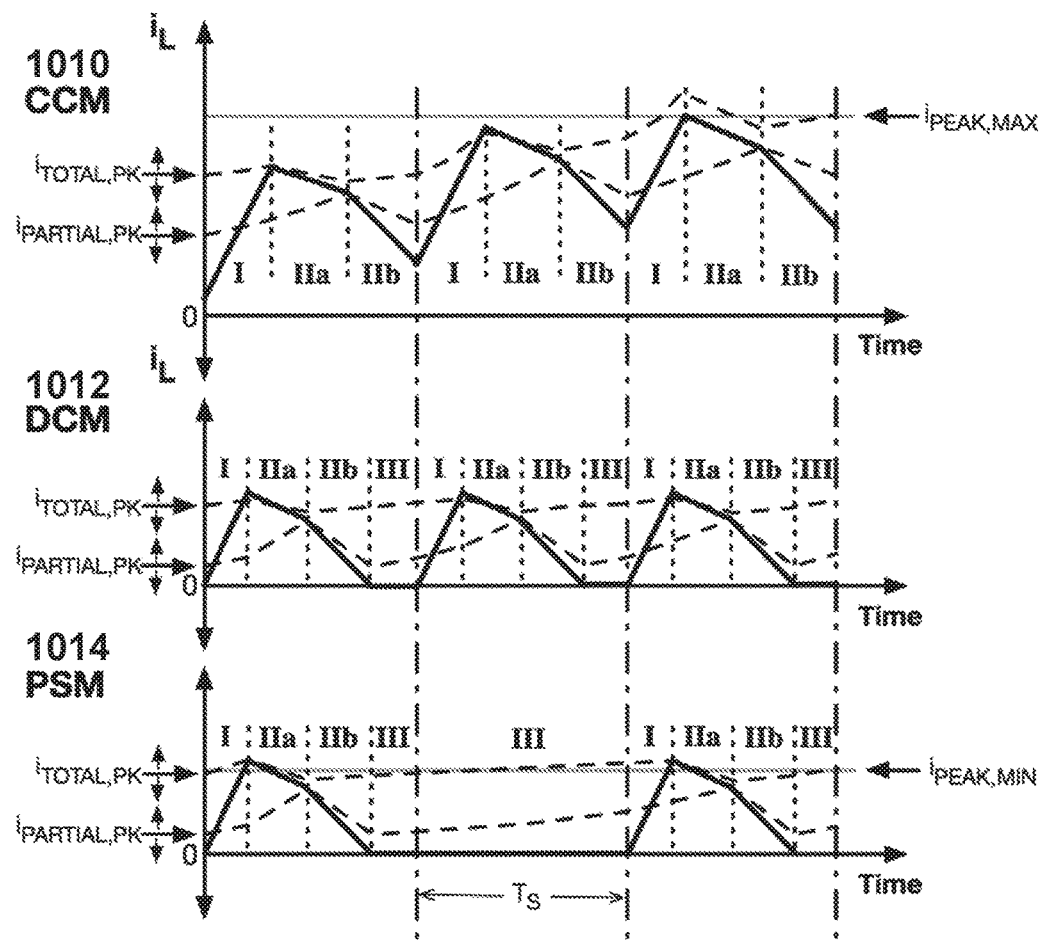
FIG. 10C shows a set of graphs of inductor current for a single switcher mode in accordance with the disclosed embodiments.

FIG. 10C shows a set of graphs of inductor current in the SIDO switcher mode. During Stage I, as shown in the upper CCM 1010 graph, FET C is enabled by a clock edge with period $T_S$, allowing the linearly increasing current to flow from low-voltage subsystems 1004 through the inductor L. FET D may also be enabled in Stage I, although no current would flow because FET E is disabled. The transition from Stage I to Stage IIa occurs when the inductor current reaches the servo-controlled $i_{TOTAL,PK}$ current threshold. In Stage IIa, FET C is disabled, and FET E is enabled to allow the linearly decreasing inductor current to flow from the inductor to high-voltage subsystems 1006. To prevent shoot-through current from flowing from high-voltage subsystems 1006 to ground during the transition from Stage I to Stage IIa, FET C is disabled before FET E is enabled. FET D continues to be enabled in Stage IIa. FET A is also enabled in Stage IIa, although no current would flow because FET B is disabled, and the power port voltage at powered device 1008 is higher than the voltage of high-voltage subsystems 1006. The transition from Stage IIa to Stage IIb occurs when the inductor current reaches the servo-controlled $i_{PARTIAL,PK}$ current.

In Stage IIb, FET D and FET E are disabled, and FET B is enabled to allow the decreasing inductor current to flow from the inductor to accessory at powered device 1008. To prevent shoot-through current from flowing from high-voltage subsystems 1006 to powered device 1008 during the transition from Stage IIa to Stage IIb, FET D and FET E are disabled before FET B is enabled. FET A continues to be enabled in Stage IIb. The transition from Stage IIb to Stage I occurs on the next clock edge, which repeats the entire cycle. To prevent shoot-through current from flowing from powered device 1008 to ground during the transition from Stage IIb to Stage I, FET A and FET B are disabled before FET C and FET D are enabled.

To improve light load efficiency, FET B can be designed to work as an active diode by not allowing current to flow in reverse from powered device 1008 to the switching node, as shown in the middle graph of DCM 1012 inductor current in FIG. 10C. When the inductor current reaches zero in Stage IIb, FET B and FET A are turned off, and Stage III is entered. The inductor current in Stage IIb can be measured either in series with the inductor or through FET B.

To further improve light-load efficiency, a cycle can be skipped when the $i_{TOTAL,PK}$ current drops below a minimum $i_{PEAK,MIN}$ current at the clock edge, as shown in the lower graph of PSM 1014. Since no power is provided to either accessory at powered device 1008 or high-voltage subsystems 1006, the servo-controlled $i_{INTRNL,PK}$ and $i_{ACC,PK}$ current levels will continue to increase until the $i_{TOTAL,PK}$ level eventually rises above the $i_{PEAK,MIN}$ current and triggers another cycle.

Note that the SIDO switcher mode behaves identically to the boost-accessory mode if the $i_{INTRNL,PK}$ current is zero. Consequently, the SIDO switcher mode can realize the boost-accessory mode by forcing the $i_{INTRNL,PK}$ current to zero.

To realize a boost-internal mode with a SIDO implementation, two changes are required to prevent unwanted current flow, since the power port voltage may no longer be higher than the voltage of high-voltage subsystems 1006. First, the $i_{ACC,PK}$ current is forced to zero to prevent controlled current from flowing to the power port. Second, FET A must be disabled in Stage IIa to prevent current from flowing from high-voltage subsystems 1006 to the powered device 1008 through the disabled FET B. In the standard SIDO switcher mode, FET A is enabled in Stage IIa, but no current flows because the voltage on the power port is higher than the voltage of high-voltage subsystems 1006 at the switching node, and no current can flow through the body diode of the disabled FET B.

At the expense of available current and bandwidth and the avoidance of CCM, the SIDO switcher mode could be implemented by alternating between the boost-internal and boost-accessory modes in DCM-only mode.

SIDO Buck-Boost Mode

Figure 10D:
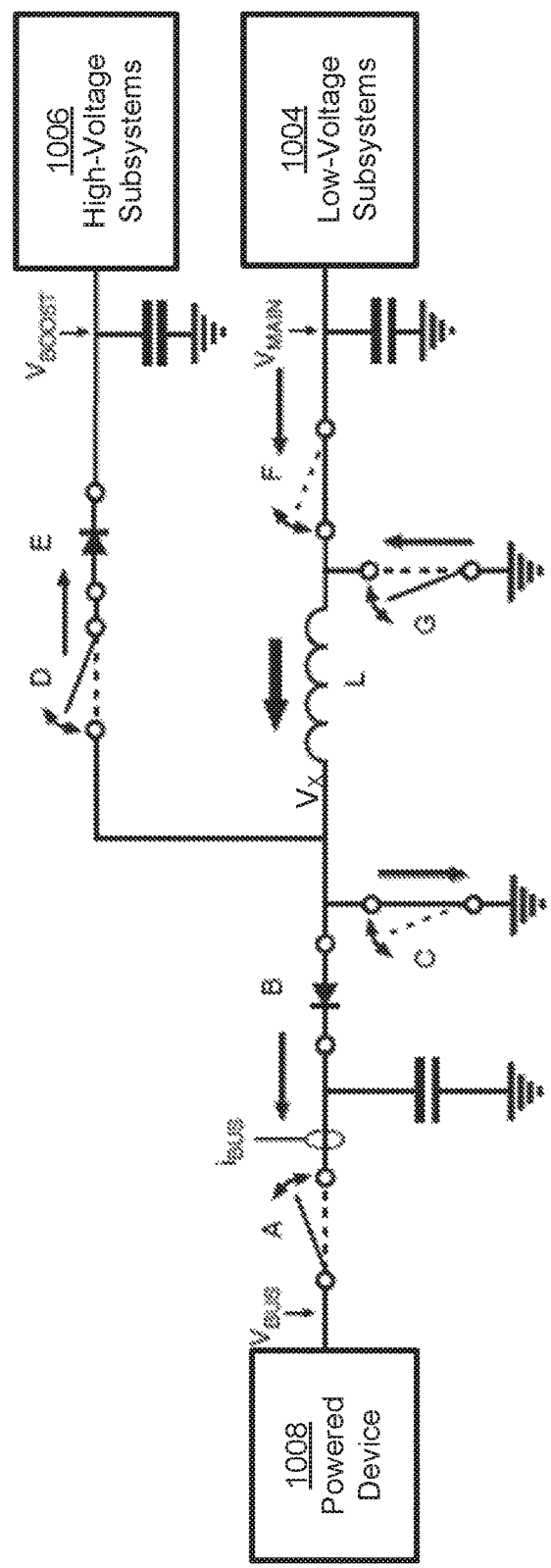
FIG. 10D shows a single switcher mode for a charging system in accordance with the disclosed embodiments.

A bidirectional switcher may be operated in a SIDO buck-boost switcher mode in instances where a bidirectional switcher may be used to take power from a $V_{MAIN}$ voltage node connected to one or more low voltage subsystems and provide power to a voltage node connected to $V_{BOOST}$ and to a powered device at a voltage node connected to $V_{BUS}$, where a target voltage of $V_{BOOST}$ may be greater than the target voltage of $V_{MAIN}$ and voltage $V_{BUS}$ may be higher or lower than voltage $V_{MAIN}$. For example, a powered device 1008 such as an accessory or an external battery may receive power at the $V_{BUS}$ node. FIG. 10D shows a single bidirectional switcher mode for a charging system in accordance with the disclosed embodiments. More specifically, FIG. 10D shows a charging system with the bidirectional switcher 424 of FIG. 4B in the SIDO buck-boost mode. In the SIDO buck-boost mode, the charging system may boost power from $V_{MAIN}$ connected to one or more low-voltage subsystems 1004 to $V_{BOOST}$ connected to one or more high-voltage subsystems 1006 and buck or boost power from one or more low-voltage subsystems 1004 to $V_{BUS}$ connected to a low-voltage external powered device 1008 (e.g., accessory, charging external battery, etc.) connected to $V_{BUS}$ at a power port. More specifically, in the SIDO buck-boost mode, the charging system of FIG. 10D may be controlled to perform one of the following: boost power from one or more low-voltage subsystems 1004 to one or more high-voltage subsystems 1006, boost power from one or more low-voltage subsystems 1004 to a high-voltage external powered device (e.g., accessory, charging external battery, etc.) coupled to the power port 1008 to which the bidirectional switcher is connected, buck power from one or more low-voltage subsystems 1004 to the low-voltage accessory coupled to the power port 1008 to which the bidirectional switcher is connected, boost power from an external battery coupled to the power port 1008 to one or more low-voltage subsystems 1004 coupled to the power port 1008 to which the bidirectional switcher is connected and buck power from an external battery coupled to the power port 1008 to one or more low-voltage subsystems 1004 coupled to the power port 1008 if the external battery is capable of providing a higher voltage than the low-voltage subsystems 1004.

The control scheme for the SIDO buck-boost mode may be operated in a boost sub-state, which prioritizes power, first, to high-voltage subsystems 1006; and, second, to accessory, which prioritizes power to power port 1008. The SIDO buck-boost mode of FIG. 10D is initiated in a first stage (stage I) by enabling FET F and C and disabling FET's A, B, D, E and G (i.e., turning OFF). Enabling FET's F and C allows current to flow from low voltage subsystems 1004 through the inductor L. Disabling FET's A, B, D, E and G disconnects high-voltage subsystems 1006 and power port 1008 from receiving current from the low-voltage subsystems 1004.

Once the current in inductor L reaches a current limit, in a second stage (stage II), FET's F and C are disabled to disconnect low-voltage subsystems 1004 from charging the inductor L, FET's A and B are maintained in a disabled state to disconnect power port 1008 from the inductor L, and FET's G, D and E are enabled to allow current from the inductor L to flow to high-voltage subsystems 1006 at a higher voltage. FET E operates as an ideal diode by allowing current to flow unimpeded to high-voltage subsystems 1006 from the inductor L and does not allow current to flow in a reverse direction from the high-voltage subsystems 1006.

When the current in inductor L drops to a current limit, in a third stage (stage III), FET's D and E are disabled to disconnect high-voltage subsystems 1006 from the inductor L, FET's C and F are maintained in a disabled state to disconnect low-voltage subsystems 1004 from charging inductor L, and FET's A, B and G are enabled to allow current from inductor L to flow to power port 1008. FET B may operate as an ideal diode by allowing current to flow unimpeded to power port 1008 from the inductor L and does not allow current to flow back from power port 1008 to the low-voltage subsystems 1004.

The cycle of switching for stages I, II and III is repeated at a fixed frequency with a predefined period until target voltages are achieved.

Figure 10E:
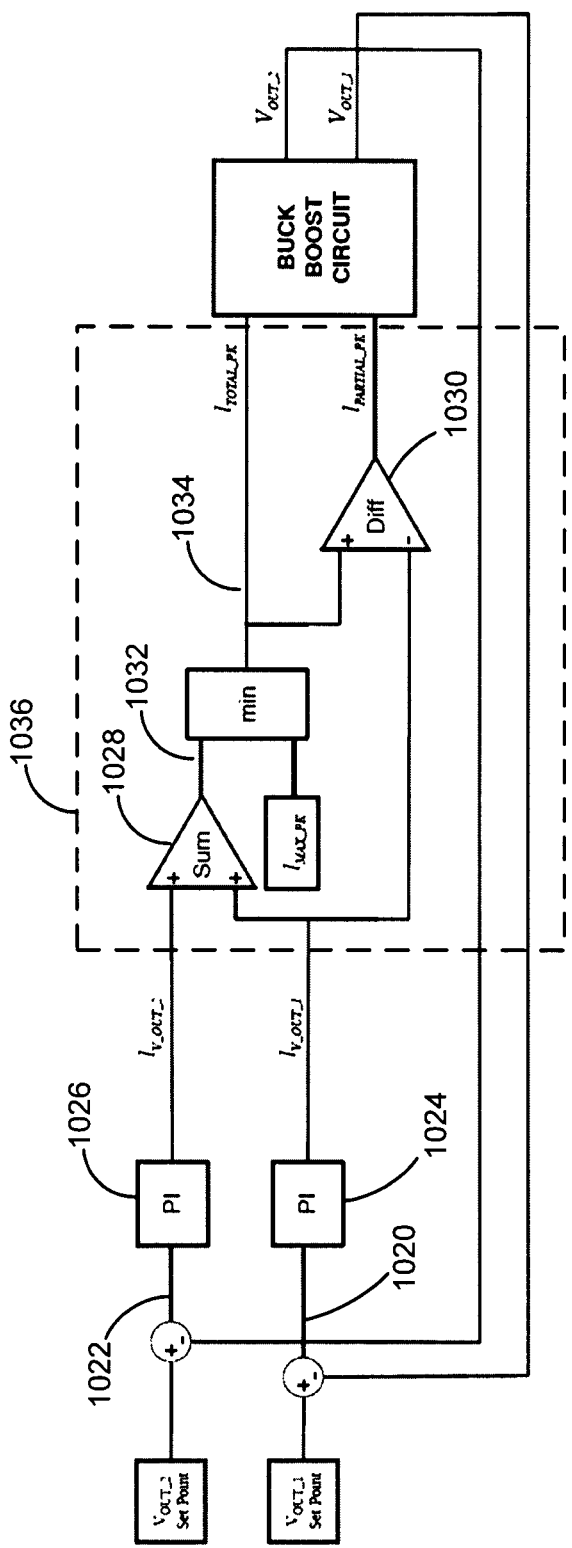
FIG. 10E shows a block diagram of a set of calculations associated with a single switcher mode for a charging system in accordance with the disclosed embodiments.

FIG. 10E shows a block diagram of a set of calculations associated with a single bidirectional switcher 424 of FIG. 4B for a charging system operated in the SIDO buck-boost mode in accordance with the disclosed embodiments. As shown in FIG. 10E, $V_{Out\_1,SetPoint}$ is the reference boost voltage $V_{BOOST\_setpoint}$ that is being controlled and $V_{OUT\_2,SetPoint}$ is the reference power port accessory voltage $V_{ACC\_setpoint}$ of power port 408. Initially, error signals 1020 and 1022 for boost voltage, $V_{BOOST}$, and accessory voltage, $V_{ACC}$ respectively, may be input into respective controllers. In one non-limiting example, integrators 1024, 1026 may be implemented as the controllers that integrate the respective error signals 1020, 1022. Current outputs $I_{V\_OUT\_1}$ and $I_{V\_OUT\_2}$ are received at a Summer block 1028 and $I_{V\_OUT\_1}$ is received at a difference block 1030. The current output 1032 of summer block 1028 is the total current $I_{TOTAL,PK}$ current of the inductor that is being determined. Current Output 1032 and the maximum peak inductor current $I_{MAX,PK}$ are inputs to a minimum block that outputs the minimum value between the $i_{MAX,BK}$ and output 1032. Output 1034 of minimum block is input to a difference block 1030 to subtract out current $I_{V\_OUT\_1}$ to power port. If the total peak current limit $I_{TOTAL,PK}$ is not limited by $I_{MAX\_PK}$, then $I_{TOTAL\_PK}$ is the sum and $I_{PARTIAL\_PK}$ will be $I_{V\_OUT\_2}$. $I_{PARTIAL\_PK}$ will not be equal to $I_{V\_OUT\_2}$ if the inductor current limit has been reached. This determines the prioritization of power that can be delivered to the high-voltage subsystem and the power port. If there isn't enough power from the inductor, then the lower priority port, $V_{BUS}$, is starved first in order to feed power to the higher priority port, the high-voltage subsystem at voltage rail, $V_{BOOST}$.

Figure 10F:
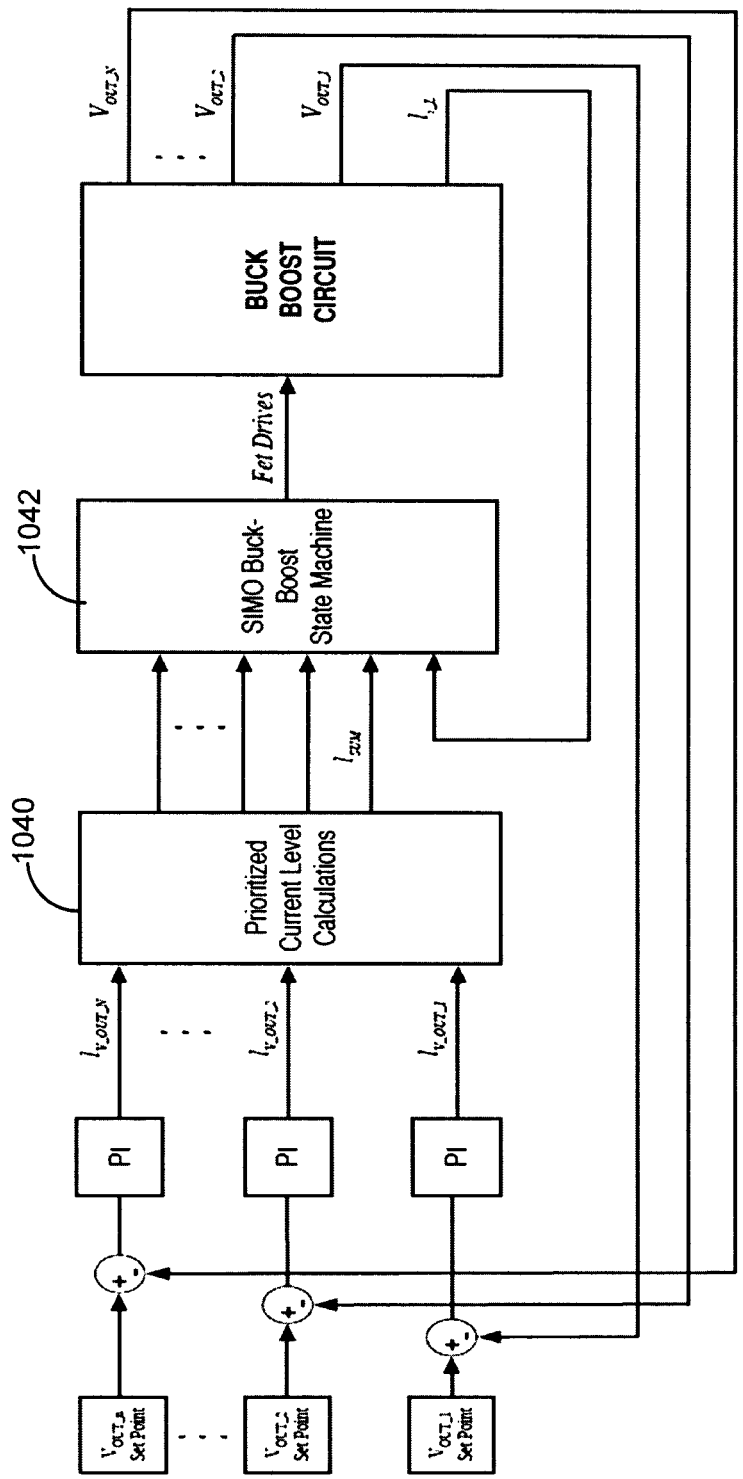
FIG. 10F shows a block diagram of a set of calculations associated with a single switcher mode for a charging system in accordance with the disclosed embodiments.

FIG. 10F shows a generalized block diagram of a set of calculations associated with multiple bidirectional switchers similar to bidirectional switcher 424 of FIG. 4B for a charging system in accordance with the disclosed embodiments. More specifically, FIG. 10F shows a set of calculations for n outputs, $V_{OUT\_1}$, $V_{OUT\_2}$, $V_{OUT\_n}$ that represent power that is delivered to one of power ports, low-voltage subsystem, or high-voltage subsystems by controlling the SIDO buck-boost converter of FIG. 4B. The block diagram of FIG. 10F may be used to determine priority for delivering inductor currents to each port until there is no energy left in the inductor using the SIDO buck-boost mode to control FETs. The higher the number of the output voltage (e.g., $V_{OUT1}$, $V_{OUT2}$, $V_{OUTN}$), the lower the priority. In FIG. 10F, block 1040 represents several prioritized current level calculations that may follow the computation depicted in block 1036 of FIG. 10E. Block 1042 represents a buck-boost state machine for multiple outputs that includes logic for controlling FET's for multiple SIDO buck-boost switcher modes that may be implemented similar to FIG. 4B in the buck-boost mode.

In one embodiment, the bidirectional switcher of FIG. 10D may also be operated in a SIDO buck-boost switcher where the bidirectional switcher may be used to take power from an external battery or an external power supply connected to a power port at voltage node $V_{BUS}$ and provide power to one or more low-voltage subsystems connected to a voltage node at $V_{MAIN}$ and provide power to one or more high-voltage subsystem connected to $V_{BOOST}$, where a voltage of $V_{BUS}$ may be higher than voltage of $V_{MAIN}$. For example, in the SIDO buck-boost mode, the charging system may buck power from an external battery connected to a power port at the $V_{BUS}$ node to one or more low-voltage subsystems 1004 connected to $V_{MAIN}$ and boost power to one or more high-voltage subsystems 1006.

The SIDO buck-boost mode, in this embodiment, may be initiated in a first stage (stage I) by enabling FET A, B and G (i.e., turning ON) and disabling FET's F, C, D and E (i.e., turning OFF). Enabling FET's A, B and G allows current to flow from external battery at powered device 1008 through the inductor L so as to charge up the inductor L. Disabling FET's E, C, D and F disconnects high-voltage subsystems 1006 and low-voltage subsystem 1004 from receiving current from the external battery at the power port (labeled as powered device 1008).

Once the current in inductor L reaches a current limit, in a second stage (stage II), FET's A, B and G are disabled to disconnect external battery and FET's C, D and E are enabled to allow current from the inductor L to flow to high-voltage subsystems 1006 at a higher voltage (which is prioritized). FET E operates as an ideal diode by allowing current to flow unimpeded to high-voltage subsystems 1006 from the inductor L and does not allow current to flow in a reverse direction from the high-voltage subsystems 1006.

Figure 11A:
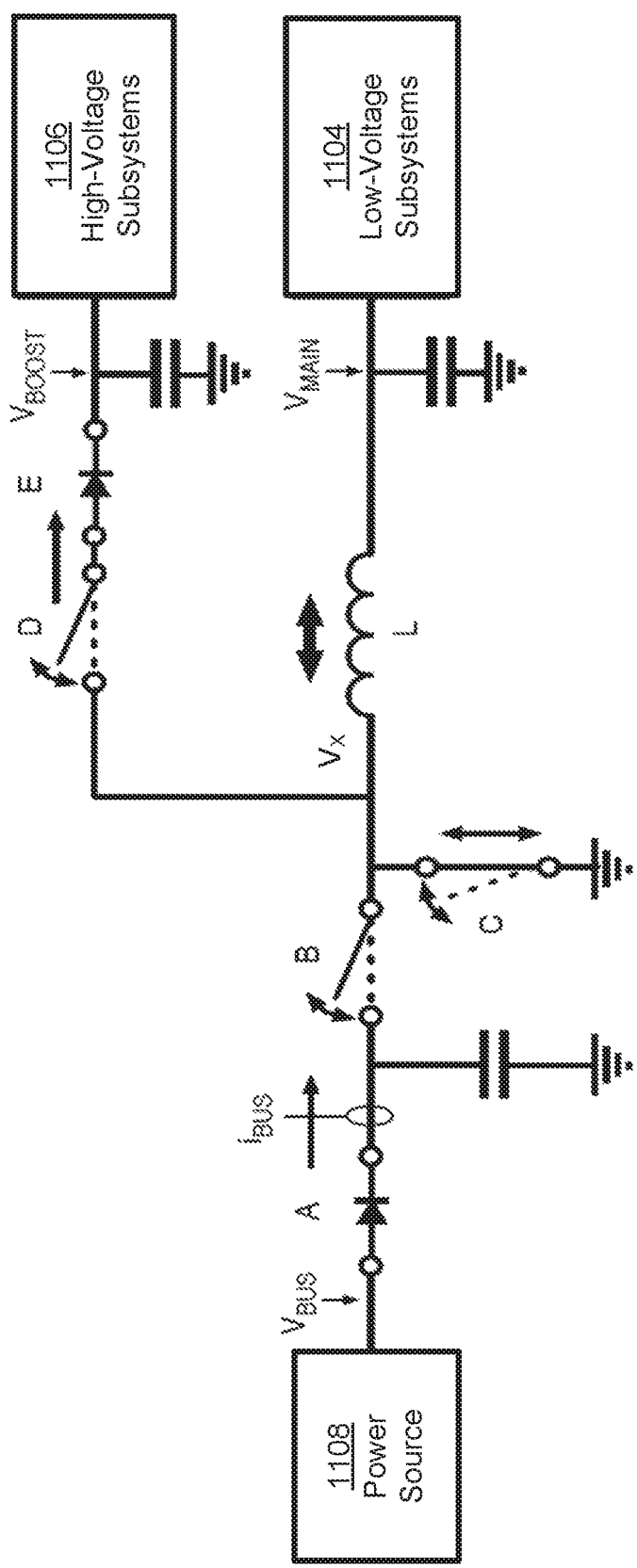
FIG. 11A shows a single switcher mode for a charging system in accordance with the disclosed embodiments.

When the current in inductor L drops to a current limit, in a third stage (stage III), keeping C enabled, FET's D and E are disabled and FET F is enabled to disconnect high-voltage subsystems 1006 from the inductor L and deliver power to the low-voltage subsystems 1004 from inductor L SISC Switcher Mode A bidirectional switcher may be operated in a SISC switcher mode in instances where it is desirable to provide power received from a power port to both the low- and high-voltage subsystems of a portable electronic device. FIG. 11A shows a single switcher mode for a charging system in accordance with the disclosed embodiments. More specifically, FIG. 11A shows the bidirectional switcher 422 of FIG. 4A in a SISC switcher mode. In the SISC switcher mode, the bidirectional switcher switches between up-converting (e.g., boosting) power from one or more low-voltage subsystems 1104 to one or more high-voltage subsystems 1106 and down-converting (e.g., bucking) the input voltage from a power source 1108 (e.g., power supply, external battery, etc.) coupled to the power port to which the bidirectional switcher 422 is connected to low-voltage subsystems 1104. Unlike the SIDO switcher mode, the SISC switcher mode cannot simultaneously buck and boost for the bidirectional switcher shown in FIGS. 10A and 10D and so must sequentially choose whether to boost power to high-voltage subsystems 1106 or buck power from the power port to low-voltage subsystems 1106.

The SISC switcher mode may be implemented by switching between the boost-internal mode and the buck mode, depending on current levels and one of six SISC sub-states: boost with charge, boost with no-charge, boost-primary, boost-secondary, buck with charge, and buck with no charge. The SISC switcher mode may use the boost sub-states to prioritize the boost-internal mode, transitioning to the buck mode only when the boost-internal mode would otherwise skip a pulse with the $i_{BOOST,PK}$ current less than the $i_{PEAK,MIN}$ threshold. If the servo-controlled $i_{BOOST,PK}$ current level is higher than $i_{PEAK,MIN}$, the bidirectional switcher behaves identically to the boost-internal mode, and no power is bucked from the power port to low-voltage subsystems 1104.

In the boost with charge sub-state, the SISC switcher mode prioritizes the boost but controls the voltage and current to an internal battery when bucking. In the boost with no-charge sub-state, the SISC switcher mode prioritize the boost but controls the voltage to low-voltage subsystems

1104. In the boost-primary sub-state, the SISC switcher mode prioritizes the boost but pulls as much power as possible from power source 1108 during bucking. In the boost-secondary sub-state, the SISC switcher mode prioritizes the boost but balances current with the other bidirectional switcher in the SISC or buck mode during bucking.

The SISC switcher mode may use the buck sub-states to prioritize the buck mode, transitioning to the boost-internal mode only when the buck mode would otherwise skip a pulse with the $i_{VALLEY}$ current less than $-i_{PEAK,MIN}$. If the servo-controlled $i_{VALLEY}$ current is more negative than $-i_{PEAK,MIN}$, the bidirectional switcher behaves identically to the buck mode, and no power is boosted from low-voltage subsystems 1104 to high-voltage subsystems 1106.

In the buck with charge sub-state, the SISC switcher mode prioritizes the buck and controls the voltage and current to the internal battery. In the buck with no-charge sub-state, the SISC switcher mode prioritizes the buck and controls the voltage to low-voltage subsystems 1104.

The SISC switcher mode may further behave identically to the buck mode if the $i_{BOOST,PK}$ current is zero. Similarly, the SISC switcher mode may behave identically to the boost-internal mode if the $i_{VALLEY}$ current is zero.

Figure 11B:
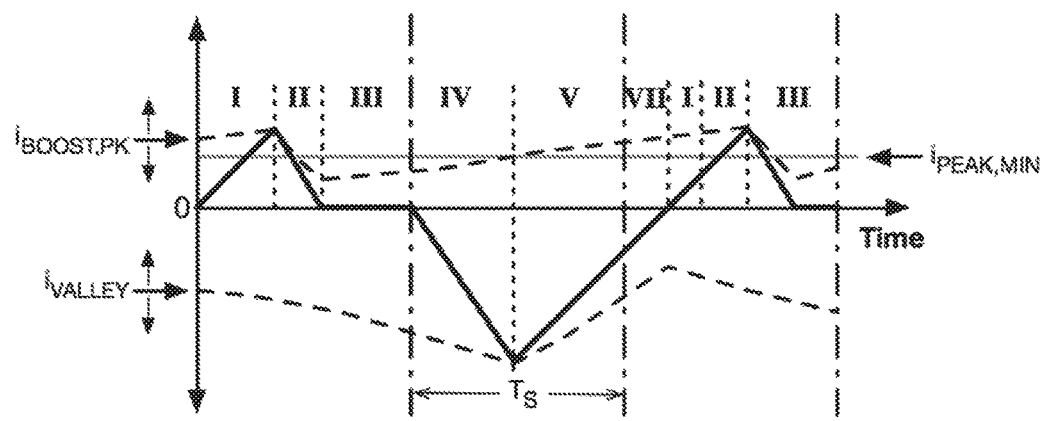
FIG. 11B shows a plot of inductor current for a single switcher mode in accordance with the disclosed embodiments.

FIG. 11B shows a plot of inductor current in the four SISC boost sub-states. In the SISC boost sub-states, the $i_{BOOST,PK}$ current is the servo-controlled limit that is identical to the $i_{BOOST,PK}$ current in the boost-internal mode, and the $i_{VALLEY}$ current is the servo-controlled limit that is identical to the $i_{VALLEY}$ current in the buck mode with the buck sub-states of charge, no-charge, primary, or secondary described above with respect to FIGS. 9A-9B.

The SISC boost sub-states preferentially provide power to high-voltage subsystems 1106 over providing power to low-voltage subsystems 1104 from power source 1108 by following the same procedure as the boost-internal mode, shown as Stages I, II, and III in FIG. 11B, until the $i_{BOOST,PK}$ current is less than $i_{PEAK,MIN}$. In Stage I, FETs C and D are enabled as in the boost-internal mode. In the transition to Stage II, FET C is disabled, followed by the enabling of FET E, and FET D continues to be enabled. In Stage III, all FETs are disabled.

If the $i_{BOOST,PK}$ current is less than $i_{PEAK,MIN}$ at the clock edge, instead of skipping a boost pulse, a buck-like pulse is taken in Stage IV and V, which behave identically to Stages IV and V for the buck mode. In Stage IV, FET B is enabled to allow current to flow from power source 1108 to the inductor L. In the transition from Stage IV to Stage V, FET B is disabled, followed by the enabling of FET C. In both Stages IV and V, FET A operates as an ideal diode by allowing current to flow only from power source 1108. By operating FET A as an ideal diode, the removal of power source 1108 from the power port can be detected as a drop in the $V_{BUS}$ voltage. FET A is controlled by the measured bidirectional $i_{BUS}$ current. If the $i_{BUS}$ current is negative below a fixed threshold (e.g., indicating that current is flowing in from the power port), FET A is enabled; otherwise, FET A is disabled.

If the $i_{BOOST,PK}$ current is less than $i_{PEAK,MIN}$ and the negative $i_{VALLEY}$ current is more negative than $-i_{PEAK,MIN}$, the pulse is truly skipped because neither high-voltage subsystems 1106 nor low-voltage subsystems 1104 require a pulse of power. If the inductor current reaches zero in Stage V, which indicates DCM, then the stage transitions to Stage VI (not shown), and all of the FETs are disabled. The inductor current can be measured in Stage V in series with the inductor L or through FET C.

On the next clock edge in any buck stage (e.g., Stages IV, V or VI), if the $i_{BOOST,PK}$ current exceeds the $i_{PEAK,MIN}$ threshold, the SISC switcher mode returns to the boost-internal mode by transitioning through Stage VII before returning to Stage I. In Stage VII, FET A is disabled to prevent any current from returning to the power port, and FET C is enabled. Once the inductor current reaches zero, which is detected in series with inductor L or through FET C, the stage transitions from Stage VII to Stage I, where FET D is enabled along with the already enabled FET C.

Figure 11C:
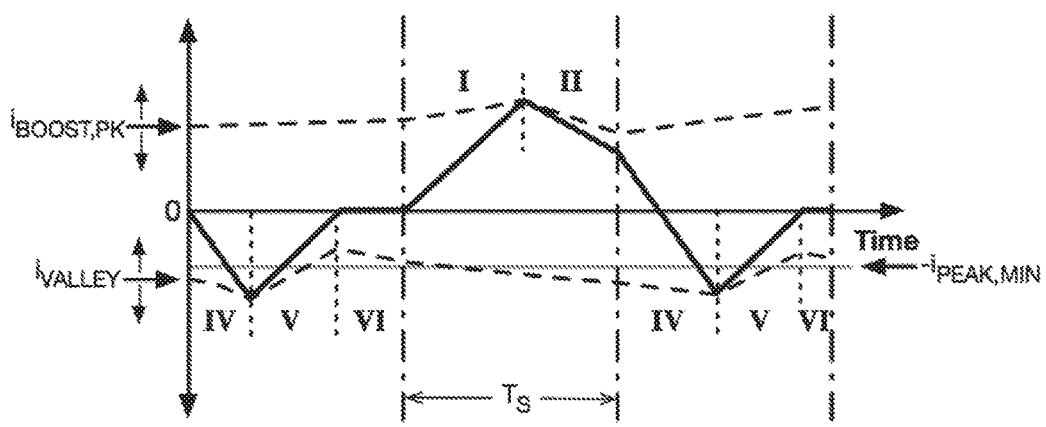
FIG. 11C shows a plot of inductor current for a single switcher mode in accordance with the disclosed embodiments.

FIG. 11C shows a plot of inductor current in the two SISC buck sub-states. In the SISC buck sub-states, the $i_{BOOST,PK}$ current is the servo-controlled limit that is identical to the $i_{BOOST,PK}$ current in the boost-internal mode, and the $i_{VALLEY}$ current is the servo-controlled limit that is identical to the $i_{VALLEY}$ current in the buck mode with the buck sub-states of charge or no-charge described above.

The SISC buck sub-states preferentially provide bucked power from power source 1108 over providing boosted power to high-voltage subsystems 1106 by following the same procedure as the buck mode, shown as Stages IV, V and VI in FIG. 11C, until the negative $i_{VALLEY}$ current is less negative than $-i_{PEAK,MIN}$. In Stage IV, FET B is enabled as in the buck mode. In the transition to Stage V, FET B is disabled, followed by the enabling of FET C. In Stage VI, all FETs are disabled.

In both Stages IV and V, FET A operates as an ideal diode by allowing current to flow from power source 1108 but not to power source 1108. By operating FET A as an ideal diode, the removal of power source 1108 from the power port can be detected as a drop in the $V_{BUS}$ voltage. FET A is controlled by the measured bidirectional $i_{BUS}$ current. If the $i_{Bus}$ current is negative below a fixed threshold (e.g., indicating that current is flowing in from the power port), FET A is enabled; otherwise, FET A is disabled.

If the negative $i_{VALLEY}$ current is more negative than $-i_{PEAK,MIN}$ at the clock edge, instead of skipping a buck pulse, a boost-internal-like pulse is taken, as shown in Stages I and II, which behave identically to Stages I and II for the boost-internal mode. In Stage I, FETs C and D are enabled to allow current to flow from the inductor L to ground. In the transition from Stage I to Stage II, FET C is disabled, followed by the enabling of FET E, and FET D continues to be enabled.

If the $i_{BOOST,PK}$ current is less than $i_{PEAK,MIN}$ and the negative $i_{VALLEY}$ current is less negative than $-i_{PEAK,MIN}$, the pulse is truly skipped because neither high-voltage subsystems 1106 nor low-voltage subsystems 1104 require a pulse of power. If the inductor current reaches zero in Stage II, which indicates DCM, then the stage transitions to Stage III (not shown) and all of the FETs are disabled. The inductor current can be measured in Stage II in series with the inductor L or through FET C.

On the next clock edge in any boost-internal stage (e.g., Stages I, II or III), if the negative $i_{VALLEY}$ current is more negative than $-i_{PEAK,MIN}$, the SISC switcher mode returns to the buck mode by transitioning to Stage IV. In the transition from Stage II to Stage IV, FETs E and D are disabled, followed by the enabling of FET B, with FET A operating as an ideal diode. Current will initially flow from inductor L through FET B into the input capacitance between FETs A and B. Once the current becomes negative, FET A will be enabled since it operates as an ideal diode, and current will flow in from the power port.

SISC Boost-Boost Mode

Figure 11D:
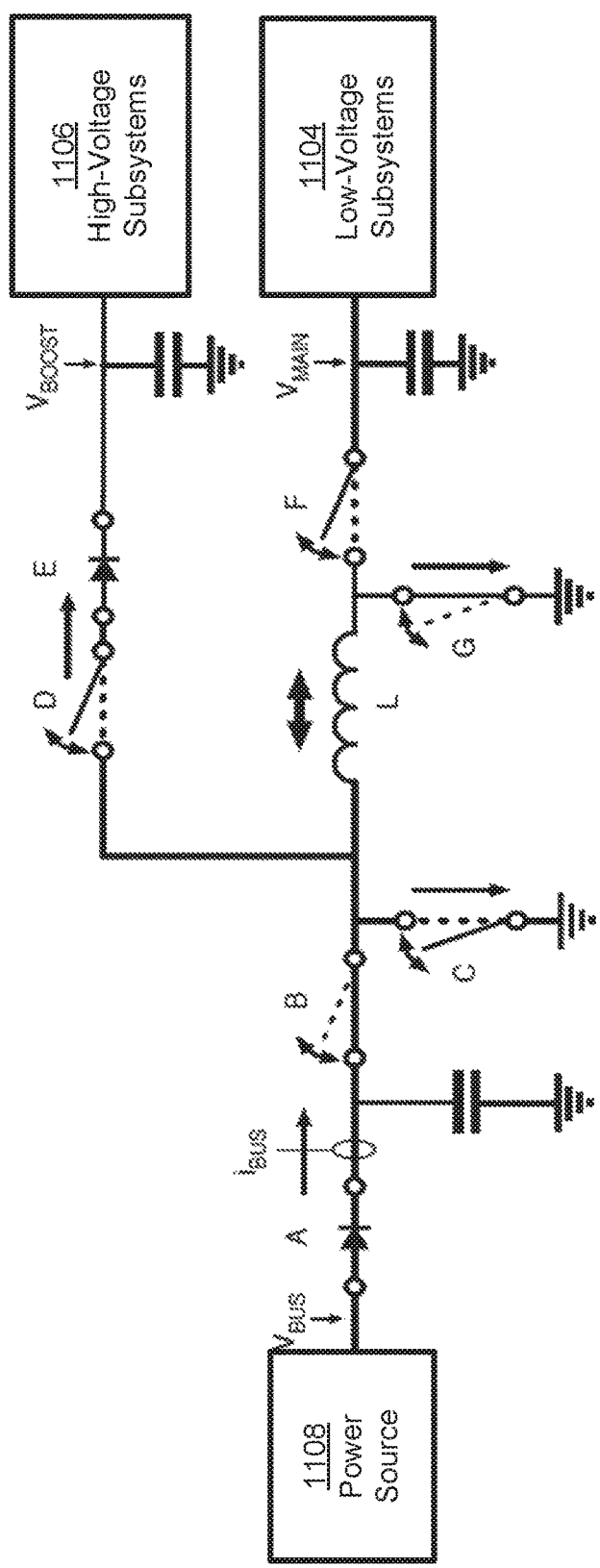
FIG. 11D shows a single switcher mode for a charging system in accordance with the disclosed embodiments.

A bidirectional switcher may be operated in a SISC boost-boost switcher mode in instances where a bidirectional switcher may be used to provide power from a power source connected to a $V_{BUS}$ node to a $V_{MAIN}$ voltage node connected to one or more low voltage subsystems and provide power from the $V_{MAIN}$ voltage node connected to one or more low-voltage subsystems to a voltage node at a high-voltage subsystem connected to $V_{BOOST}$, where a voltage of $V_{MAIN}$ may be at a greater voltage than the voltage node of $V_{BUS}$ that is connected to the power source 1108. For example, a power source 1108 such as a power source or an external battery may provide power to the $V_{MAIN}$ node. More specifically, FIG. 11D shows a charging system with a bidirectional switcher 424 of FIG. 4B in a SISC boost-boost mode in accordance with the disclosed embodiments. The charging system of FIG. 11D is substantially similar to the charging system of FIG. 11A, however, includes additional FET's F and G. In the SISC boost-boost mode, the bidirectional switcher switches between up-converting (e.g., boosting) power from one or more low-voltage subsystems 1104 to one or more high-voltage subsystems 1106 and up-converting (e.g., boosting) the input voltage from a power source 1108 (e.g., power supply, external battery, etc.) coupled to a power port at a $V_{BUS}$ node to low-voltage subsystems 1104. In SISC boost-boost mode, the bidirectional switcher must initially boost power from the power source 1108 to the low-voltage subsystems 1104 and, secondly, boost power from the low-voltage subsystems 1104 to the high-voltage subsystems 1106. In the SISC boost-boost mode, Voltage $V_{BUS}$ is at a lower voltage than voltage $V_{MAIN}$.

The control scheme for the SISC boost-boost mode may prioritize boosting power from power source 1108 to low-voltage subsystems 1104 over boosting power from low-voltage subsystems 1104 to high-voltage subsystems 1106. The SISC boost-boost mode of FIG. 11D is initiated in a first stage by enabling FET's A, B and G and disabling FET's C, D, E and F. Enabling FET's A, B and G allows current to flow from power port 1108 through the inductor L and store energy in inductor L, disabling FET's F and C disconnects low-voltage subsystems 1104 from power port 1108 and disabling FET's D and E disconnects high-voltage subsystems 1106 from the power source 1108 and low-voltage subsystems 1104. Once the current in inductor L reaches a current limit, FET's A, B and F are enabled while all other FET's are disabled to allow current from inductor L to flow to $V_{MAIN}$ and low-voltage subsystems 1104.

In a second stage, FET's F and C are enabled while all other FETs are disabled. Enabling FET's F and C allows current to flow from low-voltage subsystems 1104 into inductor L. When the current in inductor L reaches a predetermined current limit, FET's F, D and E are enabled and other FET's are disabled to allow current from inductor L to flow to high-voltage subsystems 1106.

Switcher Mode Transitions

When a bidirectional switcher changes from one mode to another (e.g., when a DC supply is connected to a power port), it may be desirable for the control circuit to transition smoothly between the former and current modes. The switcher modes can be classified into two styles: boost and buck. The boost-style modes include boost-accessory, boost-internal, SIDO, and the SISC boost sub-states. The buck-style modes include buck and the SISC buck sub-states.

Transitions between the disabled mode and either the boost-style or buck-style mode require no special transition considerations. Similarly, transitions between same style modes require no special transition considerations.

In some instances, it may be desirable to require that the inductor current reach zero before the transition occurs to provide smooth transition between a boost-style mode and a buck-style mode, the bidirectional switcher is immediately put into Stage II or Stage IIa until the inductor current reaches zero and Stage III is entered. After reaching Stage III, the mode may transition seamlessly to a buck-style mode.

Similarly, it may be desirable to require that the inductor current reach zero before the transition occurs to provide smooth transition between a buck-style mode and a boost-style mode. Thus, when transitioning from a buck-style mode, the bidirectional switcher is immediately put into Stage V until the inductor current reaches zero and Stage VI is entered. After reaching Stage VI, the bidirectional switcher may transition seamlessly to a boost-style mode.

Bidirectional Switcher Combinations

As discussed above, the mode of each bidirectional switcher depends mainly on what is plugged into the corresponding power port and the voltage state of the internal battery. However, some combinations of bidirectional switcher modes may have additional requirements to prioritize available power appropriately. In some instances, to improve bandwidth and reduce ripple current, clocks driving the two bidirectional switchers of the charging system may be driven 180 degrees out of phase.

Some combinations of bidirectional switcher modes do not require any coordination between the bidirectional switchers. Thus, the control of each bidirectional switcher is completely independent and defined by one of a plurality of modes described above. On the other hand, half of the switcher combinations may require codependent operation of the bidirectional switchers. Such codependent switcher combinations are described below with respect to FIGS. 12A-12C, 13A-13C, 14A-14D, 15A-15B and 16A-16F.

Balancing in a Low-Voltage or Under-Voltage State with External Accessories

Figure 12A:
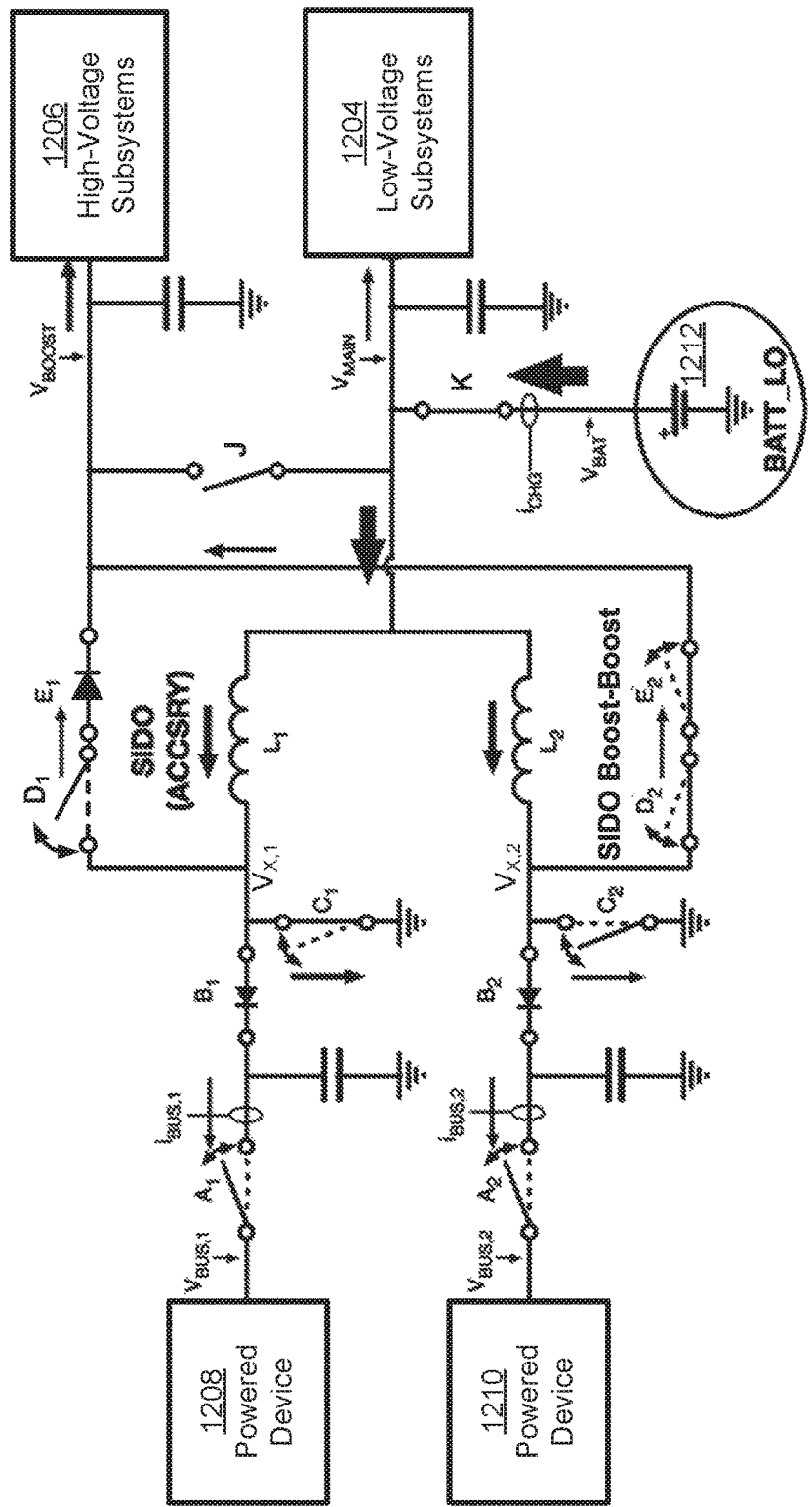
FIG. 12A shows a dual switcher mode for a charging system in accordance with the disclosed embodiments.

FIG. 12A shows a dual switcher mode for a charging system in accordance with the disclosed embodiments. In particular, FIG. 12A shows a combination of bidirectional switcher modes when an internal battery 1212 connected to the charging system is in a low-voltage or under-voltage state and the power ports are either unplugged or connected to low- and high-powered devices 1208-1210 (e.g., external accessories or charging external batteries). In this mode, both bidirectional switchers may be used to boost power from one or more low-voltage subsystems 1204 to one or more high-voltage subsystems 1206 by balancing the total peak inductor current in the bidirectional switchers when possible.

The combinations defined by balancing the inductor currents with a low-voltage or under-voltage battery 1212 are summarized in the table below.

| Power Port 1 | Power Port 2 | Switcher 1 | Switcher 2 |
|---|---|---|---|
| Unplugged | Unplugged | Boost-internal | Boost-internal |
| Unplugged | Powered Device (HI) | SIDO Boost-Internal | SIDO Boost-Accessory |
| Powered Device (HI) | Unplugged | SIDO Boost-Accessory | SIDO Boost-Internal |
| Unplugged | Powered Device (LO) | Boost-Internal | SIDO Buck-Accessory |
| Powered Device (HI) | Powered Device (HI) | SIDO Boost-Accessory | SIDO Boost-Internal |
| Powered Device (LO) | Powered Device (LO) | SIDO Buck-Accessory | SIDO Buck-Internal |
| Powered Device (LO) | Powered Device (HI) | SIDO Buck-Accessory | SIDO Boost-Internal |

In the dual switcher mode of FIG. 12A, external accessories and/or other powered devices 1208-1210 are connected to both power ports, and a low-voltage state (e.g., "BATT_LO") in battery 1212 requires a boost to high-voltage subsystems 1206. In this case, both bidirectional switchers are in the SIDO switcher mode. As discussed above, the SIDO mode reduces to the boost-internal mode when the accessory peak current goes to zero. As a result, the SIDO-SIDO switcher mode represents the most general case, and all of the other cases in the table above can be realized by setting the accessory peak current to zero for power ports without an attached accessory.

The inputs to the balancing calculation are the accessory peak currents for the two power ports ($i_{ACC,PK,1}$ and $i_{ACC,PK,2}$ described above with respect to the boost-accessory switcher mode) and the peak current of high-voltage subsystems 1206 ($i_{INTRNL,PK}$ described above with respect to the boost-internal switcher mode). If a power port is unplugged, the corresponding $i_{ACC,PK,1}$ current is set to zero. The outputs of the balancing calculation are the two boost peak currents ($i_{INTRNL,PK,1}$ and $i_{INTRNL,PK,2}$), which are required to control each bidirectional switcher in the SIDO mode.

The most efficient distribution of power is to balance the total peak currents of the two bidirectional switchers, if possible. This is not possible when one accessory requires more power than the combined power of the other accessory and high-voltage subsystems 1206. In this case, one bidirectional switcher should be dedicated to the more powerful accessory, and the second bidirectional switcher should provide power to the other accessory and high-voltage subsystems 1206. The following calculations determine the $i_{INTRNL,PK}$ and $i_{ACC,PK}$ currents for each SIDO switcher.

First, the three peak currents are summed and divided by two to calculate the nominal total peak current available for each bidirectional switcher:

$$i_{TOTAL,PK} = \frac{i_{ACC,PK,1} + i_{ACC,PK,2} + i_{INTRNL,PK}}{2}$$

The boosted peak current for the bidirectional switcher denoted by the sub-index 1 may be calculated as the nominal total peak current minus the accessory peak current for the bidirectional switcher, where the boosted peak current is limited to be positive and set to 0 of negative:

$$i_{INTRNL,PK,1} = \max(i_{TOTAL,PK} - i_{TOTAL,PK,1}, 0)$$

The boosted peak current for the bidirectional switcher denoted by the sub-index 2 may then be given by the original peak current of high-voltage subsystems 1206 minus the boosted peak current for the first bidirectional switcher:

$$i_{INTRNL,PK,2} = i_{INTRNL,PK} - i_{INTNL,PK,1}$$

Figure 12B:
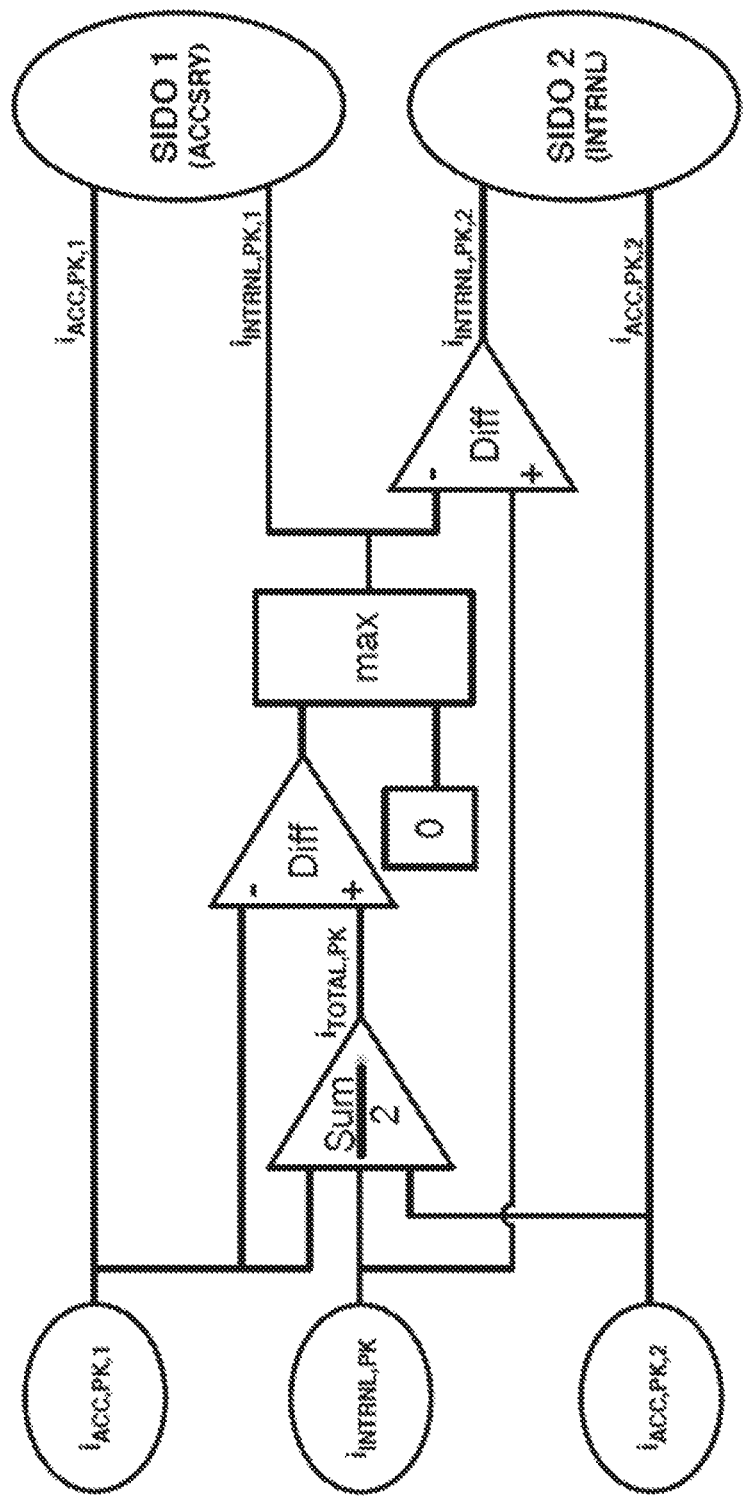
FIG. 12B shows a block diagram of a set of calculations associated with a single switcher mode for a charging system in accordance with the disclosed embodiments.

With two connected accessories, power priority is given to high-voltage subsystems 1206 and the accessory connected to the first power port over the accessory connected to the second power port. Consequently, the bidirectional switcher for the first power port is controlled in the SIDO (accessory) mode, and the bidirectional switcher for the second power port is controlled in the SIDO (boost) mode. The mathematics used to calculate the $i_{INTRNL,PK}$ and $i_{ACC,PK}$ currents for each SIDO switcher can be implemented in analog circuitry, where a block representation is shown in FIG. 12B.

For example, if $i_{ACC,PK,1}$ is about 1.0 A, $i_{ACC,PK,2}$ is about 1.5 A, and $i_{INTRNL,PK}$ is about 2.5 A, the expressions above may be used to balance the peak inductor currents to about 2.5 A with $i_{INTRNL,PK,1}$ equal to about 1.5 A and $i_{INTRNL,PK,2}$ equal to about 1.0 A. If $i_{ACC,PK,1}$ is increased to about 5.0 A, then the inductor peak currents can no longer be balanced. As a result, the total peak current of the first bidirectional switcher is about 5.0 A, the total peak current of the second bidirectional switcher is 4.0 A, $i_{INTRNL,PK,1}$ is equal to about 0.0 A, and $i_{INTRNL,PK,2}$ is equal to about 2.5 A.

Figure 12C:
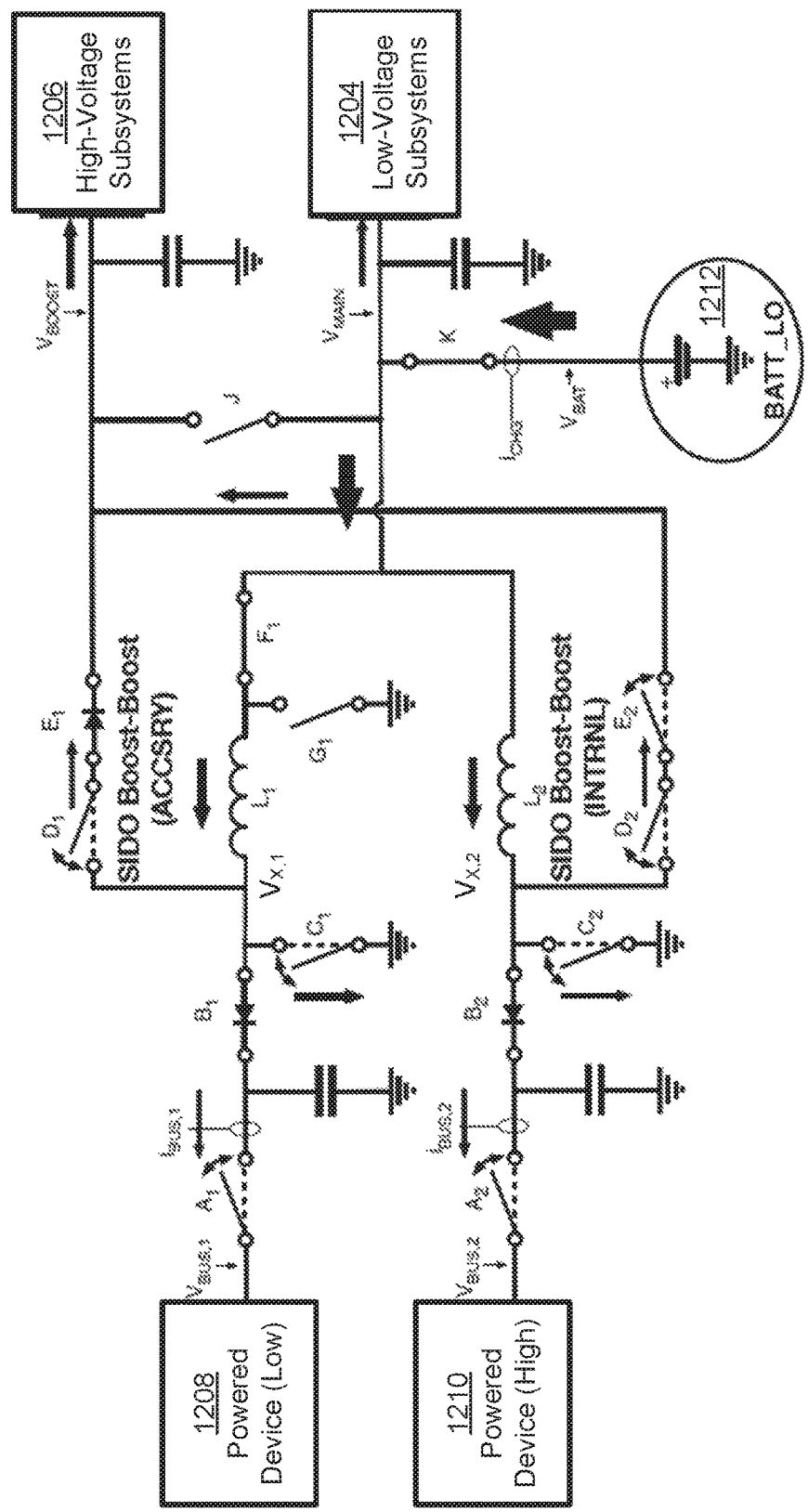
FIG. 12C shows a dual switcher mode for a charging system in accordance with the disclosed embodiments.

FIG. 12C shows a dual switcher mode for a charging system in accordance with the disclosed embodiments. In particular, FIG. 12C shows a combination of bidirectional switcher modes in a charging system that is substantially the same as the charging system of FIG. 12A, however includes a SIDO buck-boost converter of FIG. 4B instead of a SIDO boost converter of FIG. 4A. The SIDO buck-boost converter in FIG. 12C includes additional FETs $F_1$ and $G_1$ and with FET $E_1$ being operated as an ideal diode, while all other features remain substantially the same as the dual switcher mode of FIG. 12A. It should be appreciated that in the control scheme for the charging system of FIG. 12C, the SIDO buck-boost converter of FIG. 12C may be operated as a SIDO boost converter by turning FET $F_1$ ON and FET $G_1$ OFF and operating FET's $A_1$, $B_1$, $C_1$, $D_1$ and $E_1$ the same as a SIDO boost converter as was described in the embodiment of FIG. 12A. Additionally, during operation of charging system of FIG. 12C, FETs $D_2$ and $E_2$ may be controlled to be, at the same time, both ON or both OFF. Adding the FET's $F_1$ and $G_1$ may support low-voltage accessories connected to the power ports and can provide an added functionality of bucking power from one or more low-voltage subsystems 1204 to a low-voltage external accessory connected to one or more power ports such as, for example, to a powered device (Low) 1208.

Figure 13A:
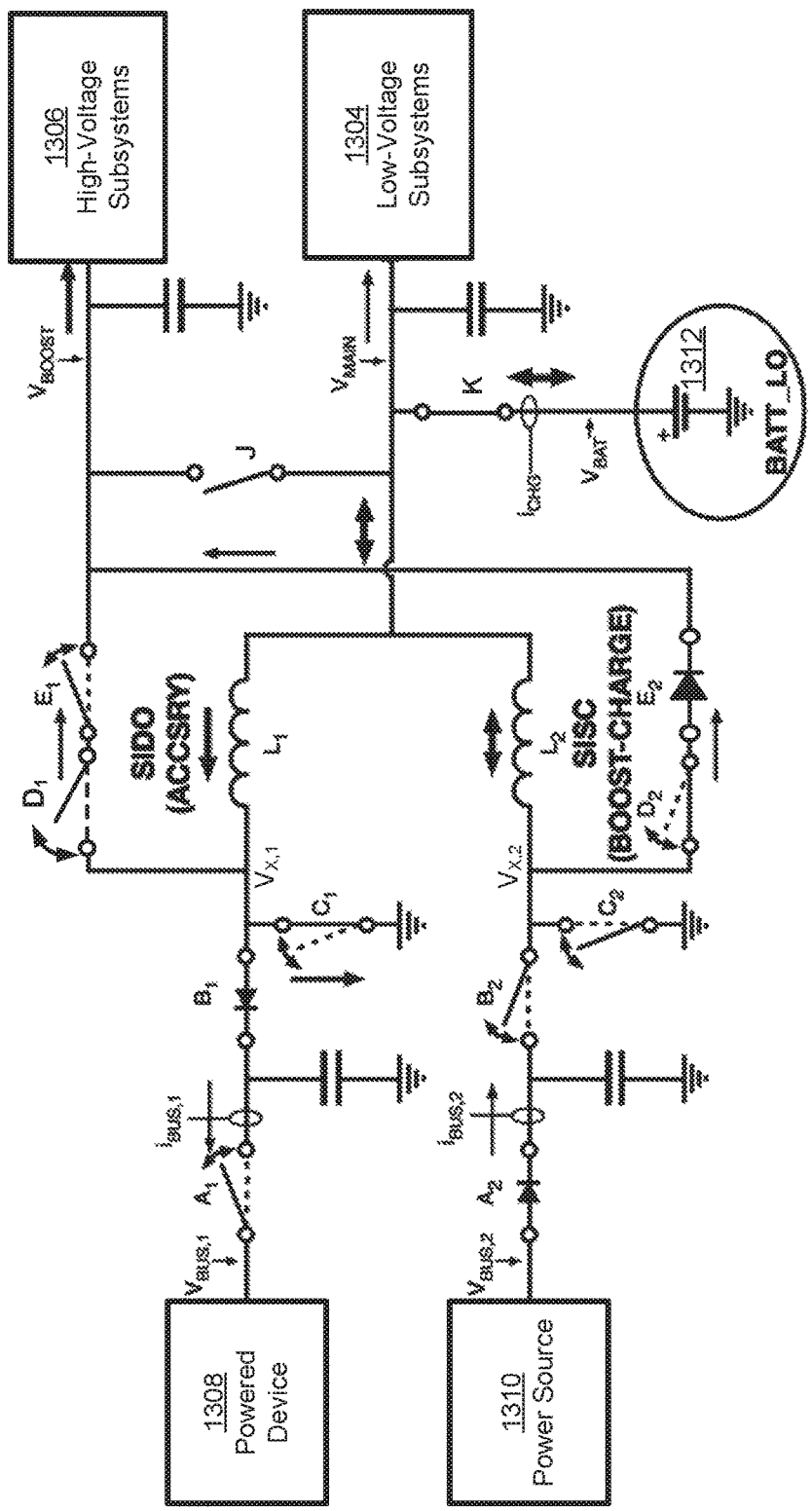
FIG. 13A shows a dual switcher mode for a charging system in accordance with the disclosed embodiments.

Balancing in a Low-Voltage or Under-Voltage State with a Power Source and an Accessory FIG. 13A shows a dual switcher mode for a charging system in accordance with the disclosed embodiments. More specifically, FIG. 13A shows a combination of bidirectional switcher modes when an internal battery 1312 connected to the charging system is in a low-voltage or under-voltage state, one power port is coupled to an accessory 1308 (e.g., a powered device or charging external battery), and another power port is coupled to a power source 1310 such as a power supply or a discharging external battery. In this mode, the bidirectional switchers are in a SISC-SIDO mode, with the bidirectional switcher connected to power source 1310 in the SISC switcher mode and the other bidirectional switcher in the SIDO switcher mode.

The combinations with power source 1310 (e.g., a power supply or discharging battery) and low-voltage and high-voltage powered devices 1308 (e.g., a low-voltage or a high-voltage accessory) coupled to the power ports and battery 1312 in a low-voltage or under-voltage state are summarized in the table below:

| Power Port 1 | Power Port 2 | Switcher 1 | Switcher 2 |
|---|---|---|---|
| Powered Device (HI) | Power Supply (HI) | SIDO Boost-Accessory | SISC Buck-Internal |
| Powered Device (LO) | Power Supply (HI) | SIDO Buck-Accessory | SISC Buck-Internal |
| Powered Device (HI) | Battery | SIDO Boost-Internal | SISC Buck Boost with charge |
| Powered Device (LO) | Battery | SIDO Buck-Internal | SISC Buck Boost with charge |

-continued

| Power Port 1 | Power Port 2 | Switcher 1 | Switcher 2 |
|---|---|---|---|
| Power Supply (HI) | Powered Device (HI) | SISC Buck-Internal | SIDO Boost-Accessory |
| Power Supply (HI) | Powered Device (LO) | SISC Buck-Internal | SIDO Buck-Accessory |
| Battery | Powered Device (HI) | SISC Buck Boost with charge | SIDO Boost-Internal |
| Battery | Powered Device (LO) | SISC Buck Boost with charge | SIDO Buck-Internal |

With powered device 1308 and power source 1310 coupled to the power ports, the SIDO switcher may power one or more high-voltage subsystems 1306, and the SISC switcher may pull as much power as possible from power source 1310 to power one or more low-voltage subsystems 1304.

Inputs to the SISC-SIDO switcher mode of FIG. 13A are the $i_{ACC,PK}$ current according to the servo described above with respect to the boost-accessory mode, the $i_{VALLEY}$ current according to the servo described above with respect to the buck mode and the charge or no-charge sub-state, and the $i_{INTRNL,PK}$ current described above with respect to the boost-internal switcher mode. The SIDO (accessory) mode is controlled by the $i_{ACC,PK}$ current and the $i_{INTRNL,PK}$ current, while the SISC switcher mode requires the $i_{VALLEY}$ current and a residual peak current for high-voltage subsystems called $i_{INTRNL,REMAINING}$.

As described above with respect to the SIDO switcher mode, the $i_{TOTAL,PK}$ current is the sum of the accessory peak current $i_{ACC,PK}$ and the peak current of high-voltage subsystems 1306 $i_{INTRNL,PK}$, limited to the maximum inductor peak current $i_{PEAK,MAX}$:

$$i_{TOTAL,PK} = \min(i_{INTRNL,PK} + i_{ACC,PK}, i_{PEAK,MAX})$$

The boosted peak current for the SISC (boost with charge) or SISC (boost with no-charge) modes $i_{INTRNL,REMAINING}$ may then be calculated as the sum of the accessory peak current $i_{ACC,PK}$ and the peak current of high-voltage subsystems 1306 $i_{INTRNL,PK}$, minus the SIDO's total peak current $i_{TOTAL,PK}$:

$$i_{INTRNL,REMAINING} = i_{INTRNL,PK} + i_{ACC,PK} - i_{TOTAL,PK}$$

Figure 13B:
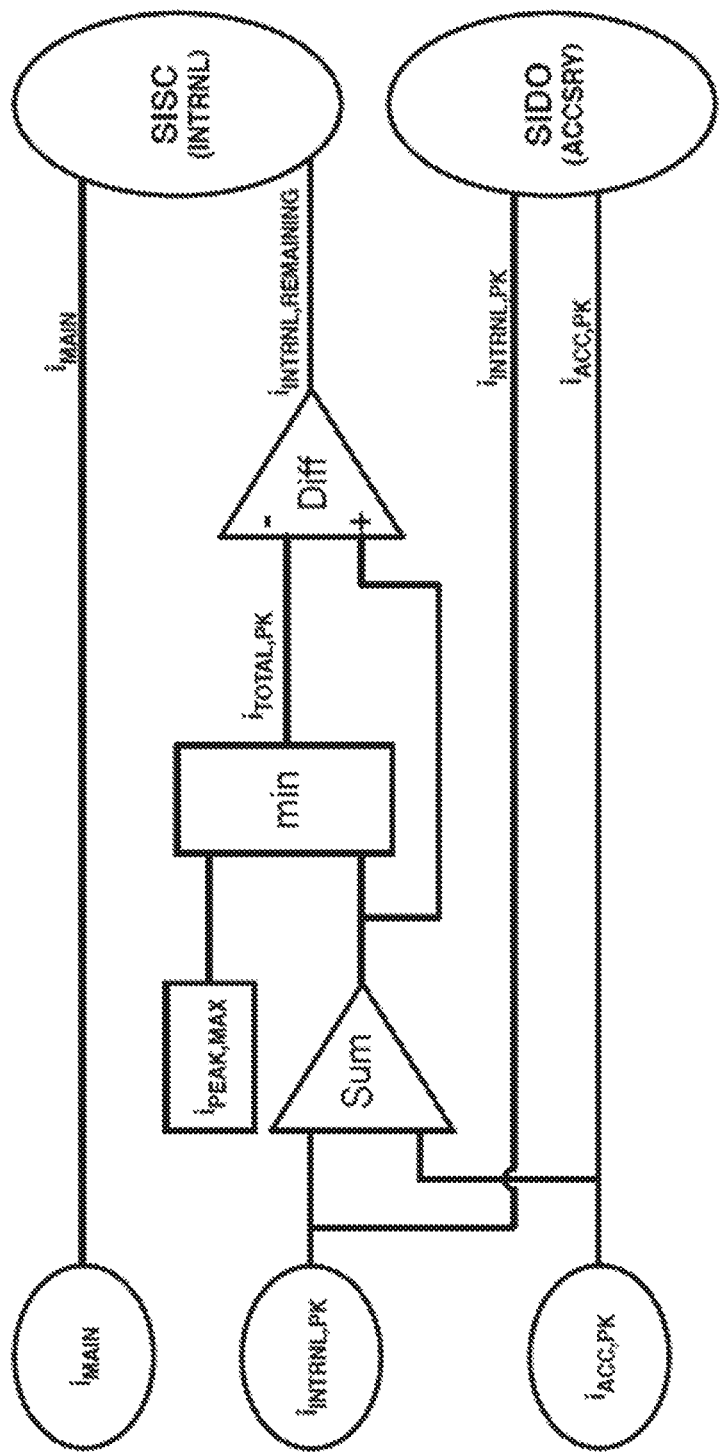
FIG. 13B shows a block diagram of a set of calculations associated with a single switcher mode for a charging system in accordance with the disclosed embodiments.

If the total peak current $i_{TOTAL,PK}$ is not limited by the maximum peak current $i_{PEAK,MAX}$, then the $i_{INTRNL,REMAINING}$ peak current will be zero, and the SISC (boost with charge) or SISC (boost with no-charge) mode will behave identically to the buck mode, which pulls the desired power from power source 1310 by controlling the $i_{VALLEY}$ current. If the SIDO (accessory) switcher is peak-current-limited, then the SISC switcher will provide the residual current to high-voltage subsystems 1306 and no longer draw current from power source 1310 if the residual boost current $i_{INTRNL,REMAINING}$ remains above the minimum peak current level $i_{PEAK,MIN}$ and prevents the SISC mode from entering the buck mode. The mathematics used to calculate the separated boost peak currents $i_{INTRNL,PK}$ and $i_{INTRNL,REMAINING}$ for the SISC and SIDO switchers can be implemented in analog circuitry, where a block representation is shown in FIG. 13B.

Figure 13C:
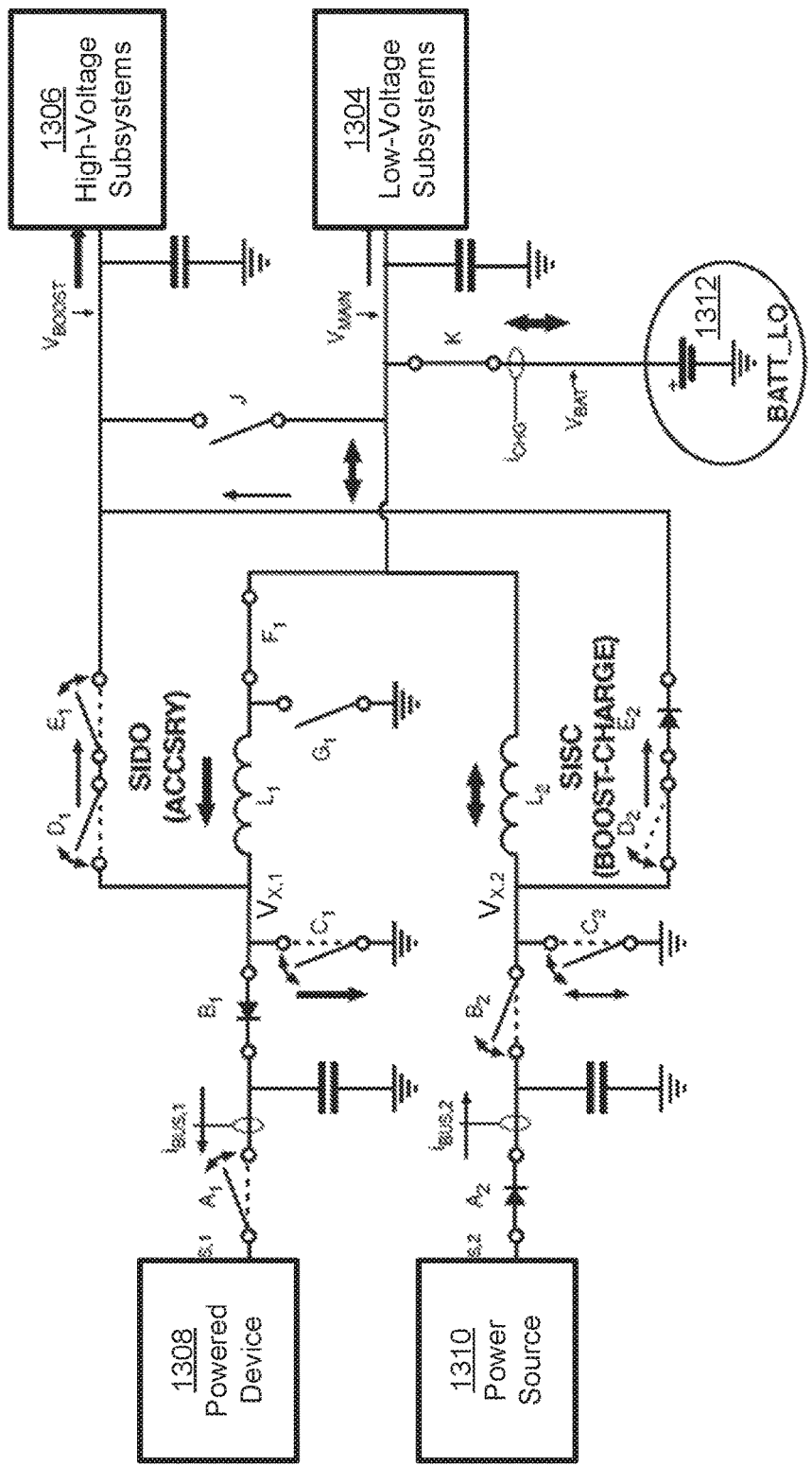
FIG. 13C shows a dual switcher mode for a charging system in accordance with the disclosed embodiments.

FIG. 13C shows a dual switcher mode for a charging system in accordance with the disclosed embodiments. More specifically, FIG. 13C shows a combination of bidirectional switcher modes in a charging system that is substantially the same as the charging system of FIG. 13A but includes a SIDO buck-boost converter of FIG. 4B instead of a SIDO boost converter of FIG. 4A. The SIDO buck-boost converter in FIG. 13C includes additional FETs $F_1$ and $G_1$ and with FET $E_2$ being operated as an ideal diode, while all other features remain substantially the same as the charging system of FIG. 13A. It should be appreciated that in the control scheme for the charging system of FIG. 13C, the SIDO buck-boost converter may be operated as a SIDO boost converter by turning FET $F_1$ ON and FET $G_1$ OFF and operating FET's $A_1$, $B_1$, $C_1$, $D_1$ and $E_1$ the same as a SIDO boost converter as was described in the embodiment of FIG. 13A. Additionally, during operation, FETs $D_1$ and $E_1$ are controlled to be, at the same time, both ON or both OFF. Adding the additional FET's $F_1$ and $G_1$ may support low-voltage accessories connected to the power ports and can provide the additional functionality of bucking power from one or more low-voltage subsystems 1304 to a low-voltage external accessory connected to one or more power ports such as, for example, to a powered device (Low) 1308.

Balancing with Two Power Sources

Figure 14A:
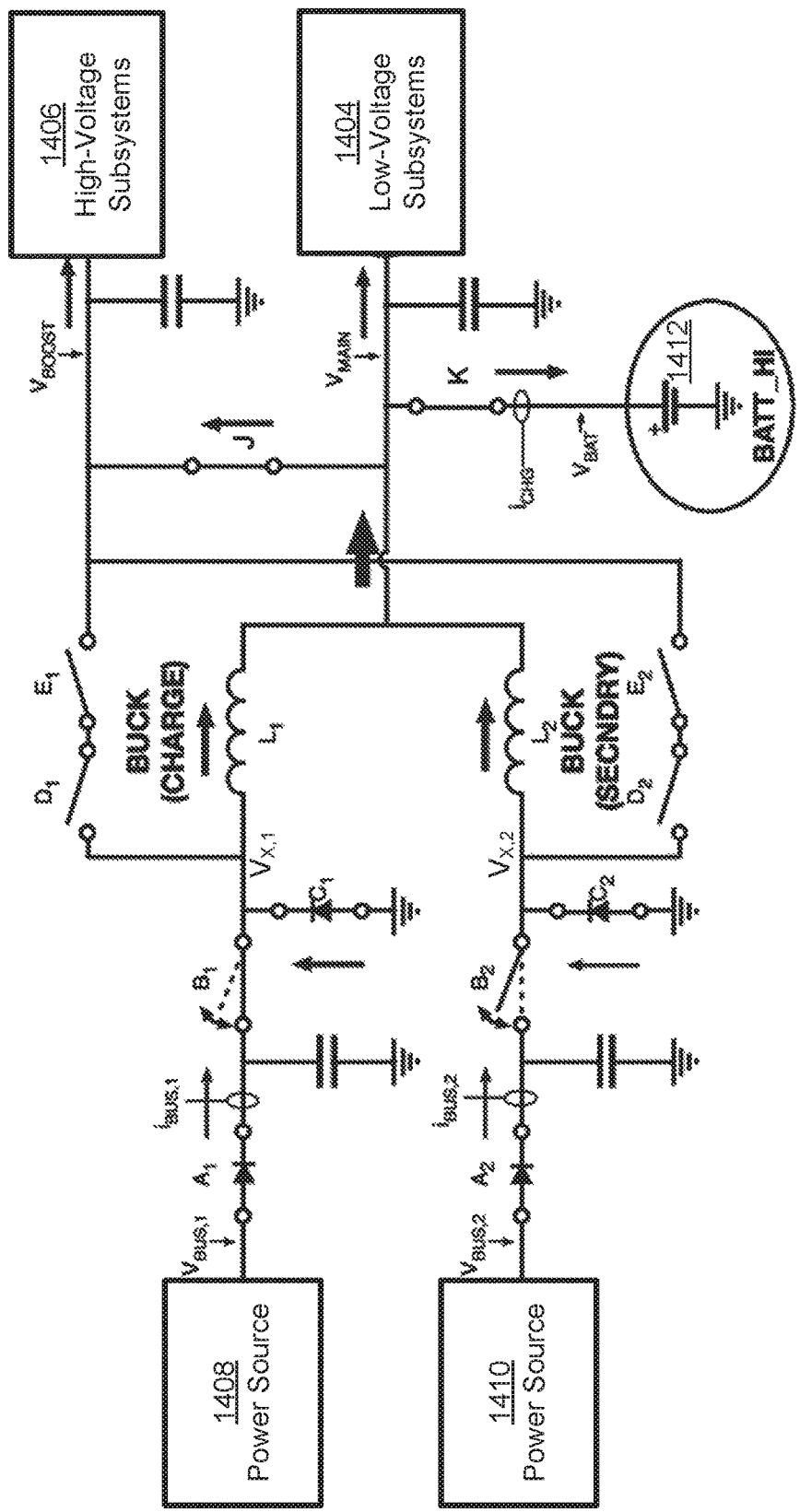
FIG. 14A shows a dual switcher mode for a charging system in accordance with the disclosed embodiments.

FIG. 14A shows a dual switcher mode for a charging system in accordance with the disclosed embodiments. More specifically, FIG. 14A shows a combination of bidirectional switcher modes when an internal battery 1412 connected to the charging system is in a high-voltage state (e.g., "BATT_HI") and power sources 1408-1410 (e.g., DC power supplies, external batteries, etc.) are coupled to both power ports. In this combination, both bidirectional switchers may be used to buck power sources 1408-1410 to one or more low-voltage subsystems 1404 by balancing the current through the bidirectional switchers when possible.

As shown in FIG. 14A, both bidirectional switchers may be in the buck mode, with the sub-state of each buck mode selected based on the charging state of battery 1412 and the capability of the corresponding power source. The capability of the power source may be determined by multiplying the power source's nominal open-circuit voltage by the power source's input current limit to obtain the power source's nominal maximum power. The capability of a given power source may also be advertised by the power source through the corresponding power port.

Of the two power sources 1408-1410, the power source with highest nominal maximum power is considered the primary power source, and the weaker power source is considered the secondary power source. The buck sub-state for the primary power source is set to either charge or no-charge, depending on the charging state of battery 1412, as described with respect to the behavior of FET G above. The buck sub-state for the secondary power source 1410 is set to secondary. As a result, the bidirectional switcher connected to the primary power source 1408 will control either the battery charging voltage and current or the voltage of low-voltage subsystems 1404, and the power will be balanced between the two power sources 1408-1410 until the secondary power source 1410 becomes input-power-limited.

Figure 14B:
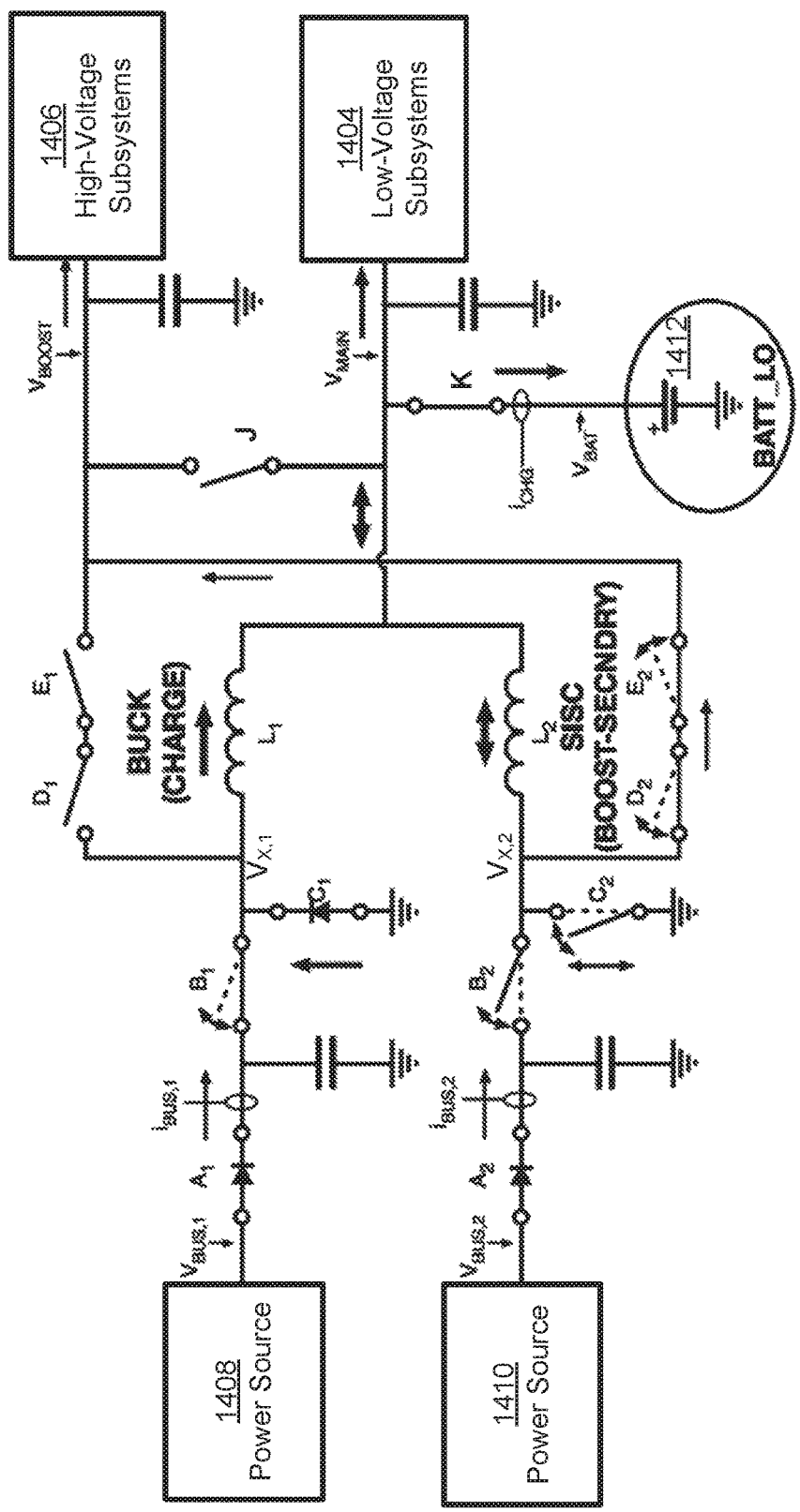
FIG. 14B shows a dual switcher mode for a charging system in accordance with the disclosed embodiments.

Operation of the charging system is similar when battery 1412 is in a low-voltage or under-voltage state, with the combination of bidirectional switcher modes and current flow shown in FIG. 14B. Instead of operating both bidirectional switchers in the buck mode, the bidirectional switcher connected to the secondary power source 1410 is in the SISC (boost-secondary) mode. The bidirectional switcher connected to the primary power source 1408 is in the buck mode and provides power to low-voltage subsystems 1404, while the other bidirectional switcher prioritizes providing power to high-voltage subsystems 1406 in the SISC (boost-secondary) mode. If the load on high-voltage subsystems 1406 is light, the SISC mode can pull current from the secondary power source 1410 and attempt to balance the current between the two power sources 1408-1410, as with the mode of FIG. 14A with battery 1412 in a high-voltage state.

Figure 14C:
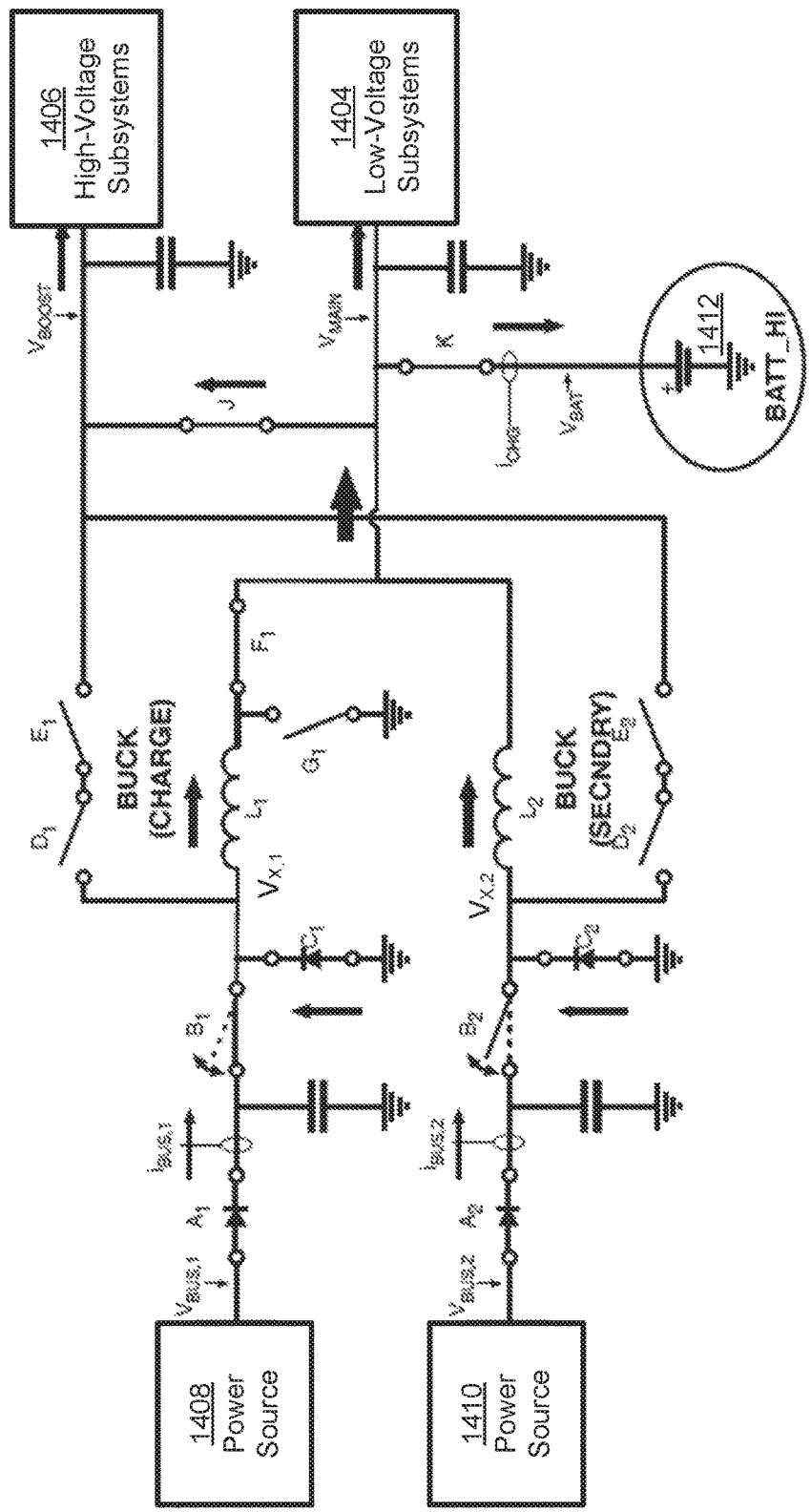
FIG. 14C shows a dual switcher mode for a charging system in accordance with the disclosed embodiments.

FIG. 14C shows a dual switcher mode for a charging system in accordance with the disclosed embodiments. More specifically, FIG. 14C shows a combination of bidirectional switcher modes for a charging system that is substantially the same as the charging system of FIG. 14A but includes a SIDO buck-boost converter of FIG. 4B instead of a SIDO boost converter of FIG. 4A. The SIDO buck-boost converter in FIG. 14C includes additional FETs $F_1$ and $G_1$, while all other features remain substantially the same as the charging system of FIG. 14A. It should be appreciated that in the charging system of FIG. 14C, the SIDO buck-boost converter may be operated as a SIDO boost converter by turning FET $F_1$ ON and FET $G_1$ OFF and operating FET's $A_1$, $B_1$, $C_1$, $D_1$ and $E_1$ the same as a SIDO boost converter as was described in the embodiment of FIG. 14A. Additionally, during operation, FETs $D_1$, $E_1$ and $D_2$, $E_2$ may be controlled to be both OFF at the same time.

Figure 14D:
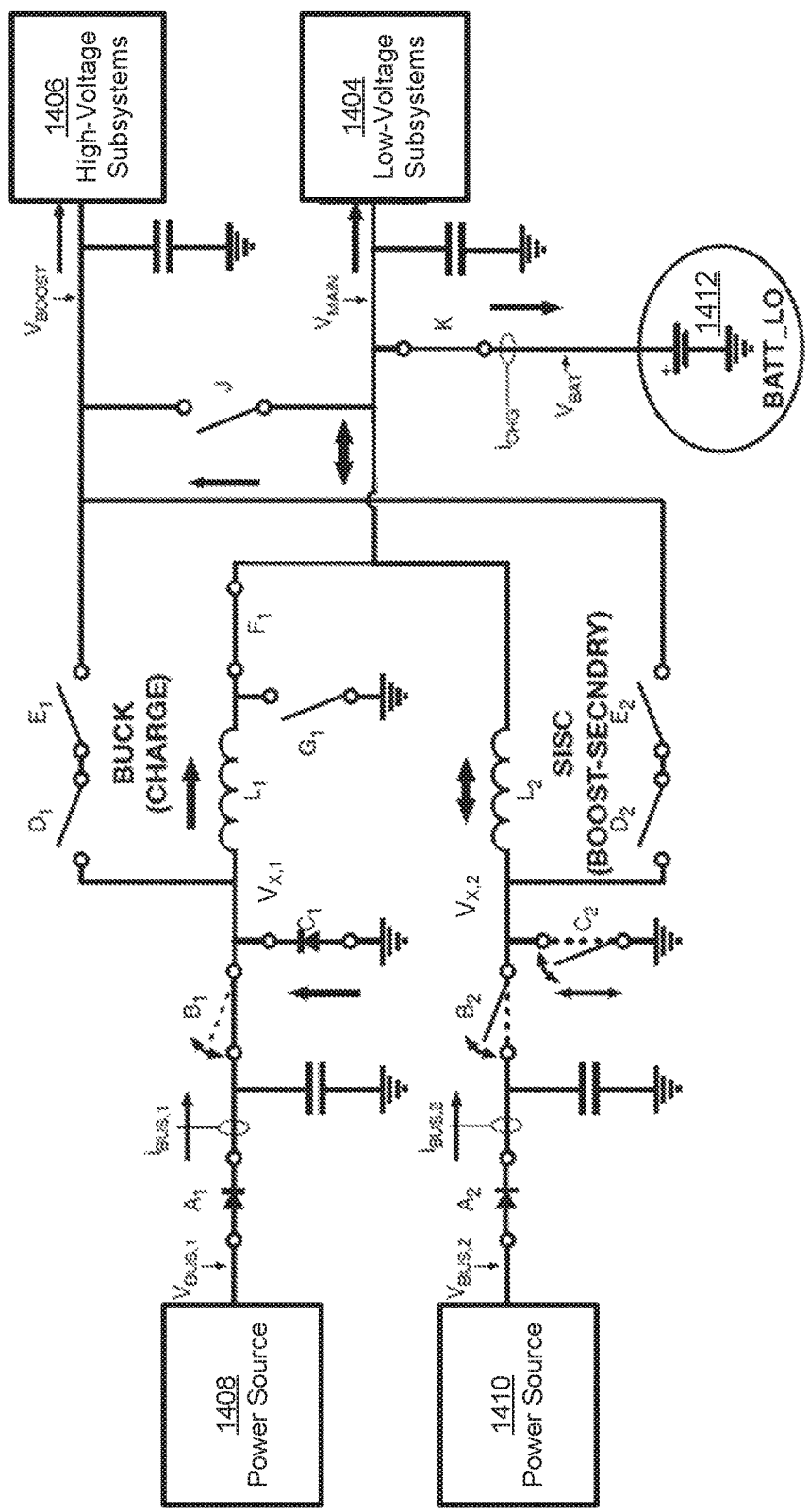
FIG. 14D shows a dual switcher mode for a charging system in accordance with the disclosed embodiments.

FIG. 14D shows a dual switcher mode for a charging system in accordance with the disclosed embodiments. More specifically, FIG. 14D shows a combination of bidirectional switcher modes for a charging system that is substantially the same as the charging system of FIG. 14B but includes a SIDO buck-boost converter of FIG. 4B instead of a SIDO boost converter of FIG. 4A. The SIDO buck-boost converter in FIG. 14C includes additional FETs $F_1$ and $G_1$, while all other features remain substantially the same as the charging system of FIG. 14B. It should be appreciated that in the charging system of FIG. 14D, the SIDO buck-boost converter may be operated as a SIDO boost converter by turning FET $F_1$ ON and FET $G_1$ OFF and operating FET's $A_1$, $B_1$, $C_1$, $D_1$ and $E_1$ the same as a SIDO boost converter (FIG. 4A) as was described in the embodiment of FIG. 14B. Additionally, during operation, FETs $D_1$, $E_1$ are OFF and DETs $D_2$ and $E_2$ may be controlled to be both ON or OFF at the same time.

Charging an External Battery with an Attached Power Source

Figure 15A:
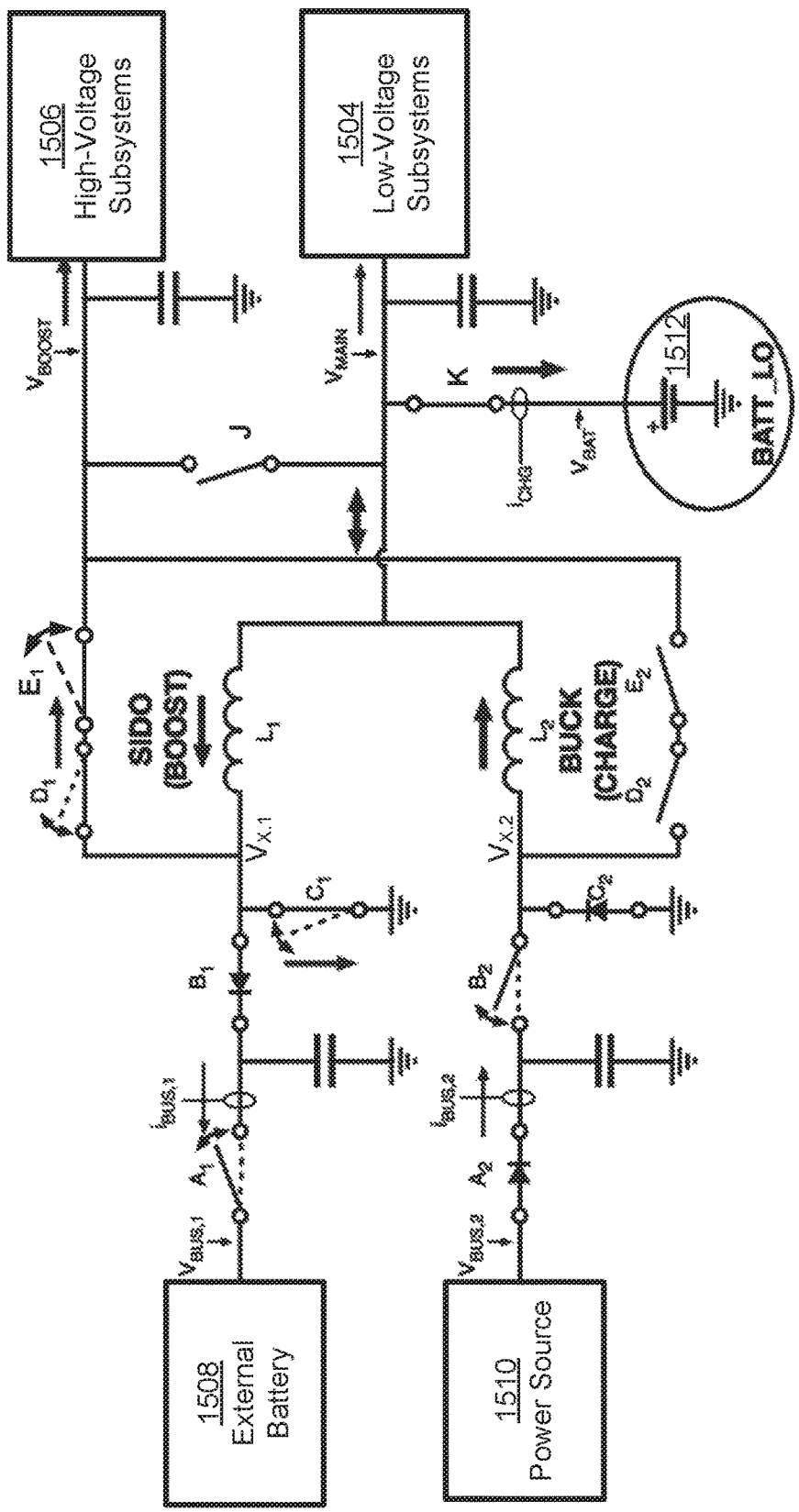
FIG. 15A shows a dual switcher mode for a charging system in accordance with the disclosed embodiments.

FIG. 15A shows a dual switcher mode for a charging system in accordance with the disclosed embodiments. In particular, FIG. 15A shows a combination of bidirectional switcher modes when an internal battery 1512 connected to the charging system is in a low-voltage state (e.g., "BATT_LO") and a power source 1510 (e.g., a DC power supply or an external battery) coupled to one power port is used to charge an external battery 1508 coupled to the other power port. Such charging of external battery 1508 may be performed if available power remains after power source 1510 provides power to one or more low-voltage subsystems 1504, one or more high-voltage subsystems 1506, and battery 1512.

No coordination between the two bidirectional switchers is required in this combination, but detection of available power from power source 1510 to charge external battery 1508 may be required. The six combinations with power source 1510 supplying power to low-voltage subsystems 1504, high-voltage subsystems 1506, internal battery 1512, and external battery 1508 are summarized in the table below:

| Power Port 1 | Power Port 2 | Battery Voltage | Switcher 1 | Switcher 2 |
|---|---|---|---|---|
| Power Source (HI) | Battery (Charging) | High-Voltage | Buck (charge or no-charge) | Buck Boost-Accessory |
| Power Source (HI) | Battery (Charging) | Low-Voltage or Under-Voltage | SISC Buck (charge or no-charge) | SIDO Buck-Boost-Internal |
| Battery (Charging) | Power Source (HI) | High-Voltage | Buck-Boost Accessory | Buck (charge or no-charge) |
| Battery (Charging) | Power Source (HI) | Low-Voltage or Under-Voltage | SIDO Buck Boost-Internal | SISC Buck (charge or no-charge) |
| Battery (Charging) | Battery (Discharging) | High-Voltage | Buck Boost-Accessory | Buck Boost (charge or no-charge) |
| Battery (Charging) | Battery (Discharging) | Low-Voltage or Under-Voltage | SIDO Buck Boost-Internal | Buck Boost (charge or no-charge) |

The power port connected to power source 1510 is operated in the buck mode in the charge or no-charge sub-state. If both power ports are connected to external batteries, then the external battery connected to the second power port is treated identically to a DC power supply. The switcher connected to external battery 1508 is in the boost-accessory or SIDO (boost) mode, depending on the voltage state of external battery 1508. In this mode, power from power source 1510 is prioritized for low-voltage subsystems 1504, high-voltage subsystems 1506, and internal battery 1512. External battery 1508 is charged only if additional power from power source 1510 is available after powering of low-voltage subsystems 1504, high-voltage subsystems 1506, and internal battery 1512.

External battery 1508 remains in a charging state if the bidirectional switcher connected to power source 1510 is not input-power-limited, which is detected when the buck mode of the bidirectional switcher is not limited by either the $V_{BUS}$ voltage or $i_{BUS}$ current limits, as described above with respect to the buck mode. If the buck mode is limited by the $V_{BUS}$ voltage or $i_{BUS}$ current limits but the measured $i_{BUS}$ current is positive into external battery 1508, external battery 1508 may continue to be charged. If the measured $i_{BUS}$ current into battery 1508 reaches zero and the buck mode is input-power-limited, battery 1508 switches from charging to discharging to supplement power from power source 1510, as discussed below.

Figure 15B:
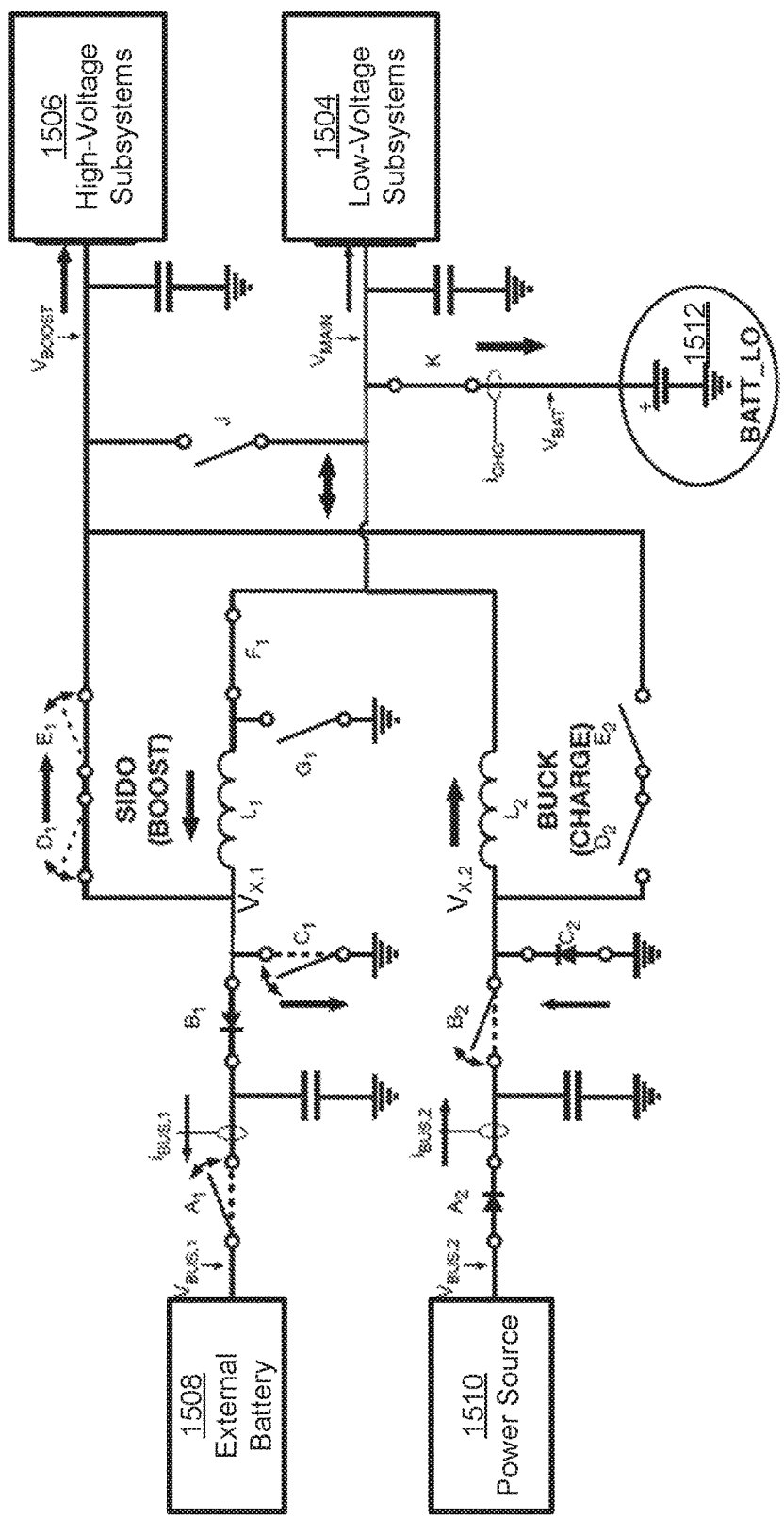
FIG. 15B shows a dual switcher mode for a charging system in accordance with the disclosed embodiments.

FIG. 15B shows a dual switcher mode for a charging system in accordance with the disclosed embodiments. More specifically, FIG. 15B shows a combination of bidirectional switcher modes for a charging system that is substantially the same as the charging system of FIG. 15A but includes a SIDO buck-boost converter of FIG. 4B instead of a SIDO boost converter of FIG. 4A. The SIDO buck-boost converter of FIG. 15B includes additional FETs $F_1$ and $G_1$, while all other features remain substantially the same as the charging system of FIG. 15A. It should be appreciated that in the charging system of FIG. 15B, the SIDO buck-boost converter may be operated in a buck-boost mode or a buck mode as described in the embodiments above by turning FET $F_1$ ON and FET $G_1$ OFF and operating FET's $A_1$, $B_1$, $C_1$, $D_1$ and $E_1$ the same as a SIDO boost converter as was described in the embodiment of FIG. 15A. Additionally, during operation, FETs $D_2$ and $E_2$ are OFF and FETs $D_1$ and $E_1$ may be controlled to be both ON or both OFF at the same time.

Supplementing a Power Source with an External Battery

FIGS. 16A-16F show a dual switcher mode for a charging system in accordance with the disclosed embodiments. In particular, FIGS. 16A-16F show different combinations of bidirectional switcher mode when a power source 1610 connected to one power port does not have enough power to fully power one or more low-voltage subsystems 1604 and one or more high-voltage subsystems 1606 and charge an internal battery 1612. In these modes, an external battery 1608 coupled to the other power port is used to supplement the power from power source 1610. The combinations with external battery 1608 supplementing power source 1610 are summarized in the table below:

| Power Port 1 | Power Port 2 | Battery Voltage | Switcher 1 | Switcher 2 |
| --- | --- | --- | --- | --- |
| Power Source (HI) | Battery (Discharging) | High-Voltage | Buck (primary) | Buck Boost (charge) |
| Power Source (HI) | Battery (Discharging) | Low-Voltage or Under-voltage | #1: SISC Buck-Internal (primary) #2: SISC Buck (charge) | #1: SISC Buck Boost (charge) #2: SISC (Buck Boost-Internal(secondary) |
| Battery (Discharging) | Power Source (HI) | High-Voltage | Buck Boost (charge) | Buck (primary) |
| Battery (Discharging) | Power Source (HI) | Low-Voltage or Under-voltage | #1: SISC Buck Boost (charge) #2: SISC (Buck Boost-Internal(secondary) | #1: SISC Buck-Internal (primary) #2: SISC Buck (charge) |

If the buck switcher assigned to power source 1610 is limited by the $V_{BUS}$ voltage or $i_{BUS}$ current limits and the measured $i_{BUS}$ current is zero into external battery 1608 in the other power port, the mode transitions from charging of external battery 1608 described above to using external battery 1608 to supplement power from power source 1610 in this section. If power source 1610 is not limited by the $V_{BUS}$ voltage or $i_{BUS}$ current limits, the mode transitions back to charging of external battery 1608.

Figure 16A:
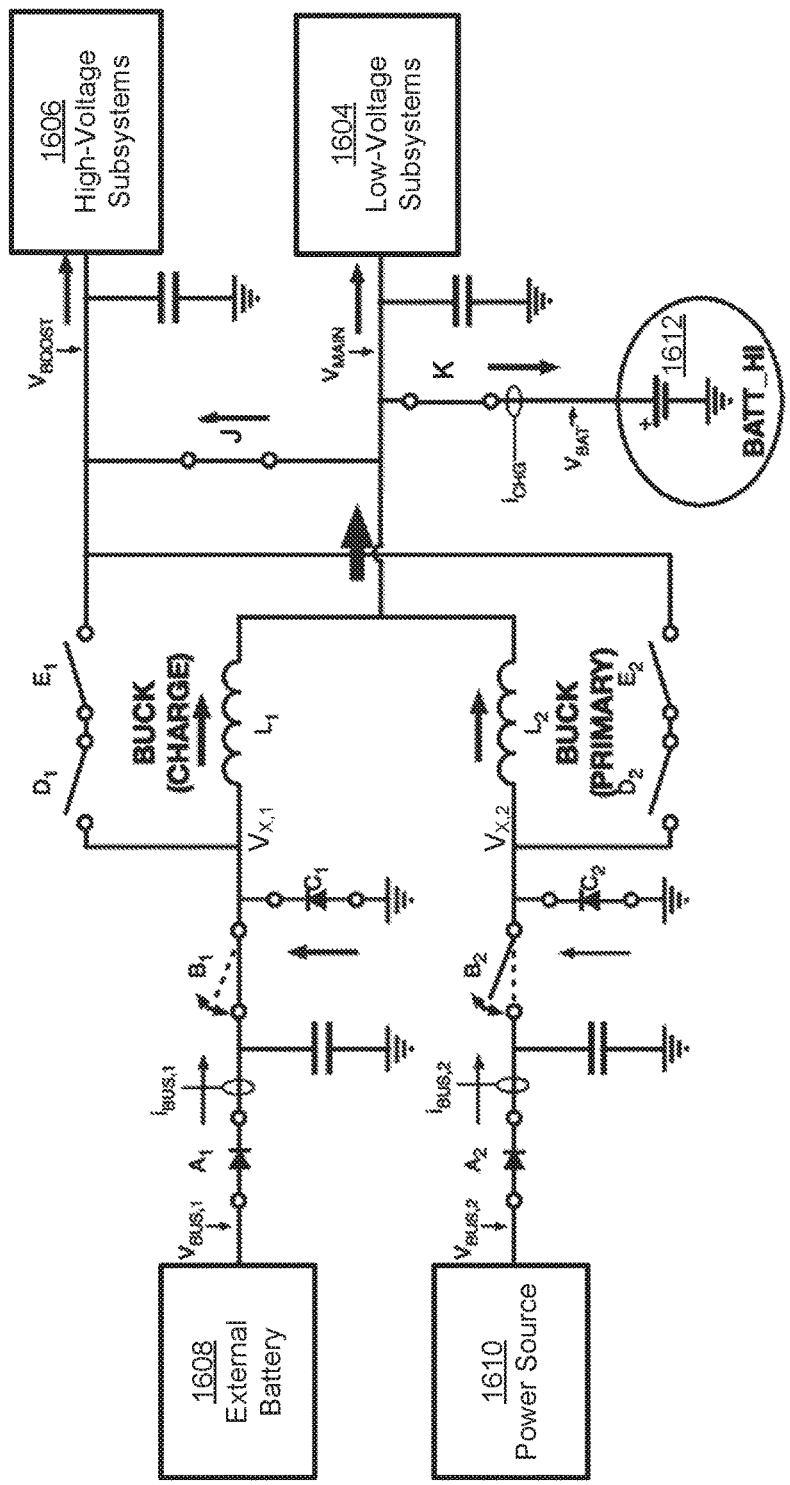
FIG. 16A shows a dual switcher mode for a charging system in accordance with the disclosed embodiments.

If internal battery 1612 is in a high-voltage state, most of the external power should be provided by power source 1610, and external battery 1608 may supplement power as needed. As a result, the bidirectional switcher coupled to external battery 1608 may be operated in the buck mode in the charge or no-charge sub-state, and the bidirectional switcher coupled to power source 1610 may be operated in the buck mode in the primary sub-state, as shown in FIG. 16A.

If internal battery 1612 is in a low-voltage state, the desired behavior is to pull as much power as possible from power source 1610, while power from external battery 1608 is used to supplement power source 1610 and simultaneously boosted to high-voltage subsystems 1606. However, the SISC switcher mode does not allow the bidirectional switcher connected to external battery 1608 to simultaneously buck and boost.

Consequently, the bidirectional switchers may be executed with two combinations of SISC switcher modes.

Figure 16B:
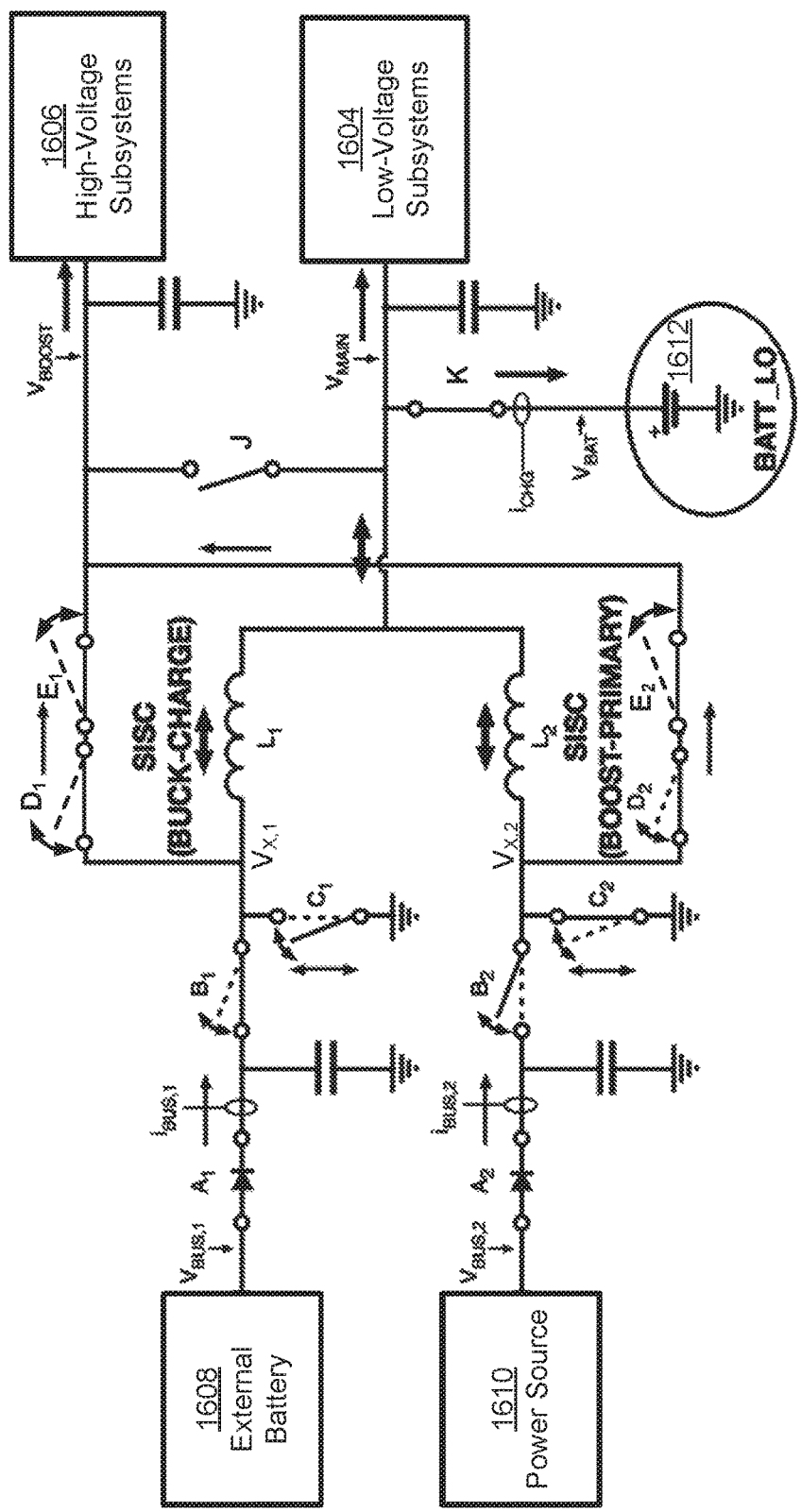
FIG. 16B shows a dual switcher mode for a charging system in accordance with the disclosed embodiments.

The first combination may configure the bidirectional switcher coupled to power source 1610 in the SISC (boost-primary) mode and the bidirectional switcher coupled to external battery 1608 in the SISC (buck with charge or no-charge) mode, as shown in FIG. 16B. If the boosted peak current $i_{INTRNL,PK}$ is greater than the minimum peak current $i_{PEAK,MIN}$, power source 1610 may be cut off as the SISC (boost-primary) mode reduces to the boost-internal mode. The SISC (buck with charge or no-charge) mode may reduce to the buck (charge or no-charge) mode when the negative $i_{VALLEY}$ current is more negative than $-i_{PEAK,MIN}$, and external battery 1608 may be the only external power source for the charging system.

The first combination may be associated with a number of disadvantages. First, if substantial current is needed for high-voltage subsystems 1606, power source 1610 may not be able to supply power to the charging system. Second, because power source 1610 cannot become input-voltage- or input-current-limited, there is no way to detect when external battery 1608 should stop supplementing power source 1610 and return to charging from power source 1610.

Figure 16C:
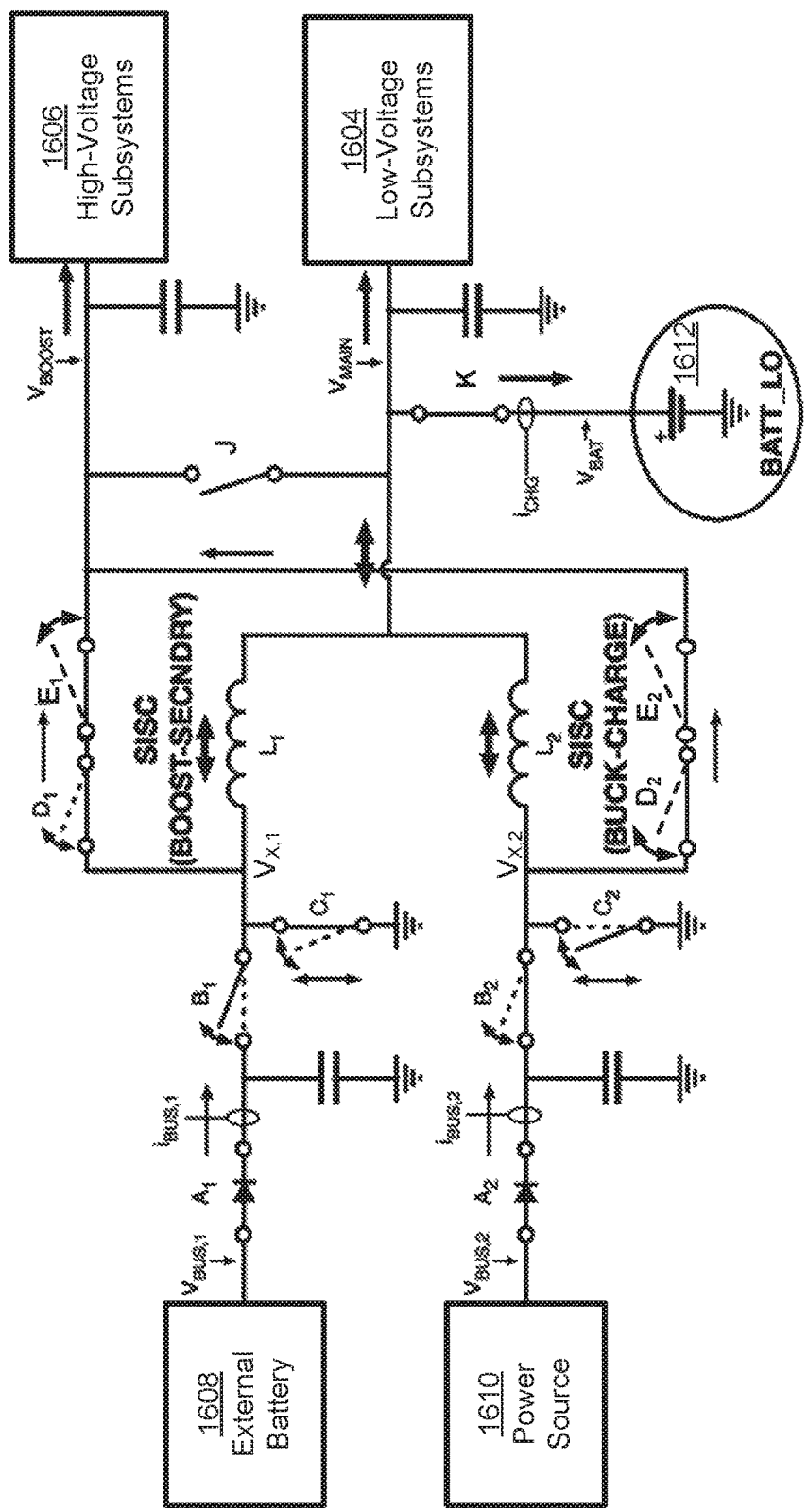
FIG. 16C shows a dual switcher mode for a charging system in accordance with the disclosed embodiments.

The second combination may configure the bidirectional switcher coupled to power source 1610 in the SISC (buck with charge or no-charge) mode and the bidirectional switcher coupled to external battery 1608 in the SISC (boost-secondary) mode, as shown in FIG. 16C. If the boosted peak current $i_{INTRNL,PK}$ is greater than the minimum peak current $i_{PEAK,MIN}$, external battery 1608 may be cut off as the SISC (boost-primary) mode reduces to the boost-internal mode. The SISC (buck with charge or no-charge) mode may reduce to the buck (charge or no-charge) mode when the negative $i_{VALLEY}$ current is more negative than $-i_{PEAK,MIN}$, and power source 1610 may be the only external power source for the charging system.

The benefit of the second combination is that the transition from using external battery 1608 to supplement power source 1610 to charging from power source 1610 can be detected if power source 1610 is not limited by the $V_{BUS}$ voltage or $i_{BUS}$ current limits. On the other hand, external battery 1608 does not discharge, while internal battery 1612 may continue discharging if power source 1610 cannot provide sufficient power to all internal subsystems 1604-1606 and internal battery 1612. Consequently, internal battery 1612 could discharge below the voltage requirement of low-voltage subsystems 1604, and the portable electronic device may switch off. An undesirable user experience may then arise when power source 1610 is subsequently unplugged and external battery 1608 is able to provide power to the charging system. In other words, the charging system may shut down while plugged into an underpowered power source 1610 because not enough power is provided by power source 1610, while at the same time external battery 1608 can sufficiently power the charging system but cannot be discharged until power source 1610 is unplugged.

The disadvantages of the first and second combinations may be balanced by alternately switching between the two combinations. For example, a majority of time may be spent in the first combination, and a switch to the second combination may occasionally be made to detect when a transition to the charging mode described above can be made. By spending most of the time in the first combination, external battery 1608 will drain while providing most of the power to low-voltage subsystems 1604, high-voltage subsystems 1606, and battery 1612. Once the charge in external battery 1608 is fully depleted, only the second combination is used.

Because the operation of the charging system depends on power port states that includes low- and high-powered devices and low- and high-power sources (e.g., unplugged, low-power accessory, high-power accessory, low-power source, high-power source, external battery) for each of two power ports and two differentiated internal battery states (e.g., high-voltage, low-voltage or under-voltage), the charging system may be operated using a plurality of possible modes, which are shown in the following table:

| Power Port 1 | Power Port 2 | Battery Voltage | Switcher 1 | Switcher 2 |
|---|---|---|---|---|
| Unplugged | Unplugged | High-Voltage | Disabled | Disabled |
| Unplugged | Unplugged | Low-Voltage or Under-Voltage | Boost-internal | Disabled |
| Unplugged | Powered Device (LO or HI) | High-Voltage | Disabled | Buck-Accessory or Boost-Accessory |
| Unplugged | Powered Device (LO or HI) | Low-Voltage or Under-Voltage | Boost-internal | Buck-Accessory or Boost-Accessory |
| Unplugged | Power Source (HI) | High-Voltage | Disabled | Buck |
| Unplugged | Power Source (HI) | Low-Voltage or Under-Voltage | Boost-internal | Buck |
| Unplugged | Battery | High-Voltage | Disabled | Buck Boost |
| Unplugged | Battery | Low-Voltage or Under-Voltage | Boost-internal | Buck Boost |
| Powered Device (LO or HI) | Unplugged | High-Voltage | Buck-Accessory or Boost-Accessory | Disabled |
| Powered Device (LO or HI) | Unplugged | Low-Voltage or Under-Voltage | Buck-Accessory or Boost-Accessory | Boost-internal |
| Powered Device (LO or HI) | Powered Device (LO or HI) | High-Voltage | Buck-Accessory or Boost-Accessory | Buck-Accessory or Boost-Accessory |
| Powered Device (LO or HI) | Powered Device (LO or HI) | Low-Voltage or Under-Voltage | SIDO Buck-Accessory or SIDO Boost-Accessory | SIDO Buck-Internal or SIDO Boost-Internal |
| Powered Device (LO or HI) | Power Source (HI) | High-Voltage | Buck-Accessory or Boost-Accessory | Buck |
| Powered Device (LO or HI) | Power Source | Low-Voltage or Under-Voltage | SIDO Buck-Accessory or SIDO Boost-Accessory | SISC Buck-Internal |
| Powered Device (LO or HI) | Battery | High-Voltage | Buck-Accessory or Boost-Accessory | Buck Boost |
| Powered Device (LO or HI) | Battery | Low-Voltage or Under-Voltage | Buck-Accessory or Boost-Accessory | SISC Buck Boost-Internal |
| Power Source (HI) | Unplugged | High-Voltage | Buck | Disabled |
| Power Source (HI) | Unplugged | Low-Voltage or Under-Voltage | Buck | Boost-internal |
| Power Source (HI) | Powered Device (LO or HI) | High-Voltage | Buck | Buck-Accessory or Boost-Accessory |
| Power Source (HI) | Powered Device (LO or HI) | Low-Voltage or Under-Voltage | SISC Buck-Internal | SIDO Buck-Accessory or SIDO Boost-Accessory |
| Power Source (HI) | Power Source (HI) | High-Voltage | Buck (Charge) | Buck (secondary) |
| Power Source (HI) | Power Source (HI) | Low-Voltage or Under-Voltage | Buck (Charge) | Buck (Secondary) |
| Power source (HI) | Battery | High-Voltage | Buck | Buck Boost |

| Power Port 1 | Power Port 2 | Battery Voltage | Switcher 1 | Switcher 2 |
| --- | --- | --- | --- | --- |
| Power Source (HI) | Battery | Low-Voltage or Under-Voltage | Buck or SISC | SIDO or SISC |
| Battery | Unplugged | High-Voltage | Buck Boost | Disabled |
| Battery | Unplugged | Low-Voltage or Under-Voltage | Buck Boost | Boost-internal |
| Battery | Powered Device (LO or HI) | High-Voltage | Buck Boost | Buck-Accessory or Boost-Accessory |
| Battery | Powered Device (LO or HI) | Low-Voltage or Under-Voltage | SISC | SIDO |
| Battery | Power Source (HI) | High-Voltage | Buck Boost | Buck |
| Battery | Power Source (HI) | Low-Voltage or Under-Voltage | SIDO or SISC | Buck or SISC |
| Battery | Battery | High-Voltage | Buck Boost | Buck Boost |
| Battery | Battery | Low-Voltage or Under-Voltage | SIDO or SISC | Buck or SISC |

Consequently, the above-described bi-directional two-port battery charging circuit may charge an internal battery if power is provided through other or both power ports. The power ports can also be used to provide power to attached external accessories. An external battery may be connected to a power port to provide additional power and/or obtain charge from a power supply connected to the other power port. The charging circuit may additionally extend runtime by providing a boosted voltage rail that allows the portable electronic device to continue to run after the internal battery voltage drops below the minimum voltage required by the high-voltage subsystems. Such functionality may be provided using a design that requires only two inductors to minimize the required board space.

Figure 16D:
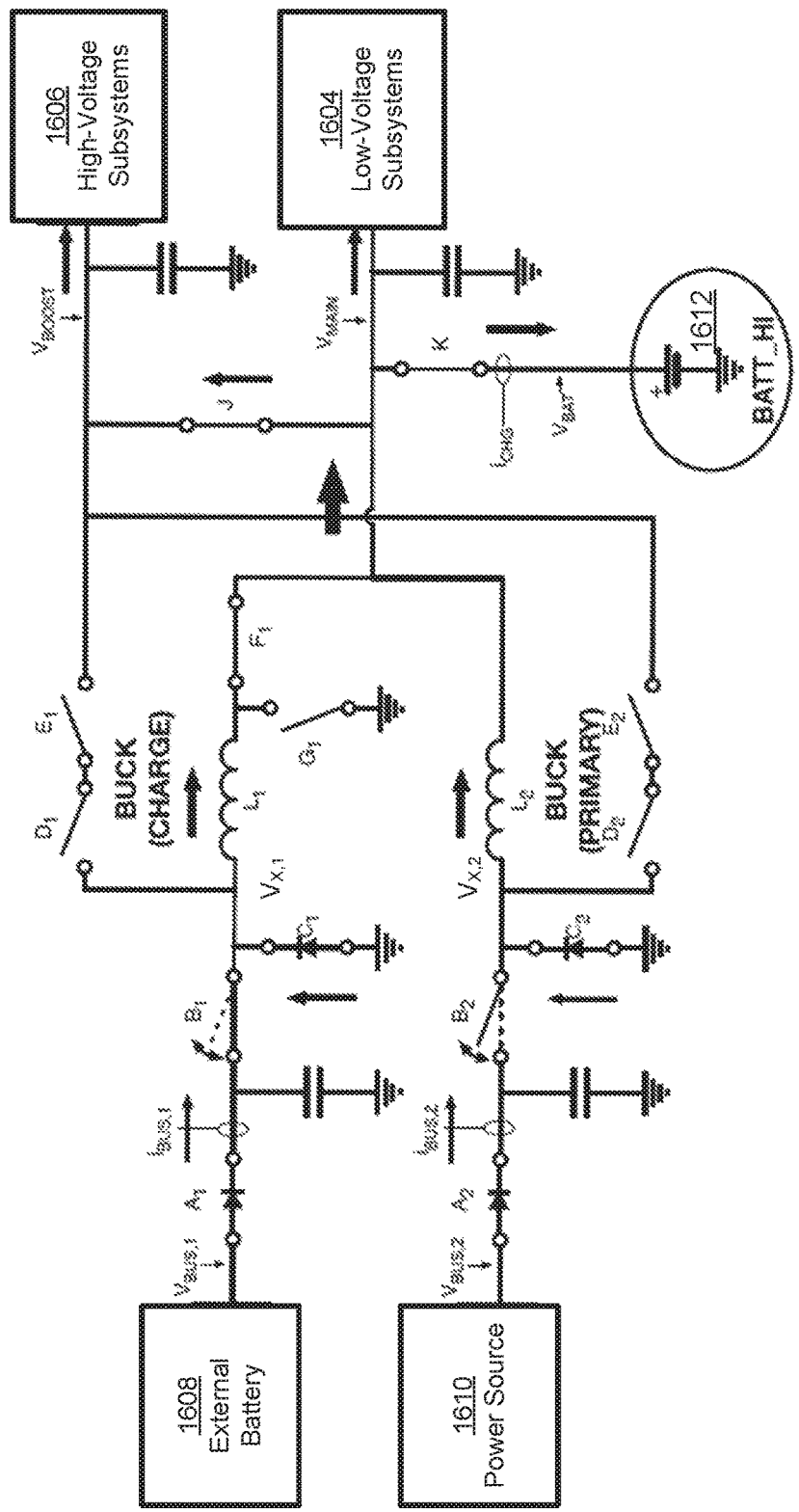
FIG. 16D shows a dual switcher mode for a charging system in accordance with the disclosed embodiments.
Figure 16E:
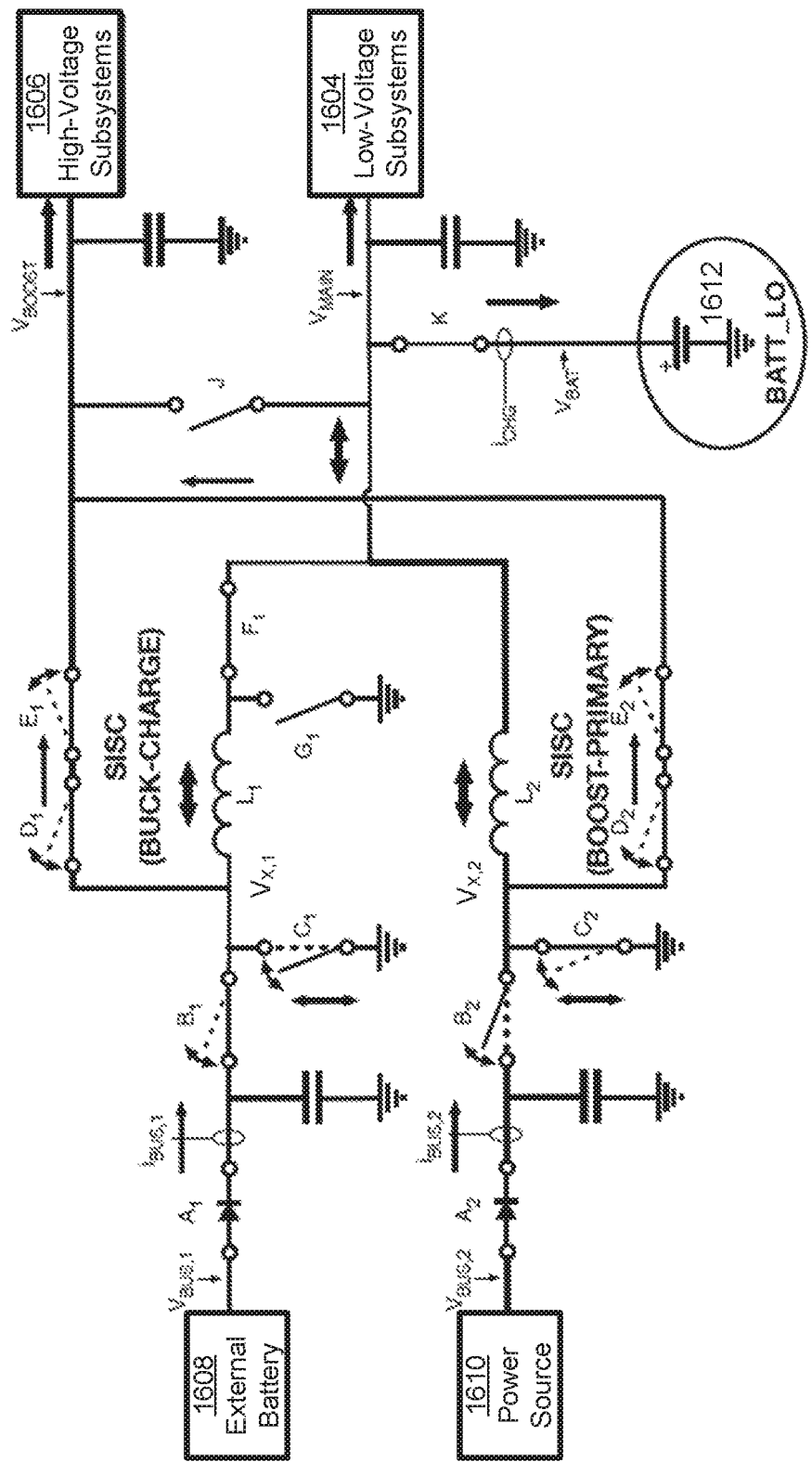
FIG. 16E shows a dual switcher mode for a charging system in accordance with the disclosed embodiments.
Figure 16F:
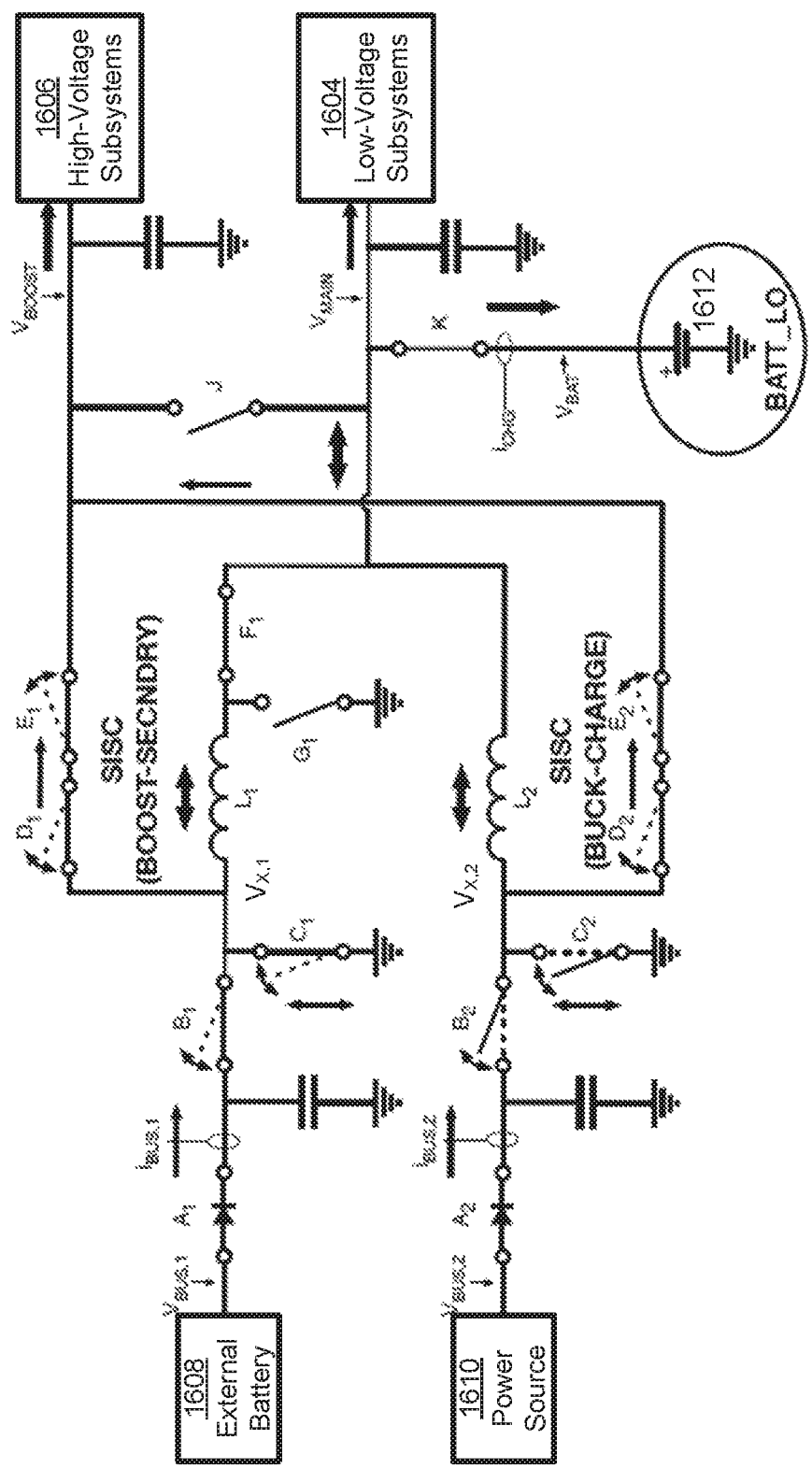
FIG. 16F shows a dual switcher mode for a charging system in accordance with the disclosed embodiments.
Figure 17:
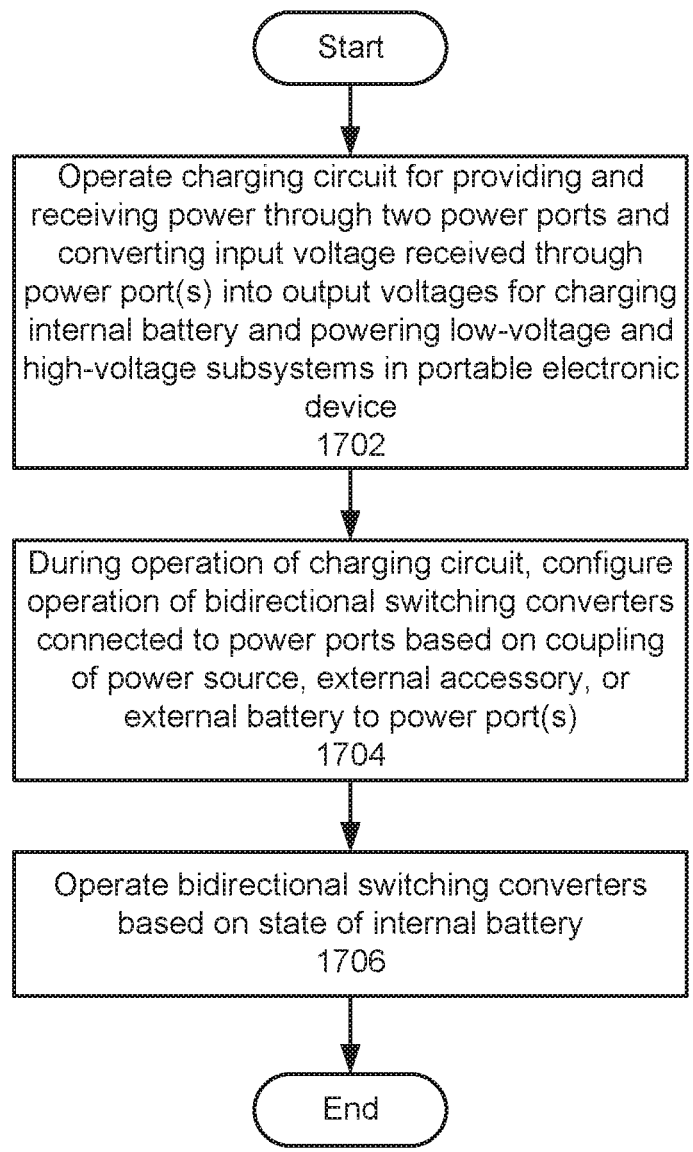
FIG. 17 shows a flowchart illustrating the process of managing use of a portable electronic device in accordance with the disclosed embodiments.

FIG. 16D shows a dual switcher mode for a charging system in accordance with the disclosed embodiments. More specifically, FIG. 16D shows a combination of a charging system that is substantially the same as the charging system of FIG. 16A but includes a SIDO buck-boost converter of FIG. 4B instead of a SIDO boost converter of FIG. 4A. The SIDO buck-boost converter of FIG. 16D includes additional FETs $F_1$ and $G_1$, while all other features remain substantially the same as the charging system of FIG. 16A. It should be appreciated that in the charging system of FIG. 16D, the SIDO buck-boost converter may be operated as a SIDO boost converter by turning FET $F_1$ ON and FET $G_1$ OFF and operating FET's $A_1$, $B_1$, $C_1$, $D_1$ and $E_1$ the same as a SIDO boost converter as was described in the embodiment of FIG. 16A. Additionally, during operation, each FET pair $D_1$ and $E_1$ and FET pair $D_2$ and $E_2$ may be controlled to be both OFF at the same time. The circuit of charging system may also enable buck and buck-boost modes using FETs $F_1$ and $G_1$ and can support low- and high-powered devices and low- and high-power sources (e.g., unplugged, low-power accessory, high-power accessory, low-power source, high-power source, external battery) connected to each of two power ports and two differentiated internal battery states (e.g., high-voltage, low-voltage or under-voltage), FIG. 16E shows a dual switcher mode for a charging system in accordance with the disclosed embodiments. More specifically, FIG. 16E shows a combination of a charging system that is substantially the same as the charging system of FIG. 16B but includes a SIDO buck-boost converter of FIG. 4B instead of a SIDO boost converter of FIG. 4A. The SIDO buck-boost converter of FIG. 16E includes additional FETs $F_1$ and $G_1$, while all other features remain substantially the same as the charging system of FIG. 16B. It should be appreciated that in the charging system of FIG. 16E, the SIDO buck-boost converter may be operated as a SIDO boost converter by turning FET $F_1$ ON and FET $G_1$ OFF and operating FET's $A_1$, $B_1$, $C_1$, $D_1$ and $E_1$ the same as a SIDO boost converter as was described in the embodiment of FIG. 16B. Additionally, during operation, FET pair $D_1$ and $E_1$ and FET pair $D_2$ and $E_2$ may be controlled to be, at the same time, both ON or both OFF. The circuit of charging system may also enable buck and buck-boost modes using FETs $F_1$ and $G_1$ and can support low- and high-powered devices and low- and high-power sources (e.g., unplugged, low-power accessory, high-power accessory, low-power source, high-power source, external battery) connected to each of two power ports and two differentiated internal battery states (e.g., high-voltage, low-voltage or under-voltage), FIG. 16F shows a dual switcher mode for a charging system in accordance with the disclosed embodiments. More specifically, FIG. 16F shows a combination of a charging system that is substantially the same as the charging system of FIG. 16C but includes a SIDO buck-boost converter of FIG. 4B instead of a SIDO boost converter of FIG. 4A. The SIDO buck-boost converter of FIG. 16F includes additional FETs $F_1$ and $G_1$, while all other features remain substantially the same as the charging system of FIG. 16C. It should be appreciated that in the charging system of FIG. 16F, the SIDO buck-boost converter may be operated as a SIDO boost converter by turning FET $F_1$ ON and FET $G_1$ OFF and operating FET's $A_1$, $B_1$, $C_1$, $D_1$ and $E_1$ the same as a SIDO boost converter as was described in the embodiment of FIG. 16C. Additionally, during operation, each FET pair D1 and E1 and FET pair D2 and E2 may be controlled to be both ON at the same time or both OFF at the same time. The circuit of charging system may also enable buck and buck-boost modes using FETs $F_1$ and $G_1$ and can support low- and high-powered devices and low- and high-power sources (e.g., unplugged, low-power accessory, high-power accessory, low-power source, high-power source, external battery) connected to each of two power ports and two differentiated internal battery states (e.g., high-voltage, low-voltage or under-voltage), FIG. 17 shows a flowchart illustrating the process of managing use of a portable electronic device in accordance with the disclosed embodiments. In one or more embodiments, one or more of the steps may be omitted, repeated, and/or performed in a different order. Accordingly, the specific arrangement of steps shown in FIG. 17 should not be construed as limiting the scope of the embodiments.

Initially, a charging circuit for providing and receiving power through two power ports and converting an input voltage received through one or both power ports into output voltages for charging an internal battery and powering low-voltage and high-voltage subsystems in the portable electronic device is operated (operation 1702). For example, the charging circuit may include one or more power converters and a control circuit that operates the power converter(s) in a mode, among others, that charges an external battery coupled to the first power port from a power source coupled to the second power port.

In particular, during operation of the charging circuit, the operation of bidirectional switching converters connected to the power ports is configured based on the coupling of a power source, external accessory, or an external battery to one or both power ports (operation 1704). Each bidirectional switching converter may include an inductor and a set of switching mechanisms. For example, the bidirectional switching converters may include a SIDO boost converter, a SIDO buck-boost converter, a dual-output SEPIC converter, and/or other types of bidirectional power converters. Operation of the bidirectional switching converters may include, but is not limited to: up-converting power from the low-voltage subsystem to an external accessory or an external battery coupled to the power port, up-converting power from the low-voltage subsystem to the high-voltage subsystem with no power coming in or out of the power port, down-converting power from a power source or the external battery coupled to the power port to the low-voltage subsystem, and/or up-converting power from the low-voltage subsystem to the high-voltage subsystem and the external accessory coupled to the power port.

The bidirectional switching converters are also operated based on the state of the internal battery (operation 1706). For example, the state of the internal battery may be a low-voltage state, a high-voltage state, and/or an under-voltage state. During the low-voltage or under-voltage state of the internal battery and a coupling of an external battery to the first power port, a first bidirectional switching converter may be operated to down-convert power from the external battery to the low-voltage subsystems. A second bidirectional switching converter may be operated to up-convert power from the low-voltage subsystem to the high-voltage subsystem.

During the low-voltage or under-voltage state of the internal battery, a presence of the input voltage from a power source or an external battery through the first power port, and a coupling of an external accessory to the second power port, the first bidirectional switching converter may be operated to switch between up-converting power from the low-voltage subsystem to the high-voltage subsystem and down-converting the input voltage from a power source to the low-voltage subsystem. The second bidirectional switching converter may be operated to boost power from the low-voltage subsystem to the high-voltage subsystem and the external accessory.

During a coupling of a power source to the first port and a coupling of an external battery to the second power port, the first and second bidirectional switching converters may be operated to power the low-voltage subsystem and the high-voltage subsystem and charge the internal battery from the power source. Remaining power from the power source may be used to charge the external battery, or the external battery may be used to supplement the power to the low-voltage subsystem, the high-voltage subsystem, and the internal battery from the power source.

Figure 18:
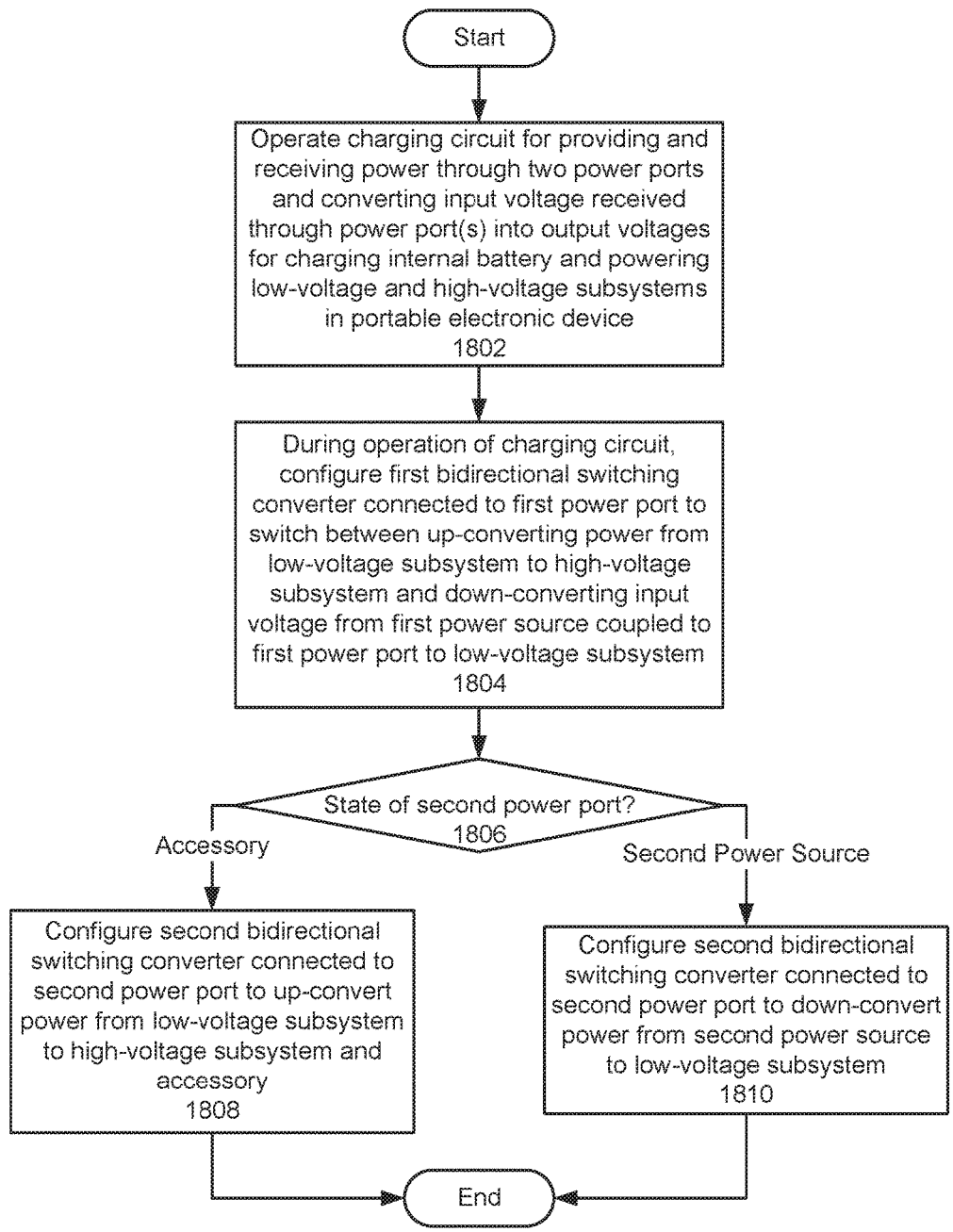
FIG. 18 shows a flowchart illustrating the process of operating a charging system for a portable electronic device in accordance with the disclosed embodiments.

FIG. 18 shows a flowchart illustrating the process of operating a charging system for a portable electronic device in accordance with the disclosed embodiments. In one or more embodiments, one or more of the steps may be omitted, repeated, and/or performed in a different order. Accordingly, the specific arrangement of steps shown in FIG. 18 should not be construed as limiting the scope of the embodiments.

Initially, a charging circuit for providing and receiving power through two power ports and converting an input voltage received through one or both power ports into output voltages for charging an internal battery and powering low-voltage and high-voltage subsystems in the portable electronic device is operated (operation 1802). Next, during operation of the charging circuit, a first bidirectional switching converter connected to a first power port is configured to switch between up-converting power from the low-voltage subsystem to the high-voltage subsystem and down-converting the input voltage from a first power source coupled to the first power port to the low-voltage subsystem (operation 1804).

In other words, the first bidirectional switching converter may be operated in the SISC switcher mode described above. In the SISC switcher mode, up-converting power from the low-voltage subsystem to the high-voltage subsystem may be prioritized over down-converting of the input voltage to the low-voltage subsystem. Conversely, down-converting of the input voltage to the low-voltage subsystem may be prioritized over up-converting power from the low-voltage subsystem to the high-voltage subsystem.

During down-converting of the input voltage from the power source to the low-voltage subsystem, the SISC switcher mode may be operated in one of several sub-states. First, the input voltage may be down-converted to a target voltage of the internal battery. Second, the input voltage may be down-converted to a minimum voltage of the low-voltage subsystem. Third, as much power as possible may be pulled from the power source. Fourth, a first inductor current of the first bidirectional switching converter may be balanced with a second inductor current of a second bidirectional switching converter connected to the second power port.

The charging circuit may be operated based on the state of a second power port (operation 1806) connected to the charging circuit. If an accessory (e.g., a powered device or charging external battery) is coupled to the second power port, a second bidirectional converter connected to the second power port is configured to up-convert power from the low-voltage subsystem to the high-voltage subsystem and the accessory (operation 1808). In other words, the second bidirectional converter may be operated in the SIDO switcher mode described above.

If a second power source is coupled to the second power port, the second bidirectional converter is configured to down-convert power from the second power source to the low-voltage subsystem (operation 1810). For example, the second bidirectional converter may be operated in the buck (charge or no-charge) mode described above, depending on the charging state of the internal battery.

Figure 19:
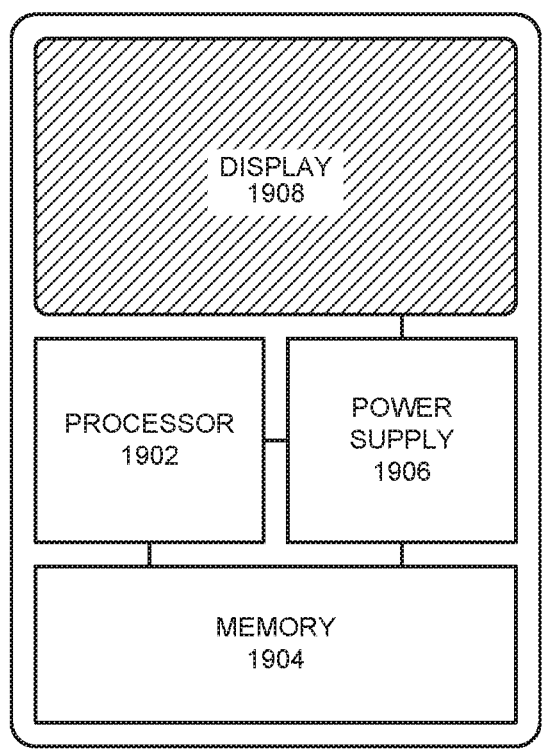
FIG. 19 shows a portable electronic device in accordance with the disclosed embodiments.

The above-described charging circuit can generally be used in any type of electronic device. For example, FIG. 19 illustrates a portable electronic device 1900, which includes a processor 1902, a memory 1904 and a display 1908, which are all powered by a power supply 1906. Portable electronic device 1900 may correspond to a laptop computer, tablet computer, mobile phone, portable media player, digital camera, and/or other type of battery-powered electronic device. Power supply 1906 may include one or more power converters such as SIDO boost converters, SIDO buck-boost converters, dual-output SEPIC converters, and/or other bidirectional switching converters. In one or more embodiments, the power converter(s) include a first bidirectional switching converter connected to a first power port of the portable electronic device, a low-voltage subsystem in the portable electronic device, and a high-voltage subsystem in the portable electronic device, as well as a second bidirectional switching converter connected to a second power port of the portable electronic device, the low-voltage subsystem, and the high-voltage subsystem.

Power supply 1906 may also include a control circuit that operates the power converter(s) to provide and receive power through the first and second power ports and convert an input voltage received through the first or second power port into a set of output voltages for charging an internal battery in the portable electronic device and powering the low-voltage subsystem and the high-voltage subsystem. For example, the control circuit may use the power converter(s) to charge an external battery coupled to the first power port from a power source coupled to the second power port and/or use the external battery to supplement power from the power source.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A charging system for a portable electronic device, comprising:
    a first bidirectional switching converter connected to each of a first bidirectional power port of the portable electronic device, a low-voltage subsystem in the portable electronic device, and a high-voltage subsystem in the portable electronic device;
    a second bidirectional switching converter connected to each of a second bidirectional power port of the portable electronic device, the low-voltage subsystem, and the high-voltage subsystem;
    an internal battery connected to the low-voltage subsystem; and
    a control circuit configured to operate one of the first and second bidirectional switching converters to distribute power between the high-voltage subsystem, the low-voltage subsystem, the first and second bidirectional power ports and the internal battery.

2. The charging system of claim 1, wherein at least one of the first and second bidirectional switching converters is a single-input dual-output (SIDO) boost converter.

3. The charging system of claim 1, wherein the control circuit is further configured to:
    operate the first and second bidirectional switching converters based at least in part on a coupling of a power source, an external accessory, or an external battery to at least one of the first or second bidirectional power ports; and
    operate the first and second bidirectional switching converters based on a state of the internal battery.

4. The charging system of claim 1, wherein the control circuit is further configured to:
    configure a set of switches in the first bidirectional switching converter to switch between up-converting power from the low-voltage subsystem to the high-voltage subsystem and up-converting power from the low-voltage subsystem to one of the first and second bidirectional power ports using a common inductor or mutually coupled inductors.

5. The charging system of claim 1, wherein the control circuit is further configured to:
    configure a set of switches in one of the first and second bidirectional switching converters connected to one of the first and second bidirectional power ports in the portable electronic device to:
        up-convert power from one of the first and second bidirectional power ports to the low-voltage subsystem; and
        using a common inductor or coupled inductors, up-convert power from the low-voltage subsystem to the high-voltage subsystem.

6. The charging system of claim 1, wherein the control circuit is further configured to:
    during a low-voltage state or an under-voltage state of the internal battery and a coupling of an external battery to the first power port:
        operate the first bidirectional switching converter to down-convert power from the external battery to the low-voltage subsystem; and
        operate the second bidirectional switching converter to up-convert power from the low-voltage subsystem to the high-voltage subsystem.

7. The charging system of claim 1, wherein at least one of the first and second bidirectional switching converters is a single-input dual-output (SIDO) buck-boost converter.

8. The charging system of claim 7, wherein the SIDO buck-boost converter is configured to distribute current in either direction between the low-voltage subsystem and the first and second bidirectional power ports.

9. The charging system of claim 8, wherein the state of the internal battery is at least one of a high-voltage state, a low-voltage state, and an under-voltage state.

10. The charging system of claim 7, wherein the SIDO buck-boost converter is configured to prioritize the distribution of power between the high-voltage subsystem, the low-voltage subsystem, and the first and second bidirectional power ports when the voltage of the first and second bidirectional power ports is higher or lower than the voltage of the low-voltage subsystem.

11. The charging system of claim 1, wherein at least one of the first and second bidirectional switching converters is a dual output SEPIC converter.

12. The charging system of claim 1, wherein the control circuit is configured to operate the first bidirectional switching converter to up-convert power from the low-voltage subsystem to the high-voltage subsystem with no power coming in or out of the first bidirectional power port.

13. The charging system of claim 1, wherein the control circuit is configured to operate the first bidirectional switching converter to up-convert power from a power source or an external battery connected to the first bidirectional power port to the low-voltage subsystem using an inductor or coupled inductors.

14. The charging system of claim 13, wherein the control circuit is further configured to operate the first bidirectional switching converter to up-convert power from the power source or the external battery connected to the first bidirectional power port to the high voltage subsystem using the inductor or coupled inductors.

15. The charging system of claim 1, wherein the control circuit is configured to operate the first bidirectional switching converter to down-convert power from a power source or an external battery connected to the first bidirectional power port to the low-voltage subsystem and up-convert power from the power source or the external battery connected to the first bidirectional power port to the high-voltage subsystem using a common inductor or coupled inductors.

16. The charging system of claim 1, wherein the control circuit is configured to operate the first bidirectional switching converter to up-convert power from the low-voltage subsystem to the high voltage sub-system and down-convert power from the low-voltage subsystem to an external accessory coupled to the first bidirectional power port using a common inductor or coupled inductors.

17. The charging system of claim 1, wherein the control circuit is configured to operate the first bidirectional switching converter to up-convert power from the low-voltage subsystem to the high-voltage subsystem and up-convert power from the low-voltage subsystem to an external accessory coupled to the first bidirectional power port using a common inductor or coupled inductors.

18. A method for managing power use in a portable electronic device having first and second bidirectional power ports, first and second bidirectional power converters respectively coupled to the first and second bidirectional power ports, and a low voltage subsystem, a high voltage subsystem, and an internal battery coupled to each of the first and second bidirectional switching converters, the method comprising:
controlling the first and second bidirectional switching converters to distribute power among the low-voltage subsystem, the high-voltage subsystem, and the first and second bidirectional power ports responsive to a determination whether each of the first and second bidirectional power ports is coupled to an external power source, an external battery, or an external accessory and one or more voltages selected from a group consisting of: a voltage of the external power source, a voltage of the external battery, a voltage of the low-voltage subsystem, a voltage of the high-voltage subsystem, and a voltage of the internal battery.

19. The method of claim 18, further comprising configuring at least one of the first and second bidirectional switching converters to switch between up-converting power from the low-voltage subsystem to the high-voltage subsystem and up-converting power from the low-voltage subsystem to one of the first and second bidirectional power ports using a common inductor or mutually coupled inductors.

20. The method of claim 18, further comprising operating at least one of the first and second bidirectional switching converters to:
up-convert power from one of the first and second bidirectional power ports to the low-voltage subsystem; and
using a common inductor or coupled inductors, up-convert power from the low-voltage subsystem to the high-voltage subsystem.

21. The method of claim 18, wherein the distributing of power further comprises prioritizing up-converting power from the low-voltage subsystem to the high-voltage subsystem over down-converting of the input voltage to the low-voltage subsystem.

22. The method of claim 18, wherein controlling the first and second bidirectional switching converters to distribute power among the low-voltage subsystem, the high-voltage subsystem, and the first and second bidirectional power ports further comprises operating the first bidirectional switching converter to up-convert power from the low-voltage subsystem to the high-voltage subsystem with no power coming in or out of the first bidirectional power port.

23. The method of claim 18, wherein controlling the first and second bidirectional switching converters to distribute power among the low-voltage subsystem, the high-voltage subsystem, and the first and second bidirectional power ports further comprises operating the first bidirectional switching converter to up-convert power from a power source or an external battery connected to the first bidirectional power port to the low-voltage subsystem using an inductor or coupled inductors.

24. The method of claim 23, wherein controlling the first and second bidirectional switching converters to distribute power among the low-voltage subsystem, the high-voltage subsystem, and the first and second bidirectional power ports further comprises operating the first bidirectional switching converter to up-convert power from the power source or the external battery connected to the first bidirectional power port to the high-voltage subsystem using the inductor or coupled inductors.

25. The method of claim 18, wherein controlling the first and second bidirectional switching converters to distribute power among the low-voltage subsystem, the high-voltage subsystem, and the first and second bidirectional power ports further comprises operating the first bidirectional switching converter to down-convert power from a power source or an external battery connected to the first bidirectional power port to the low-voltage subsystem and up-convert power from the power source or the external battery connected to the first bidirectional power port to the high-voltage subsystem using a common inductor or coupled inductors.

26. The method of claim 18, wherein controlling the first and second bidirectional switching converters to distribute power among the low-voltage subsystem, the high-voltage subsystem, and the first and second bidirectional power ports further comprises operating the first bidirectional switching converter to up-convert power from the low-voltage subsystem to the high-voltage subsystem and down-convert power from the low-voltage subsystem to an external accessory coupled to the first bidirectional power port using a common inductor or coupled inductors.

27. The method of claim 18, wherein controlling the first and second bidirectional switching converters to distribute power among the low-voltage subsystem, the high-voltage subsystem, and the first and second bidirectional power ports further comprises operating the first bidirectional switching converter to up-convert power from the low-voltage subsystem to the high-voltage subsystem and up-convert power from the low-voltage subsystem to an external accessory coupled to the first bidirectional power port using a common inductor or coupled inductors.

* * * * *